(12) United States Patent
Gokhale et al.

(10) Patent No.: US 10,602,187 B2
(45) Date of Patent: *Mar. 24, 2020

(54) EFFICIENT, COMPATIBLE, AND SCALABLE INTRA VIDEO/IMAGE CODING USING WAVELETS AND HEVC CODING

(71) Applicant: Intel Corporation, Santa Clara, CA (US)

(72) Inventors: Neelesh N. Gokhale, Seattle, WA (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 965 days.

This patent is subject to a terminal disclaimer.

(21) Appl. No.: 14/954,837

(22) Filed: Nov. 30, 2015

(65) Prior Publication Data

US 2017/0155924 A1  Jun. 1, 2017

(51) Int. Cl.

| H04N 19/63 | (2014.01) |
|---|---|
| H04N 19/119 | (2014.01) |
| H04N 19/159 | (2014.01) |
| H04N 19/184 | (2014.01) |
| H04N 19/187 | (2014.01) |
| H04N 19/169 | (2014.01) |

(52) U.S. Cl.
CPC .......... *H04N 19/63* (2014.11); *H04N 19/119* (2014.11); *H04N 19/159* (2014.11); *H04N 19/184* (2014.11); *H04N 19/187* (2014.11); *H04N 19/1883* (2014.11)

(58) Field of Classification Search
CPC .... H04N 19/63; H04N 19/159; H04N 19/184; H04N 19/187; H04N 19/1883
See application file for complete search history.

(56) References Cited

U.S. PATENT DOCUMENTS

| 6,078,617 | A | * | 6/2000 | Nakagawa | ............. F16B 31/00 375/240 |
|---|---|---|---|---|---|
| 6,771,695 | B1 | * | 8/2004 | Banerjea | ................. H04L 25/05 375/222 |
| 2006/0008006 | A1 | | 1/2006 | Cha et al. | |
| 2006/0013313 | A1 | | 1/2006 | Han et al. | |
| 2007/0171971 | A1 | | 7/2007 | Francois et al. | |
| 2008/0095235 | A1 | | 4/2008 | Hsiang | |
| 2008/0152011 | A1 | | 6/2008 | Zhang et al. | |
| 2008/0310506 | A1 | | 12/2008 | Xu et al. | |
| 2009/0003440 | A1 | | 1/2009 | Karczewicz et al. | |

(Continued)

FOREIGN PATENT DOCUMENTS

WO  2014109826  7/2014

OTHER PUBLICATIONS

Notice of Allowance for U.S. Appl. No. 14/954,715 dated Dec. 22, 2017.
Office Action for U.S. Appl. No. 14/954,715, notified Jul. 13, 2017.
International Preliminary Report on Patentability for International Patent Application No. PCT/US16/52709, dated Jun. 14, 2018.

(Continued)

*Primary Examiner* — Maria E Vazquez Colon
(74) *Attorney, Agent, or Firm* — Green, Howard & Mughal LLP

(57) ABSTRACT

Techniques related to intra video frame or image coding using wavelets and High Efficiency Video Coding (HEVC) are discussed. Such techniques may include wavelet decomposition of a frame or image to generate subbands and coding the subbands using compliant and/or modified HEVC coding techniques.

24 Claims, 50 Drawing Sheets

(56) References Cited

U.S. PATENT DOCUMENTS

| | | |
|---|---|---|
| 2009/0219994 A1 | 9/2009 | Tu et al. |
| 2010/0208795 A1* | 8/2010 | Hsiang .................. H04N 19/63 375/240.2 |
| 2010/0309286 A1* | 12/2010 | Chen .................... H04N 19/597 348/43 |
| 2011/0200097 A1 | 8/2011 | Chen et al. |
| 2012/0224027 A1 | 9/2012 | Takada |
| 2012/0230411 A1 | 9/2012 | Shan et al. |
| 2013/0107950 A1 | 5/2013 | Guo et al. |
| 2013/0121423 A1 | 5/2013 | Gamei et al. |
| 2013/0177066 A1 | 7/2013 | Ye et al. |
| 2014/0092956 A1 | 4/2014 | Panusopone et al. |
| 2014/0328400 A1 | 11/2014 | Puri et al. |
| 2015/0010048 A1 | 1/2015 | Puri et al. |
| 2015/0098503 A1* | 4/2015 | Pu ......................... H04N 19/50 375/240.12 |
| 2015/0172661 A1* | 6/2015 | Dong .................... H04N 19/51 375/240.03 |
| 2015/0237350 A1 | 8/2015 | Gordon et al. |
| 2015/0334420 A1* | 11/2015 | De Vleeschauwer ...................... H04N 19/30 375/240.19 |
| 2017/0142418 A1 | 5/2017 | Li et al. |
| 2018/0041761 A1 | 2/2018 | Alshina et al. |
| 2018/0316935 A1 | 11/2018 | Boisson et al. |

OTHER PUBLICATIONS

J.M. Shapiro, "Embedded Image Coding Using Zerotrees of Wavelet Coefficients," IEEE Transactions on Signal Processing, pp. 3445-3462, vol. 41, No. 12, Dec. 1993.
A. Said et al., "A New Fast and Efficient Image Codec Based on Set Partitioning in Hierarchical Trees," IEEE Transactions on Circuits and Systems for Video Technology, pp. 243-250, vol. 6, No. 3, Jun. 1996.
C. Christopoulos et al., "The JPEG2000 Still Image Coding System: An Overview", IEEE Transactions on Consumer Electronics, pp. 1103-1127, vol. 46, No. 4, Nov. 2000.
A. Puri et al., "Video Coding Using the H.264/MPEG-4 AVC compression standard," Signal Processing: Image Communication, vol. 19, pp. 793-849, 2004.
A. Puri, "Enabling HEVC: Intel Media Server Studio 2015," White paper, vol. 1.5, Jun. 24, 2015.
International Search Report and Written Opinion for International Patent Application No. PCT/US2016/050553, dated Dec. 20, 2016.
International Search Report and Written Opinion for International Patent Application No. PCT/US2016/052709, dated Jan. 4, 2017.
International Search Report and Written Opinion for International Patent Application No. PCT/US2016/053568, dated Jan. 16, 2017.
International Preliminary Report on Patentability for International Patent Application No. PCT/US16/50553, dated Jun. 14, 2018.
International Preliminary Report on Patentability for International Patent Application No. PCT/US16/53568, dated Jun. 14, 2018.

* cited by examiner

1001

| LL₂ | HL₂ | HL₁ |
| LH₂ | HH₂ | |
| LH₁ | | HH₁ |

FIG. 10A

EFFICIENT, COMPATIBLE, AND SCALABLE INTRA VIDEO/IMAGE CODING USING WAVELETS AND HEVC CODING

CROSS-REFERENCE TO RELATED APPLICATIONS

This application contains subject matter related to U.S. patent application Ser. No. 14/954,710, titled "EFFICIENT INTRA VIDEO/IMAGE CODING USING WAVELETS AND VARIABLE SIZE TRANSFORM CODING" filed on Nov. 30, 2015, and U.S. patent application Ser. No. 14/954,715, titled "EFFICIENT AND SCALABLE INTRA VIDEO/IMAGE CODING USING WAVELETS AND AVC, MODIFIED AVC, VPx, MODIFIED VPx, OR MODIFIED HEVC CODING" filed on Nov. 30, 2015.

BACKGROUND

An image or video encoder compresses image or video information so that more information may be sent over a given bandwidth. The compressed signal may then be transmitted to a receiver having a decoder that decodes or decompresses the signal prior to display.

This disclosure, developed in the context of advancements in image/video processing, addresses problem associated with performing improved coding of images and Intra frames of video. Such improved coding may include a combination of efficient coding as well as coding that supports basic scalability. For example, the term efficient coding refers to encoding that provides higher compression efficiency allowing either more images or Intra frames of video of certain quality to be stored on a computer disk/device or to be transmitted over a specified network or the same number (e.g., of images or Intra frames of video) but of higher quality to be stored or transmitted. Furthermore, the term scalable coding here refers to encoding of image or Intra frames of video such that from a single encoded bitstream subsets of it can then be decoded resulting in images or Intra frames of different resolutions. For example, the term basic scalability as it applies to this disclosure refers to the capability of decoding a subset of the bitstream resulting in lower resolution layer image or Intra frames in addition to the capability of decoding a full resolution version from the same bitstream.

With ever increasing demand for capture, storage, and transmission of more images and videos of higher quality with the added flexibility of scalability, it may be advantageous to provide improved compression techniques for images and Intra frames of video. It is with respect to these and other considerations that the present improvements have been needed.

BRIEF DESCRIPTION OF THE DRAWINGS

The material described herein is illustrated by way of example and not by way of limitation in the accompanying FIGS. For simplicity and clarity of illustration, elements illustrated in the FIGS. are not necessarily drawn to scale. For example, the dimensions of some elements may be exaggerated relative to other elements for clarity. Further, where considered appropriate, reference labels have been repeated among the FIGS. to indicate corresponding or analogous elements. In the FIGS.:

FIG. 10A illustrates an example two level dyadic decomposition process of an image;

DETAILED DESCRIPTION

Figure 1A:
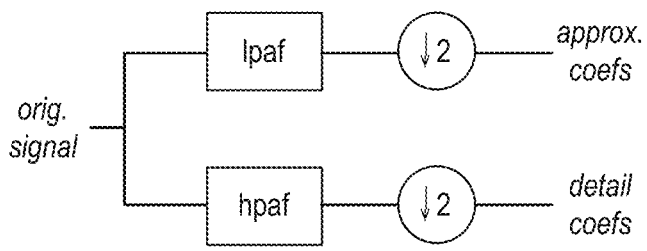
FIG. 1A illustrates an example application of an analysis filter.

One or more embodiments or implementations are now described with reference to the enclosed FIGS. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to efficient intra video/image coding using wavelets and High Efficiency Video Coding (HEVC) coding.

For example, techniques discussed herein may provide wavelet based intra coding that is efficient and scalable. Furthermore, at least some of the techniques discussed herein may be forward compatible with the HEVC coding standard.

Before discussing the details of various embodiments, the disclosure provides a discussion of wavelet based image coding. For example, the process of wavelet filtering of digital signals may be thought of as including two complementary processes, one, that decomposes the signal into low-pass and high-pass sub-set signals, and the reverse process that combines (re-composes) the low-pass and high-pass sub-set signals back into the original (or near-original) signal. The filters used for decomposition may be called analysis filters may be are applied first, and the filters used for re-composition may be called synthesis filters and may be applied to decomposed signal (other operations may be inserted between the analysis and synthesis filters). In some examples, the analysis and synthesis filters may be a complementary pair and may be required to satisfy certain mathematical properties to enable a final reconstruction of the signal to be similar to the original signal and of good quality. As an example of different classes/types of filters and properties they possess, the properties of orthogonal filter and bi-orthogonal filter classes as well as examples of specific filters or types of filters that fall into aforementioned classes are provided.

In some examples, orthogonal filters may be utilized. For example, orthogonal filters may include synthesis filters that are time reversed versions of their associated analysis filters, high pass filters that may be derived from low pass filters, and analysis filters that satisfy the orthogonally constraint. In other examples, bi-orthogonal filters may be utilized. For example, bi-orthogonal filters may include a Finite Impulse Response (FIR), a linear phase, and perfect reconstruction. However, bi-orthogonal filters may not be orthogonal.

An example bi-orthogonal class of wavelet filters include Haar wavelet filters, but higher quality filters of the same class include Cohen-Daubechies-Feauveau CDF 5/3, LeGall 5/3 filters, and CDF 9/7 filters. For example, CDF 5/3 or CDF 9/7 filters may be bi-orthogonal (e.g., providing FIR, linear phase, and perfect reconstruction but not being orthogonal), symmetrical, and may have an odd length.

An example of orthogonal wavelet filters include Quadrature Mirror filters (QMF) of various sizes. For example, QMF filters may provide FIR, linear phase, alias-free but not perfect reconstruction, and may be orthogonal.

In the following discussion, the abbreviations or terms lpaf, hpaf, lpsf, and hpsf respectively in Tables 1A-3, which illustrate example filters, and elsewhere herein represent low pass analysis filter, high pass analysis filter, low pass synthesis filter, and high pass synthesis filter, respectively.

Table 1A provides example coefficients of a 5 tap low pass analysis filter such that the filter is symmetric around the center coefficient 0.75 and coefficients of a 3 tap high pass analysis filter such that the filter is symmetric around the center coefficient 1.0.

TABLE 1A

Example CDF or LeGall 5/3 Analysis Filters

| lpaf | 0.75 | 0.25 | −0.125 |
|---|---|---|---|
| hpaf | 1.00 | −0.50 | |

Table 1B provides example coefficients of a 3 tap low pass synthesis filter such that the filter is symmetric around the center coefficient 1.0 and coefficients of a 5 tap high pass synthesis filter such that the filter is symmetric around the center coefficient 0.75.

TABLE 1B

Example CDF or LeGall 5/3 Synthesis Filters

| lpsf | 1.00 | 0.50 | |
|---|---|---|---|
| hpsf | 0.75 | −0.25 | −0.125 |

The example filter sets of Table 1A and Table 1B may be referred to as either Daubechies 5/3, CDF 5/3, or LeGall 5/3 filters.

FIG. 1A illustrates an example application 101 of an analysis filter, arranged in accordance with at least some implementations of the present disclosure. As shown in FIG. 1A, an original 1D signal may undergo low pass analysis filtering (lpaf) resulting in a low pass 1D signal that is a downsampled by 2 subband of the input signal (e.g., approx. coefficients). In parallel, for example, the original 1D signal may also undergo high pass analysis filtering (hpaf) resulting in a high pass 1D signal that is a downsampled by 2 subband of the input signal (e.g., detail coefficients). In some examples, the analysis filter applied in FIG. 1A may be the analysis filter of Table 1A.

Figure 1B:
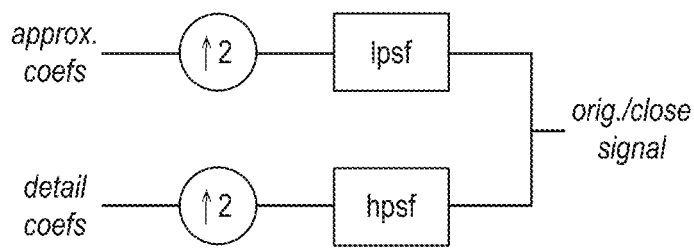
FIG. 1B illustrates an example application of a synthesis filter.

FIG. 1B illustrates an example application 102 of a synthesis filter, arranged in accordance with at least some implementations of the present disclosure. As shown in FIG. 1B, a synthesis filter that is complimentary with respect to the analysis filter applied in FIG. 1A may be applied. For example, the two downsampled signals (low pass and high pass subbands; e.g., approx. coefficients and detail coefficients) from analysis filtering may be filtered by a pair of synthesis filters referred to as low pass synthesis filter and high pass synthesis filter. The two outputs may be combined resulting in a reconstruction signal that is same (or nearly identical) as the 1D original signal at the input (e.g., orig./close signal). In some examples, the syntheses filter applied in FIG. 1B may be the syntheses filter of Table 1B. In the example of application of the 5/3 filters of Tables 1A and 1B, the output may be precisely identical as coefficients are powers of 2. However, in the application of other example filters, the output, due to slight rounding differences, may be very close if not exactly the same. In some examples, after analysis filtering, the resulting low pass and high pass subband pixels (also referred to as filtered coefficients) may be, during encoding, selectively reduced in precision by quantization and then entropy encoded resulting in compression. A decoder may then reverse the encoding process by performing entropy decoding and inverse quantization followed by synthesis filtering.

The discussed analysis/synthesis filtering process is not limited to the use of 5/3 filtering such as the filters of Tables 1A and 1B. For example, the discussed analysis/synthesis filtering process may be applicable to any analysis and systhesis filtres such as those discussed herien. For example, Tables 2A and 2B provide example CDF 9/7 filters. The low pass analysis filter of CDF 9/7 filters may be a 9 tap filter symmetric around the center coefficient 0.602949 and the high pass analysis filter may be a 7 tap filter symmetric around center coefficient 1.115087. Example complimentary low pass synthesis and high pass synthesis filters are provided in Table 2B with low pass synthesis filter of length 7 taps and high pass synthesis filter of length 9 taps.

TABLE 2A

Example CDF 9/7 Analysis Filters

| lpaf | 0.602949018 | 0.266864118 | −0.078223266 | −0.01686411 | 0.026748757 |
|---|---|---|---|---|---|
| hpaf | 1.115087052 | −0.591271763 | −0.057543526 | 0.091271763 | |

TABLE 2B

Example CDF 9/7 Synthesis Filters

| | | | | | |
|---|---|---|---|---|---|
| lpsf | 1.115087052 | 0.591271763 | −0.057543526 | −0.091271763 | |
| hpsf | 0.602949018 | −0.266864118 | −0.078223266 | 0.01686411 | 0.026748757 |

The previously discussed filter sets (e.g., the CDF (or LeGall) 5/3 filters and the CDF 9/7 filters) are examples of bi-orthogonal filters. However, the techniques discussed herein are also applicable to orthogonal filters such as QMF filters. For example, Table 3 provides example coefficients of a 13 tap QMF low pass and high pass analysis filters. The complimentary synthesis filters may be generated as time reversed versions of analysis filters.

TABLE 3

Example QMF 13 Analysis Filters (Synthesis Filters are time reversed versions of the Analysis Filters)

| lpaf | hpaf |
|---|---|
| 0.7737113 | 0.7737113 |
| 0.42995453 | −0.42995453 |
| −0.057827797 | −0.057827797 |
| −0.0980052 | 0.0980052 |
| 0.039045125 | 0.039045125 |
| 0.021651438 | −0.021651438 |
| −0.014556438 | −0.014556438 |

The described techniques may provide 1D filtering of signals. Discussion now turns to 2D filtering as images are 2D signals and video may be thought of as composed of 2D frames plus a time dimension. For example, the 1D filtering techniques discussed so far may be extended to derive 2D filtering techniques as discussed further herein.

For example, wavelet filtering may decompose a 2D signal such as an image (or video frame) into subbands by different decomposition techniques including uniform band decomposition, octave band decomposition, and wavelet packet decomposition. For example, octave band decomposition may provide a non-uniform splitting technique that decomposes low frequency band into narrower bands wuch that the high frequency bands are left without further decomposition.

Figure 1C:
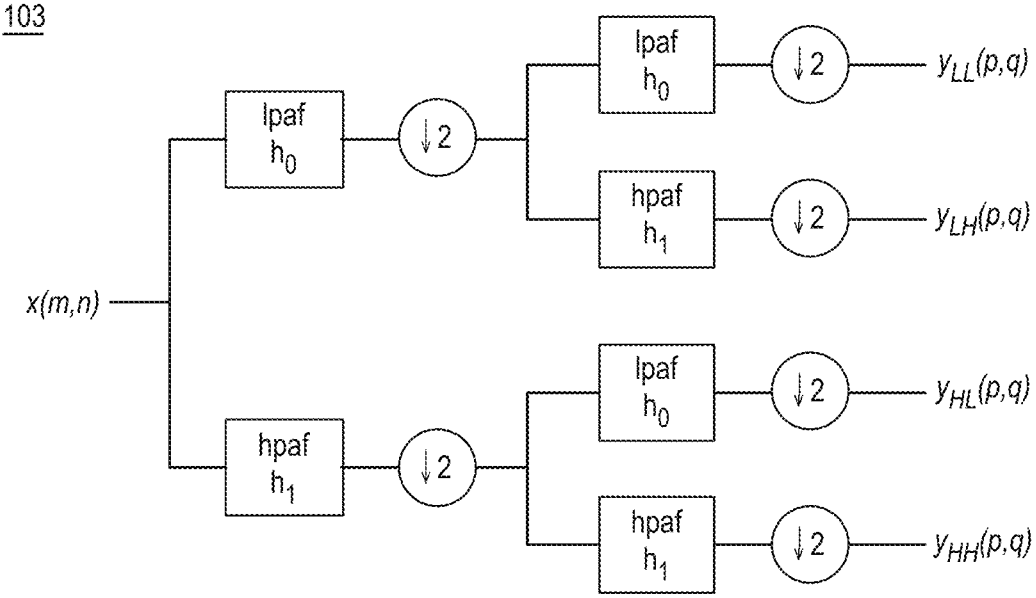
FIG. 1C illustrates an example analysis filtering of a 2D signal.

FIG. 1C illustrates an example analysis filtering 103 of a 2D signal, arranged in accordance with at least some implementations of the present disclosure. As shown in FIG. 1C, analysis filtering of 2D signals may include two stages, the first stage to perform filtering in one dimension (e.g., vertical) and the second stage to perform filtering in the second dimension (e.g., horizontal) to the output of the first stage. For example, analysis filtering 103 may provide analysis filtering of a 2D signal (e.g., an image or Intra frame). The analysis filters used in the first stage (e.g., a low analysis pass filter and a high analysis pass filter) and in the second stage may be the same. For example, in the first stage they may be applied on rows while in second stage they may be applied on columns. The entire 2 stage decomposition/analysis filtering process for 2D signals illustrated in FIG. 1C may provide filtering and subsampling by 2 operations and may result in 4 subbands referred to as Low-Low (LL), Low-High (LH), High-Low (HL), and High-High (HH). For example, FIG. 1C illustrates decomposing a 2D signal, x(m,n), into 4 subbands having samples represented by $y_{LL}(p,q)$, $y_{LH}(p,q)$, $y_{HL}(p,q)$, and $y_{HH}(p,q)$. In the example decomposition of FIG. 1C, each subband includes one-quarter of the number of samples (coefficients) of the original signal x(m,n).

Figure 1D:
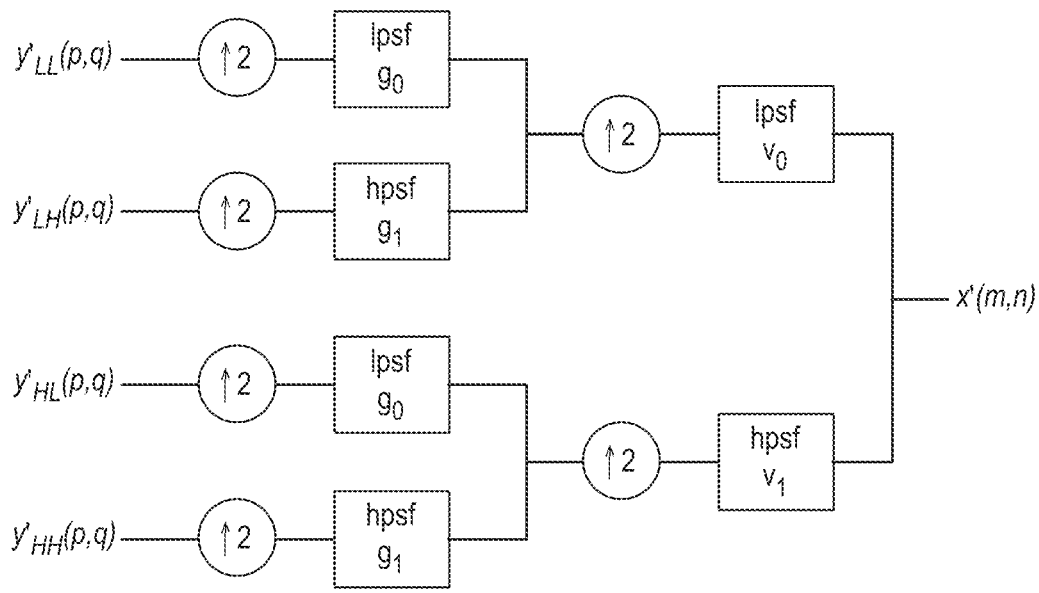
FIG. 1D illustrates an example synthesis filtering.

FIG. 1D illustrates an example synthesis filtering 104, arranged in accordance with at least some implementations of the present disclosure. As shown in FIG. 1D, synthesis filtering 104 may include operations of interpolation by 2 and filtering applied on samples (e.g., coefficients) y'LL (p,q), $y'_{LH}(p,q)$, $y'_{HL}(p,q)$, and $y'_{HH}(p,q)$ representing each of four subbands to provide a re-composed version of the original signal (e.g., x'(m,n)). In examples where perfect filters with no quantization of subband coefficients, the final (e.g., re-composed) signal (e.g., x'(m,n)) may be exactly the same as the input signal provided to analysis filtering 103 (e.g., x(m,n); please refer to FIG. 1C).

Figure 2A:
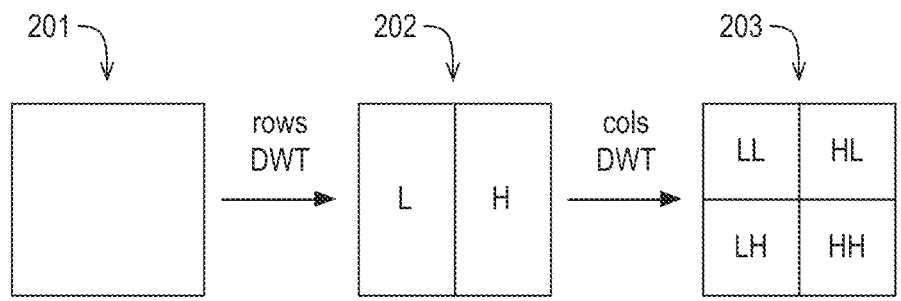
FIG. 2A illustrates an example results of applying wavelet filtering to an image or video frame.

FIG. 2A illustrates an example results 202, 203 of applying wavelet filtering to an image or video frame 201, arranged in accordance with at least some implementations of the present disclosure. As shown in FIG. 2A, wavelet filtering may be applied applied on the rows of image or video frame 201 resulting in decomposition of image or video frame 201 into results 202, which may include 2 subbands: a low frequency subband L and a high frequency subband H, which may each be of half size horizontally but full size vertically with respect to image or video frame 201. Wavelet filtering may be applied to columns of results 202 (e.g., to each of the two subbands, L and H) to decompose each subband further into two subbands each for a total of 4 subbands (e.g., LL, HL, LH, and HH subbands) as shown with respect to results 203. The process illustrated with respect to FIG. 2A may be referred to as a one level decomposition of image or video frame 201. For example, FIG. 2A may provide a one level discrete wavelet transform (DWT) decomposition.

Figure 2B:
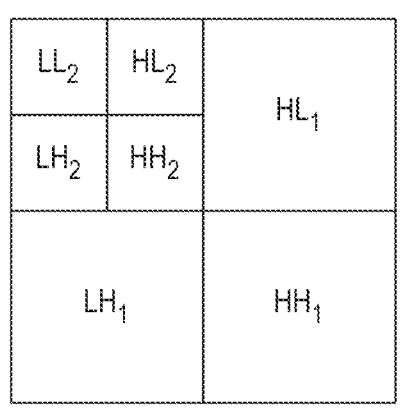
FIG. 2B illustrates an example two level decomposition of an image or video frame.

FIG. 2B illustrates an example two level decomposition 204 of an image or video frame, arranged in accordance with at least some implementations of the present disclosure. As shown in FIG. 2B, the process of one level decomposition may be extended to two levels (e.g., which may be referred to as two level decomposition). The process of providing two level decomposition 204 may include performing a one level decomposition resulting in the 4 subbands discussed with respect to FIG. 2A and referred to in FIG. 2B as $LL_1$ (not shown in FIG. 2B due to subsequent decomposition), $HL_1$, $LH_1$, and $HH_1$ subbands. Furthermore, the low-low ($LL_1$) subband may be decomposed further by, in some embodiments, an identical process used for the one level decomposition. In other embodiments, the first and second decompositions may include different decompositions (e.g., filter types or the like). Such processing may provide for the decomposition of $LL_1$ subband further into 4 subbands that are referred to as $LL_2$, $HL_2$, $LH_2$, and $HH_2$, with $LL_2$ now being the low-low subband.

In some examples, such decomposition processing may be continued further with each iteration performing a quad-split of the low-low band from the previous iteration, which may provide in higher levels of decomposition.

Figure 3A:
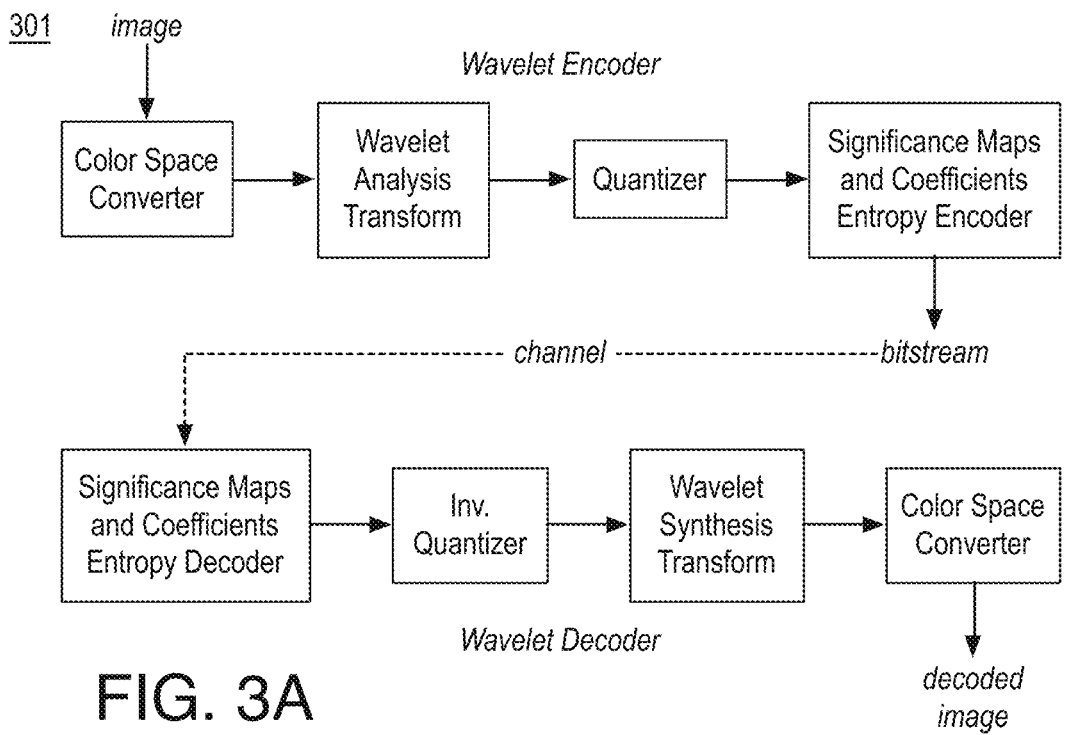
FIG. 3A is a block diagram wavelet based encoder/decoder system.

Discussion now turns to a wavelet based coder for coding of images or Intra frames of video. FIG. 3A is a block diagram wavelet based encoder/decoder system 301, arranged in accordance with at least some implementations of the present disclosure. As shown in FIG. 3A, an image to be encoded by a Wavelet Encoder of system 301 may be input to a Color Space Converter, which may, for example, convert an RGB image/frame to a YUV image/frame, which may be input to a Wavelet Analysis Transform module that may decompose the YUV image/frame into wavelet (e.g., subband) coefficients that may be quantized by a Quantizer, which may be followed by entropy coding of a map of a location of significant quantized coefficients and the quantized coefficients themselves by a Significance Maps and Coefficients Entropy Encoder to produce a coded bitstream for storage or transmission over a channel.

The coded bitstream from storage or transmission may, at a Wavelet Decoder of system 301, undergo entropy decoding of the significance maps as well as the coefficient themselves at a Significance Maps and Coefficients Entropy Decoder, followed by inverse quantization of quantized coefficients at an Inverse Quantizer, which may be input to a Wavelet Synthesis Transform module that may re-constitute from wavelet (e.g., subband) coefficients, the YUV image/frame, which may be converted by a Color Space Inverter to the desired (e.g., often, RGB) format to generate a decoded image.

Without any loss of generality it may be said that if the image to be coded is already in the color format used by the encoder, color space conversion is not necessary. Furthermore, the decoded image, if it may be consumed in the format decoded, may not require color space inversion. The encoding/decoding process discussed with respect to system 301 may be applied to images or frame(s) of video, which are referred to as Intra frame(s) herein.

Wavelet coders may provide different quality/complexity tradeoffs functionality/flexibility. For example, the wavelet decomposition where only the LL band is split into a quad such that each coefficient in a lower/coarser band has 4 coefficients corresponding to its spatial location in the next higher band. Thus there is unique spatial relationship between coefficients of one band with that of coefficients in a previous band. Furthermore, wavelet coders may exploit the unique structure of wavelet coefficients to provide additional functionality such as image decoding scalability or random access into the bitstream.

Example wavelet coders include an Embedded Zero-tree Wavelet (EZW) coder, a Set Partitioning in Hierarchical Trees (SPIHT) coder, a Set Partitioned Embedded BloCK (SPECK) coder, and an Embedded Block Coding with Optimized Truncation (EBCOT) coder. Table 3 provides examples of significance map coding and entropy coding techniques employed by such wavelet image coders.

TABLE 3

Wavelet based image coders and their coefficient encoding strategies

| Wavelet Image Coder | Significance map coding | Coefficient structures, and Entropy coding |
|---|---|---|
| EZW, SPIHT | Zero-trees | Cross scale trees of coefficients and arithmetic coding |
| SPECK | Set Partitioning | Splitting of a set into subsets and arithmetic coding |
| EBCOT, JPEG2000 | Conditional Coding | Multi-context arithmetic coding of small coefficient blocks. Arithmetic coding. Optimal block truncation |

For example, EZW may be based on the principles of embedded zero tree coding of wavelet coefficients. One of the beneficial properties of wavelet transform is that it compacts the energy of input signal into small number of wavelet coefficients, such as for natural images, most of the energy is concentrated in $LL_k$ band (where k is level of decomposition) as well as remaining energy in High frequency bands ($HL_i$, $LH_i$, $HH_i$) is also contracted in small number of coefficients. For example, after wavelet transformation, there may be few higher magnitude coefficients that are sparse but most coefficients are relatively small (and carry relatively small amount of energy) and thus such coefficients after quantization quantize to zero. Also, co-located coefficients across different bands are related. EZW exploits these properties by using two main concepts, coding of significance maps using zero-trees and successive approximation quantization. For example, EZW may exploit the multi-resolution nature of wavelet decomposition.

Figure 3B:
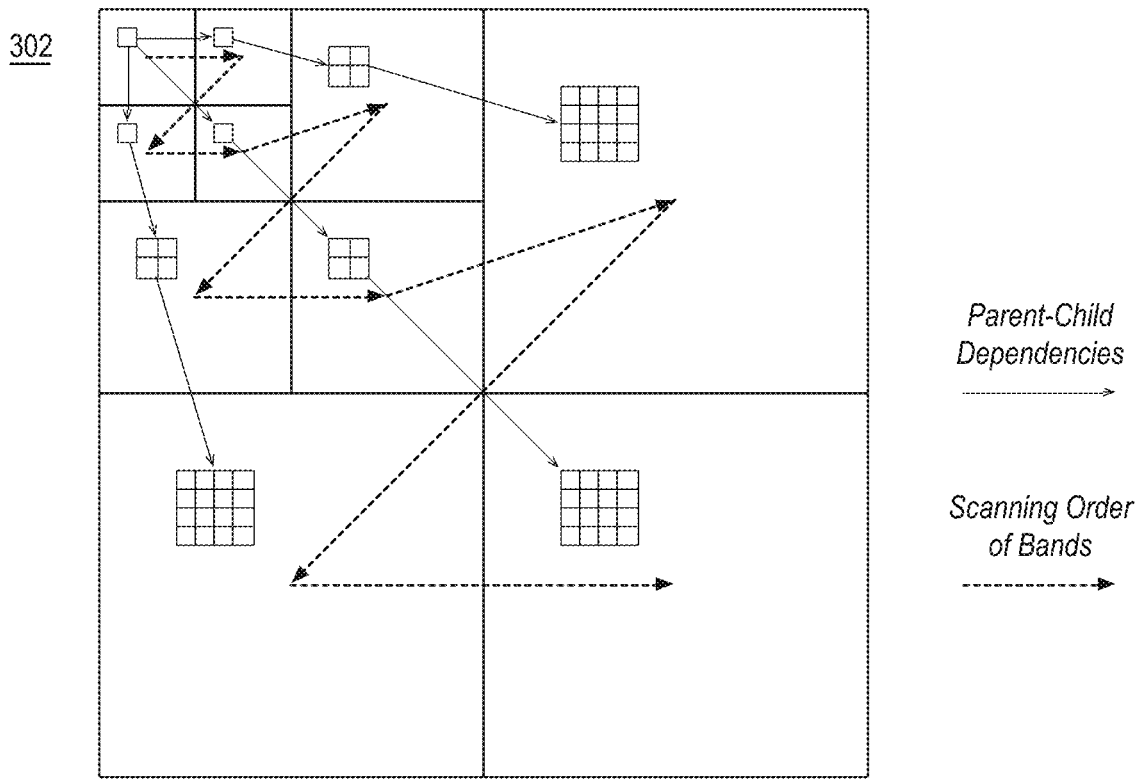
FIG. 3B illustrates a wavelet 3-level octave decomposition into 10 subbands.

FIG. 3B illustrates a wavelet 3-level octave decomposition 302 into 10 subbands, arranged in accordance with at least some implementations of the present disclosure. For example, wavelet 3-level octave decomposition 302 is one more level of decomposition than discussed earlier. As shown in FIG. 3B, a spatial structural relationship between coefficients may be provided in each subband level. For example, each subband coefficient shown by a square in $HL_3$, $LH_3$, and $HH_3$ bands may correspond to a co-located square of 2×2 coefficients in $HL_2$, $LH_2$, and $HH_2$ bands and/or a co-located square of 4×4 subband coefficients in $HL_1$, $LH_1$, and $HH_1$ bands. One way of benefitting from such a structure, for example, is that if a wavelet subband coefficient in a coarser scale (e.g. level 3) is insignificant or zero with respect to a threshold, wavelet coefficients of a same orientation in finer scales (e.g. levels 2 and 1) may also be likely to be insignificant or zero with respect to the same threshold. This allows for forming zero trees (e.g., trees of zero symbols represented by end-of-block indicating zero coefficients across subband scales) that may be very efficiently represented. Such relationships are shown in FIG. 3B as parent-child dependencies between solid line arrows. FIG. 3B also shows (by thick dashed line arrows) an example order of zigzag scanning of subband coefficients across different scales. For example, a zero tree structure may allow for many small coefficients across finer resolution subbands (smaller level number) to be discarded, which may provide significant savings as the tree grows by powers of 4. Furthermore, EZW coding may encodes the obtained tree structure producing bits in order of their importance resulting in embedded coding where an encoder can terminate encoding at any point to meet an encoding target bitrate or the decoder may stop the decoding at any point resulting in a viable but lower quality decoded image at lower than full bitrate.

Furthermore, SPIHT may be based on the principles of set partitioning in hierarchical trees. For example, SPIHT may take advantages of coding principles such as partial ordering by magnitude with a set partitioning sorting algorithm, ordered bitplane transmission, and exploitation of self similarity across different image scales. In some implementations, SPIHT coding may be more efficient than EZW coding. In SPIHT coding, an image may be decomposed by wavelet transform resulting in wavelet transform coefficients that may be grouped into sets such as spatial orientation trees. Coefficients in each spatial orientation tree may be coded progressively from most significant bit planes to least significant bit planes starting with coefficients of highest magnitude. As with EZW, SPIHT may involve two passes: a sorting pass and a refinement pass. After one sorting pass and one refinement pass, which forms a scan pass, the threshold may be halved and the process repeated until a desired bitrate is reached.

Figure 3C:
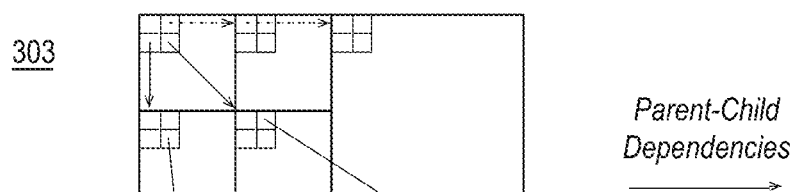
FIG. 3C illustrates a spatial orientation tree.

Due to spatial similarity between subbands, coefficients are better magnitude ordered when one moves down in the pyramid. For example, a low detail area may be likely to be identifiable at the highest level of the pyramid and may be replicated in lower levels at the same spatial location. FIG. 3C illustrates a spatial orientation tree 303, arranged in accordance with at least some implementations of the present disclosure. For example, spatial orientation tree 303 may be a tree structure that defines spatial relationships on the hierarchical tree. In some examples, a spatial orientation tree may be defined in a pyramid created with recursive four band splitting such that each node of a tree defines a pixel and its descendants correspond to pixels of the same spatial orientation in next finer level of pyramid. For example, the tree may be defined in a manner that each node has either no child or four children that form a group of 2×2 adjacent pixels.

Additionally, SPECK coding may be based on the principle of coding sets of pixels in the form of blocks that span wavelet subbands. For example, SPECK may differ from EZW or SPIHT, which instead use trees. SPECK may perform wavelet transformation of an input image or Intra frame and code in 2 phases including a sorting pass and a refinement pass that may be iteratively repeated. In addition to the 2 phases, SPECK may perform an initialization phase. In some examples, SPECK may maintain two linked lists: a list of insignificant sets (LISs) and a list of significant pixels (LISPs).

Figure 3D:
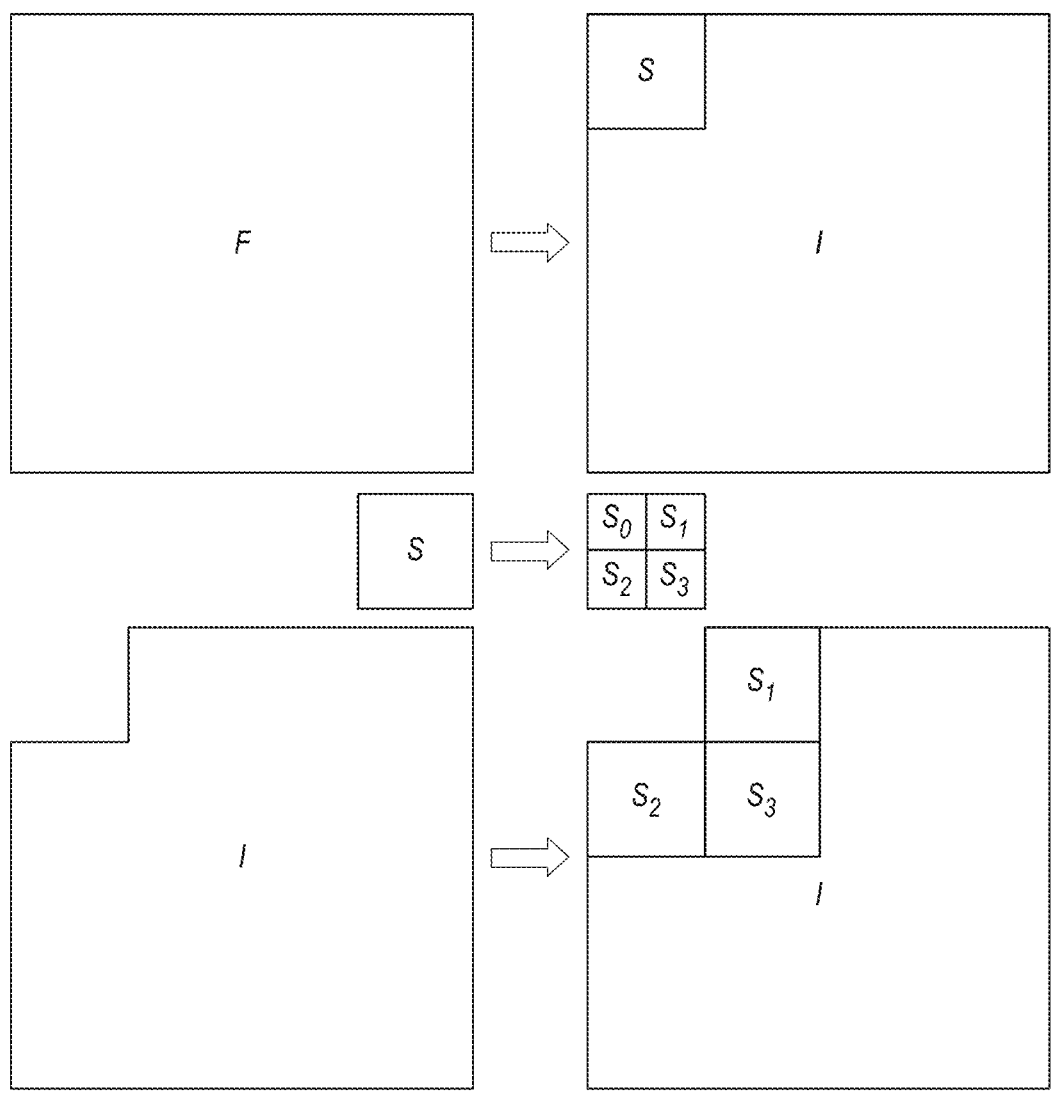
FIG. 3D illustrates an example SPECK encoding process.

FIG. 3D illustrates an example SPECK encoding process 304, arranged in accordance with at least some implementations of the present disclosure. As shown in FIG. 3D, in an initialization phase an input image (e.g., F) may be partitioned into two sets, a set S, and a set I. Set S may represent the root and may be added to LIS. Set I may represent the remaining portion (e.g., F-S). In the sorting pass phase, a significance test may be performed against a current threshold to sort each block of type S in LIS. If S block is significant, it is divided by quadtree partitioning into four subsets, and each subset is treated as a set of type S and processed recursively until the pixel level is reached. The insignificant sets are moved to LIS for further processing. Once the processing of set S is achieved, a significance test is performed against I blocks using the same threshold. If an I block is significant it is divided into four sets, one set having the same type I, and the other sets having the type S. A refinement pass is performed for LSP pixels such that the $n^{th}$ most significant bit is output except for pixels that have been added during the last sorting pass. Furthermore, the threshold may be halved and the coding process may be repeated until an expected bitrate is reached.

Furthermore, EBCOT may include embedded block coding of wavelet subbands that may support features such as spatial scalability (e.g., the ability to decode pictures of various spatial resolutions) and SNR scalability (e.g., the ability to decode pictures of various qualities) from a single encoded bitstream. While the requirement for SNR scalability can also be addressed by EZW and SPIHT coding which do successive approximation or bit plane encoding, both EZW and SPIHT if required to provide spatial scalability would have to modify encoding/bitstream but the resulting bitstream would then not be SNR scalable due to downward inter dependencies between subbands. In some examples, EBCOT addresses these shortcomings by coding each band independently. Furthermore, the coding is made more flexible by partitioning subband samples into small blocks referred to as code blocks with the size of code blocks determining the coding efficiency achievable. For example, independent processing of code blocks may provide for localization and may be useful for hardware implementation.

Figure 3E:
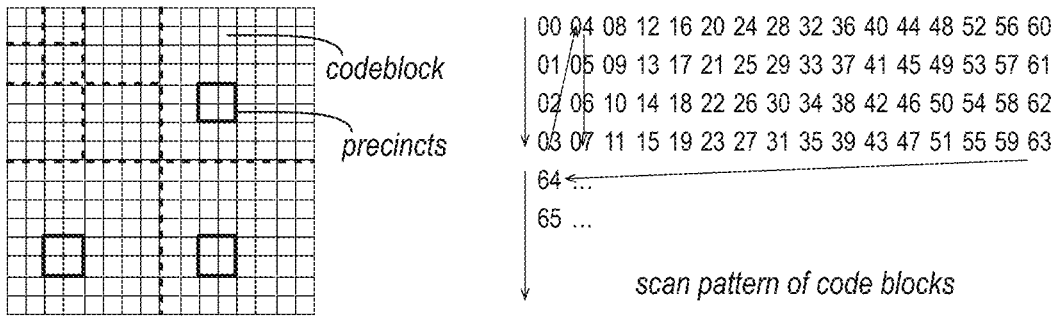
FIG. 3E illustrates an example division of an image or Intra frame.

FIG. 3E illustrates an example division 305 of an image or Intra frame, arranged in accordance with at least some implementations of the present disclosure. As shown in FIG. 3E, an image or Intra frame to be coded may be divided into tiles with each tile wavelet transformed and partitioned into packet partition locations called precincts such that each precinct contains three spatially consistent rectangles one from each subband at each resolution level. Each precinct may be further divided into code blocks that form input to an entropy coder. Within a stripe (e.g., a stripe may be 4 consecutive rows of pixel bits in code block bit plane), samples may be scanned column by column. FIG. 3E also shows, for code blocks that are 16 wide by n high, an example code block scanning process. Starting from top left, a first four bits of a first column may be scanned until the width of the code block is covered. Then, the second four bits of the first column of a next strip may be scanned, and so on.

Figure 4:
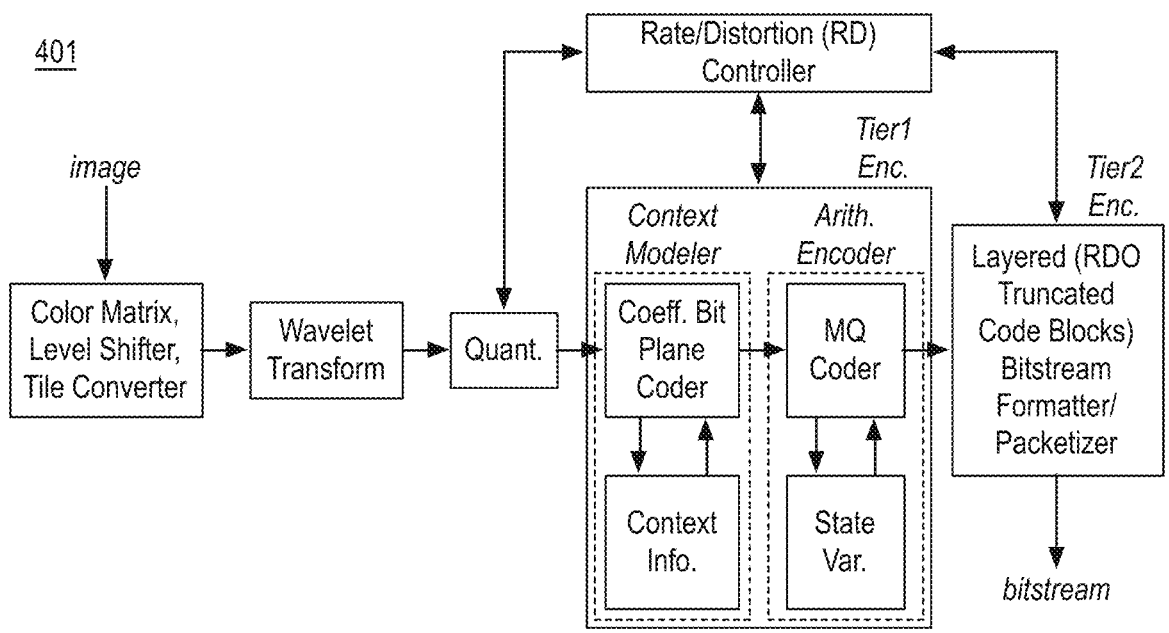
FIG. 4 is a block diagram of an example JPEG2000 encoder.

FIG. 4 is a block diagram of an example JPEG2000 encoder 401, arranged in accordance with at least some implementations of the present disclosure. In some examples, JPEG2000 encoder 401 may be based on EBCOT techniques discussed herein. As shown in FIG. 4, an image or Intra frame (image) to be encoded may undergo preprocessing in a Color Matrix, Level Shifter, Tile Converter" module that may shift pixel values by 128, perform color format conversion, and partition the image into fixed size tiles. Furthermore, a "Wavelet (Analysis) Transform" module may perform 2D wavelet decomposition into bands and coefficients of each subband may be quantized by a "Quantizer" and entropy encoded and layered using a 2 tier encoder. For example, a "Tier 1 Encoder" may include a "Context Modeler" (e.g., including a "Coefficient Bit Plane Coder" and a "Context Information" module) followed by an "Arithmetic Encoder" (e.g., including an "MQ Coder" and a "State Variable" module) and "Tier 2 Encoder" may include a "Layered (RDO Truncated Code Blocks) Bitstream Formatter/Packetizer" that may generate an embedded/scalable bitstream that is then packetized.

An example JPEG 2000 decoder (not shown) may reverse the order of operations of the encoder, starting with a bitstream to be decoded input to "Tier 2 Decoder" including a "DePacketizer and Bitstream Unformatter" followed by entropy decoding in a "Tier 1 (Arithmetic) Decoder", the output of which may be provided to an "Inverse Quantizer" and then to a "Wavelet (Synthesis) Transform" module and then to a "Tiles Unformatter, Level Unshifter, and Color Inverse Matrix" postprocessor that may output the decoded image.

JPEG2000 was finalized in 2000 by the ISO/WG1 committee. The original JPEG image coding standard was developed in 1992 as ITU-T Rec. T.81 and later adopted in 1994 by the same ISO committee. While the JPEG2000 standard provided significant improvements over the original JPEG standard, it may include shortcomings such as complexity, limited compression performance, difficulties in hardware implementation, and scalability at the expense of compression efficiency. Furthermore, the original JPEG standard that uses fixed block size transform coding is still the prevalent image coding standard in use to this day. However, the original JPEG standard has shortcomings such as limited compression performance.

The techniques discussed herein provide a new intra coding approach that is bitrate efficient and scalable such that from a single encoded stream subsets of it may be independently decoded. Furthermore, a subset of the encoded stream (e.g. the LL subband) may be compatible with the High Efficiency Video Coding (HEVC) video intra coding standard. Such techniques may provide advantages including interoperability with an established standard and benefits of scale from readily available hardware implementations. Such techniques may combine advantages from wavelet and transform coding such that the global redundancies are exploited by wavelet processing and the local redundancies are exploited by adaptive transform coding. In terms of compression efficiency, the techniques discussed herein may be about 35% higher than current techniques such as the JPEG2000 standard. Furthermore, as discussed, the techniques discussed herein may provide several other advantages over current techniques such as the JPEG2000 standard.

Figure 5A:
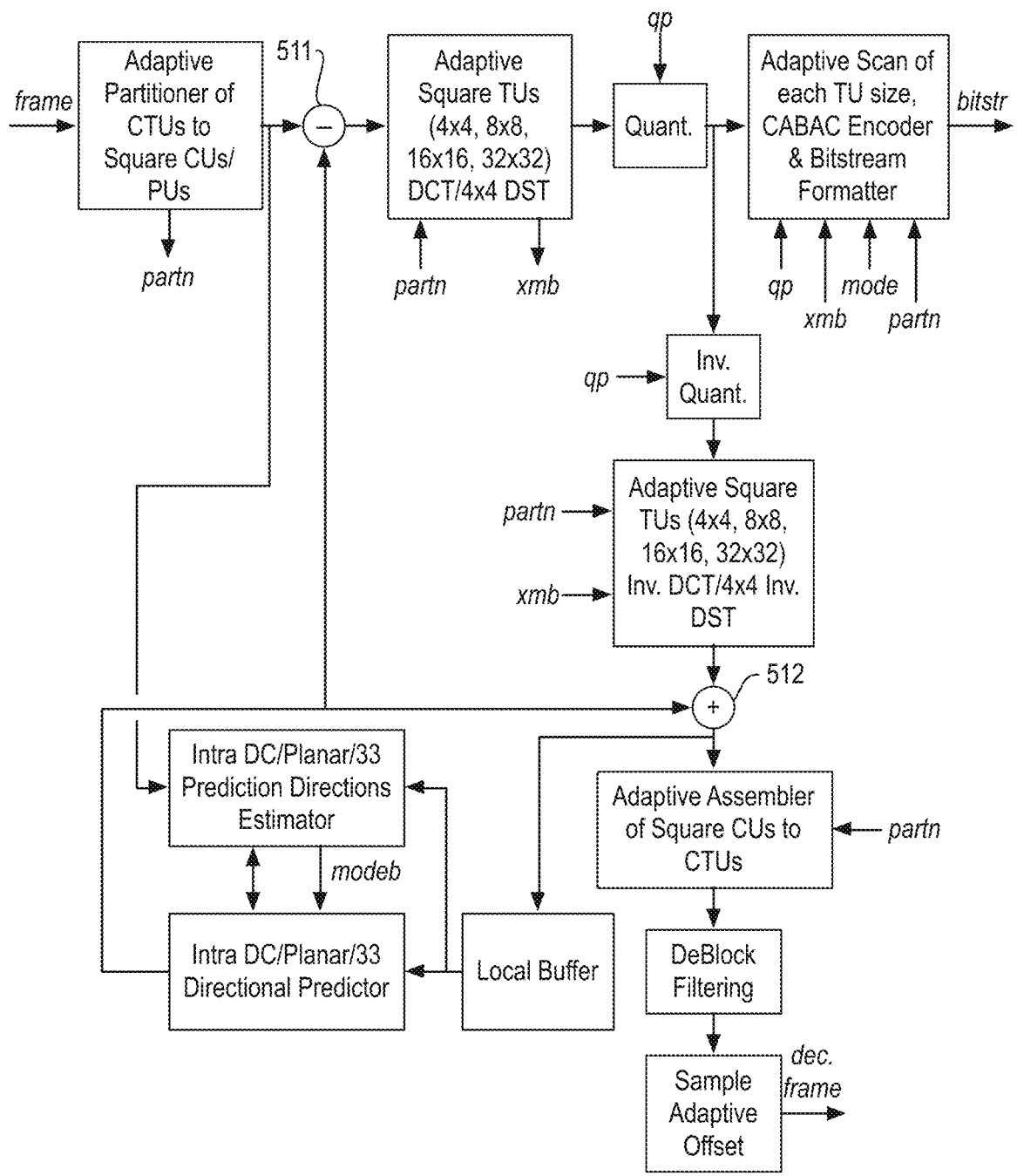
FIG. 5A is a block diagram of an example HEVC Main 10 intra encoder.

FIG. 5A is a block diagram of an example HEVC Main 10 intra encoder 501, arranged in accordance with at least some implementations of the present disclosure. For example, FIG. 5A may provide an HEVC Main Intra Encoder that may be used for transform encoding of blocks of pixels or transform encoding of blocks of wavelet LL band data. As shown, an input frame (frame) may be first partitioned into large blocks referred to as largest coding unit (LCUs) or coding tree units (CTUs) typically of size 64×64 (although 32×32 and 16×16 sizes may also be provided). For intra coding, such large blocks (LCUs) may be adaptively partitioned into coding units (CUs) of various sizes such as 32×32, 16×16, and 8×8 by an "Adaptive Partitioner of CTUs to Square CUs/PUs". Such partitioning may be performed based on content and bit rate analysis or rate distortion optimization (RDO) details or the like (not shown). Furthermore, for intra coding, the CUs may be divided into square prediction units (PUs) down to 4×4 blocks by the "Adaptive Partitioner of CTUs to Square CUs/PUs". For a PU of an input video/image frame, an intra prediction block of the same size may be generated by an "Intra DC/Planar/33 Directional Predictor". For example, a block may be predicted by 35 different candidate predictions (e.g., DC, planar, and 33 directions) that may be generated from neighboring decoded blocks by a "Intra DC/Planar/33 Prediction Directions Estimator". As shown, a prediction error block may be generated at the output of a differencer 511 based on a difference between the block of the input video/image frame and the intra prediction block. The difference (e.g., a residual block or error blocks the like) may be transform coded. For example, for intra coding, transform blocks of 32×32, 16×16, 8×8, and 4×4 may be supported with the PU size inherited for transform coding. As far as transforms themselves, all DCT approximation transforms may be available for all TU block sizes and, for 4×4 block size, a DST approximation transform may also be available. As shown, a "Adaptive Square TUs (4×4, 8×8, 16×16, 32×32) DCT/4×4 DST" module may perform a transform of the difference block. The resultant transform coefficient block generated by the forward transform may be quantized by a "Quantizer" and the quantized coefficients may be scanned and entropy coded with a CABAC entropy encoder at an "Adaptive scan of each TU size, CABAC Encoder & Bitstream Formatter". Different types of overhead data and control signals may also be entropy encoded such as partn, mode, xmb, and qp to provide a bitstream (bitstr). Since the described encoder includes prediction, it provides a feedback loop (e.g., a local decode loop) that may dequantize quantized transform coefficients at an "Inverse Quantizer". The dequantized transform coefficients may be inverse transformed of the same size and transform type used for forward transform at an "Adaptive Square TUs (4×4, 8×8, 16×16, 32×32) Inverse DCT/4×4 Inverse DST" module. At adder 512, decoded error blocks may be added to prediction blocks resulting in reconstructed blocks. As shown neighboring reconstructed blocks may be used for prediction of a current block being encoded and such neighboring reconstructed blocks may be stored in a "Local Buffer" and used to form the aforementioned 35 candidate predictions by the "Intra DC/Planar/33 Prediction Directions Estimator". The reconstructed blocks are also assembled in CUs and CTUs by an "Adaptive Assembler of Square CUs to CTUs" to assemble the locally decoded frame that may be deblock filtered at a "DeBlock Filtering" module and Sample Adaptive Offset (SAO) filtered at a "Sample Adaptive Offset" module and provided for output (dec. frame).

Figure 5B:
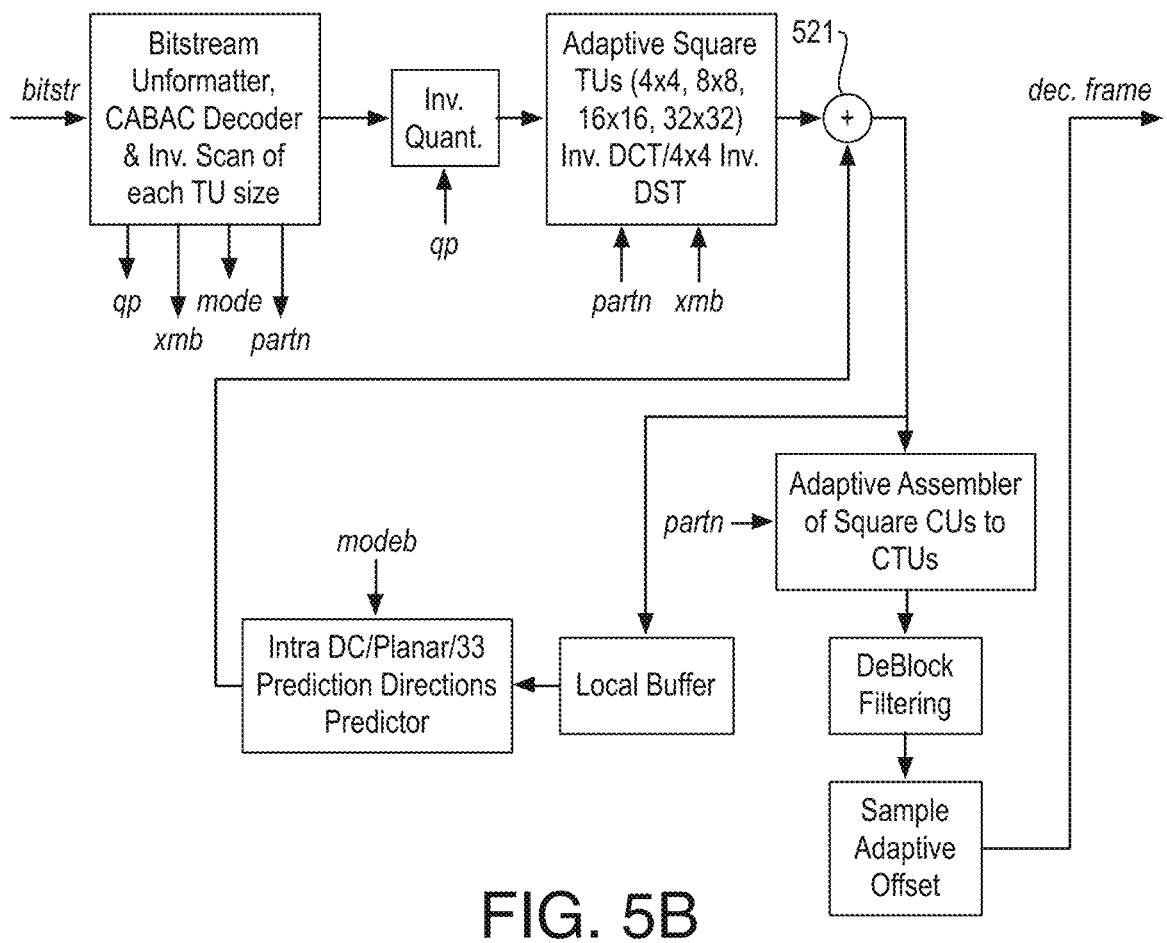
FIG. 5B is a block diagram of an example HEVC Main 10 intra decoder.

FIG. 5B is a block diagram of an example HEVC Main 10 intra decoder 502, arranged in accordance with at least some implementations of the present disclosure. For example, FIG. 5B may provide an HEVC Main Intra Decoder that may be used to decode corresponding HEVC Main Intra encoded streams. Furthermore, decoder of FIG. 5B may function identically to the local feedback loop described with respect to the HEVC Main 10 encoder. As shown, an HEVC Main 10 encoded bitstream (bitstr) may be input to a "Bitstream Unformatter, CABAC Decoder & Inverse Scan of each TU size" module that may extract and decode overhead data and control signals (e.g., that are then made available to different processing blocks as shown) and decode and inverse scan quantized transform coefficients. Such quantized transform coefficients may be inverse quantized by an "Inverse Quantizer" and the resultant transform coefficients may be inverse transformed using the transform and block size used at the encoder by an "Adaptive Square TUs (4×4, 8×8, 16×16, 32×32) Inverse DCT/4×4 Inverse DST" module resulting in decoded prediction error blocks that, as shown, may provide one input to an adder 521. At the other input to adder 521, is a prediction signal or block that may be generated, for example, in up to 35 different ways such as DC, planar, and any of 33 directions. For example, for every block being predicted modeb information in the bitstream may identify which of 35 possible predictions needs to be generated and the prediction block may be generated by an "Intra DC/Planar/33 Prediction Directions Predictor" based on reconstructed neighboring blocks stored at a "Local Buffer". For example, the reconstructed frame blocks/CUs in the "Local Buffer" are generated at the output of adder 521 and such reconstructed neighboring blocks (e.g., to a block being decoded) may be stored in the "Local Buffer" that may be used to generate prediction. The reconstructed frame blocks/CUs may also be input to an "Adaptive Assembler of Square CUs to CTUs" that may assemble reconstructed blocks/CUs to generate CTUs and thus the full reconstructed frame. The reconstructed frame may be deblock filtered at a "Deblock Filtering" module and sample adaptive offset filtered by at a "Sample Adaptive Offset" module to generate an output image or frame (dec. frame).

Discussion now turns to scalable an HEVC encoding system capable of two-layer spatial/SNR scalable video coding. Such a system may be extended to more than 2 layers, such as a 3 layer system that may use a single base layer and two enhancement layers with enhancement layer 1 using decoded base layer for prediction and enhancement layer 2 using enhancement layer 1 for prediction.

Figure 6A:
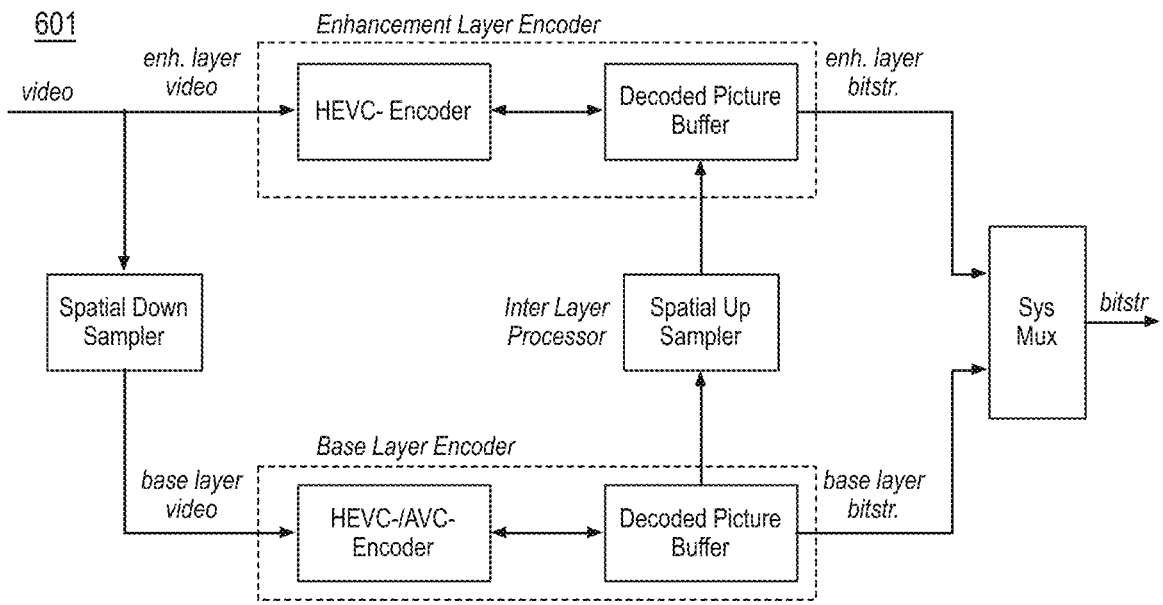
FIG. 6A is a block diagram of an example two layer spatial/SNR scalable encoding system.

FIG. 6A is a block diagram of an example two layer spatial/SNR scalable encoding system 601, arranged in accordance with at least some implementations of the present disclosure. As shown, two layer spatial/SNR scalable encoding system 601 may include a base layer encoder and an HEVC enhancement layer encoder. The base layer encoder may be an HEVC or AVC or an MPEG-2 encoder or the like and the enhancement layer encoder may be an encoder as discussed with respect to FIG. 5A with the capability of using reference pictures (or upsampled decoded base layer pictures) from a base layer encoder as additional reference pictures. For illustration, FIG. 6A provides a base layer encoder that is shown separated into two parts, components, or modules: an "HEVC-"/AVC-Encoder" (e.g., an HEVC or AVC encoder without its decoded picture buffer) and a "Decoded Picture Buffer". Similarly, the enhancement layer encoder is shown as an "HEVC-Encoder" with a separated "Decoded Picture Buffer". The "Decoded Picture Buffer" of the enhancement layer may provide for the possibility of use of past decoded pictures of the enhancement layer as reference as well as use of an upsampled base layer picture as reference. As shown, such a two layer architecture may include, downsampling input video (video) by a "Spatial Down Sampler", encoding the downsampled lower resolution frame(s) (base layer video)) (e.g., at a lower bitrate) by the base layer encoder, which may generate local decoded frame(s) that may be upsampled by a "Spatial Up Sampler" as implemented by an "Inter Layer Processor" and using such upsampled frame(s) as another reference for prediction. The base and enhancement layer bitstreams (base layer bitstr. and enh. layer bitstr.) may be multiplexed by "System Muxer" and delivered as a single scalable stream (bitstr) to a scalable HEVC decoder.

While much of the process we just described applies to scalable video coding, the same process can also be used for scalable coding of intra frames. For example, HEVC intra frame coding may use prediction from previous decoded neighboring region of the same frame rather than past decode frames. When scalable HEVC encoder performs intra frame coding it can adaptively use on PU basis prediction from neighboring decoded block region(s) in a current frame and upsampled co-located PU(s) from a base layer (e.g., based on which prediction works the best).

Figure 6B:
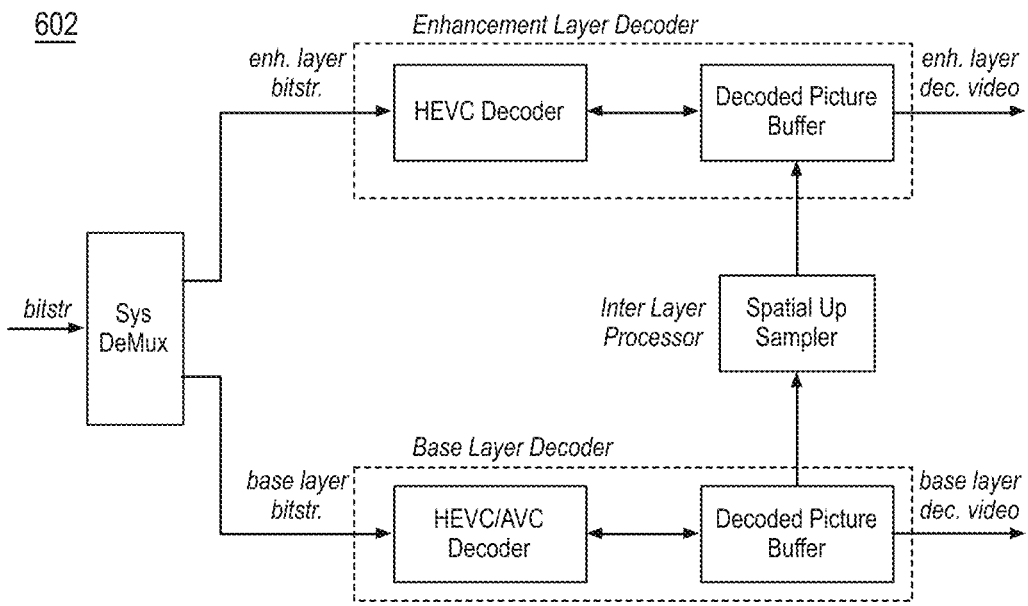
FIG. 6B is a block diagram of an example two layer spatial/SNR scalable decoding system.

FIG. 6B is a block diagram of an example two layer spatial/SNR scalable decoding system 602, arranged in accordance with at least some implementations of the present disclosure. As shown, two layer spatial/SNR scalable decoding system 602 may include a base layer decoder and an HEVC enhancement layer decoder capable of decoding scalably encoded bitstreams from the two layer scalable encoding system of FIG. 6A. As shown, from a single scalably encoded bitstream (bitstr), a decoder with lower capabilities may decode only the base layer at lower resolution/quality frame(s), while a decoder with higher capabilities may decode the higher layer full resolution/quality frame(s). It should be noted that in such scalable decoding of higher layer frame(s) it is also inherently necessary to decode base layer frame(s). In terms of the operation of decoder of FIG. 6B, if only decoding of base layer stream is necessary (e.g., based on user input or resources available or the like), the "System Demuxer" may extract the base layer stream (base layer bitstr.) and provide it to the base layer decoder (which may include fully compatible HEVC or AVC decoder "HEVC/AVC Decoder" depending on which video standard was used for encoding at the encoder and a "Decoded Picture Buffer"). The lower resolution/quality decoded frames (base layer dec. video) at the output of base layer decoder may be further processed (say up sampled to full size, and perhaps reordered if necessary) and sent to display. If full resolution/higher layer is needed or requested to be decoded, decoding both the base and enhancement layers may be provided. For example, the base layer decoding may be provided just as described. To generate a decoded higher layer at full resolution/quality, the "System Demuxer" may provide a demultiplexed enhancement layer bitstream (enh. layer bitstr.) to the enhancement layer decoder. The enhancement layer decoder may also receive an up sampled version of decoded base layer frame(s) for prediction from a "Spatial Up Sampler" as implemented by an "Inter Layer Processor. The decoding process at the enhancement layer decoder may be identical to local decoding process at the encoder as discussed herein. For example, the decoded enhancement layer frame(s) may form the final higher resolution/quality layer (enh. layer dec. video) that may be further processed (such as frame reordered) for display.

The described decoding process is applicable to inter-frame video decoding and intra video decoding. In the case of intra video decoding, the HEVC intra decoder may use, at the enhancement layer decoder, prediction from decoded neighboring blocks of a current frame and/or co-located, upsampled decoded blocks of the same frame from a base-layer.

Figure 7A:
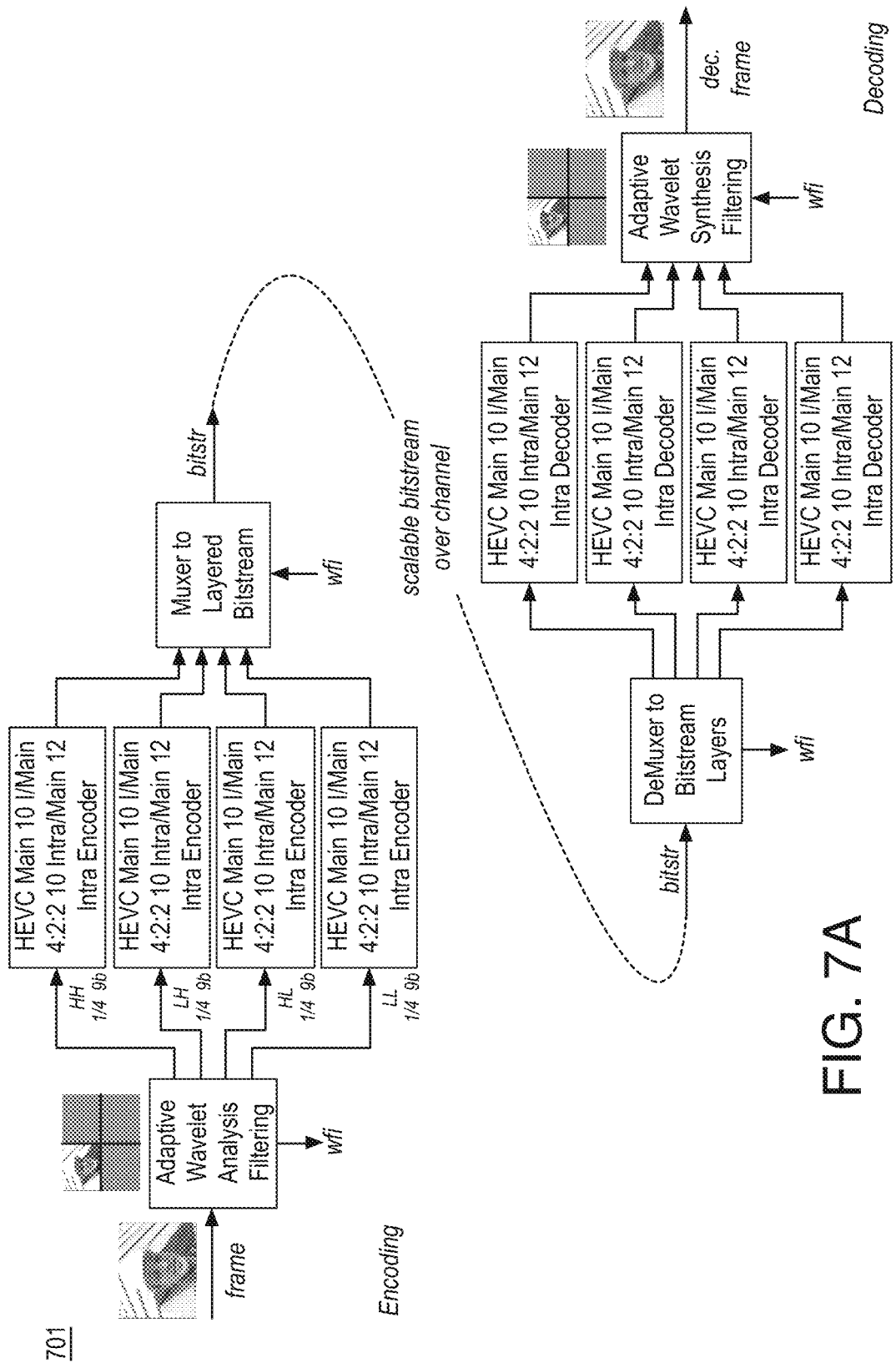
FIG. 7A is a block diagram of an example one level Adaptive Wavelet HEVC (AWHVC) coder.

FIG. 7A is a block diagram of an example one level Adaptive Wavelet HEVC (AWHVC) coder, arranged in accordance with at least some implementations of the present disclosure. For example, FIG. 7A may provide an example 1 level Adaptive Wavelet HEVC (AWHVC) Intra that combines 1 Level Adaptive Wavelet Analysis/Synthesis and an HEVC Intra coder such as a Main10 I Picture coder, a Main 4:2:2 10 Intra, or a Main 12 Intra Encoder/Decoder. For example, due to decomposition of an image/video frame into 4 bands prior to HEVC coding, the illustrated system may provide basic (e/g/. 2:1) spatial scalability As shown, at the encoding side, an input video (or image) YUV frame (frame) may undergo adaptive wavelet decomposition at an "Adaptive Wavelet Analysis Filtering". For example, the adaptive wavelet decomposition may use a filter set from a codebook of filter-sets with selection of the filter based on application (e.g., resolution, content, and bitrate). Using the selected filter set, the process of analysis filtering may be performed for one level decomposition that may convert the frame into LL, HL, LH, and HH subbands, each of which are one-quarter in size and with a bit depth of 9 bits (assuming 8 bit input video or image). As shown, the LL subband may be encoded by an HEVC Main 10 I/Intra encoder or the like (e.g., "HEVC Main 10 I/Main 4:2:2 10 Intra/Main 12 Intra Encoder"). The HL, LH, and HH subbands may be encoded with HEVC Main 10 I/Intra encoders or the like (e.g., respective "HEVC Main 10 I/Main 4:2:2 10 Intra/Main 12 Intra Encoder"). The outcome of such encoding processing may include four individual bitstreams such as an LL bitstream, an HL bitstream, an LH bitstream, and an HH bitstream that may be multiplexed by a "Muxer to Layered Bitstream" into a single bitstream (bistr) along with headers including an index of the selected wavelet filter set (wfi). As shown, the bitstream may be transmitted over a channel such as a communications channel or the like. In other examples, the bitstream may be stored in memory. Any discussion of such bitstream conveyance over a channel as discussed or illustrated herein may include such transmission or storage of a bitstream.

As also shown in FIG. 7A, at a decoding side, a bitstream (bistr) may be received. Based on the bitstream, a "DeMuxer to Bitstream Layers" may decode headers including an index of a selected wavelet filter set and the bitstream may be demultiplexed into individual LL, HL, LH, and HH bitstreams. The LL bitstream may be provided to an HEVC Main 10 I/Intra decoders or the like (e.g., "HEVC Main 10 I/Main 4:2:2 10 Intra/Main 12 Intra Decoder") and decoded to generate a subband. Similarly, the remaining 3 (HL, LH and HH) bands may also be provided to HEVC Main 10 I/Intra decoders (e.g., "HEVC Main 10 I/Main 4:2:2 10 Intra/Main 12 Intra Decoder"). Furthermore, all four quarter size decoded subbands may be combined using a matching filter set (e.g., as indicated by the index decoded from the bitstream) at an "Adaptive Wavelet Synthesis Filtering". The process of combination of such subbands may be characterized as synthesis filtering and may provide a full resolution/size final reconstructed video (or image) frame (dec. frame) for display.

Figure 7B:
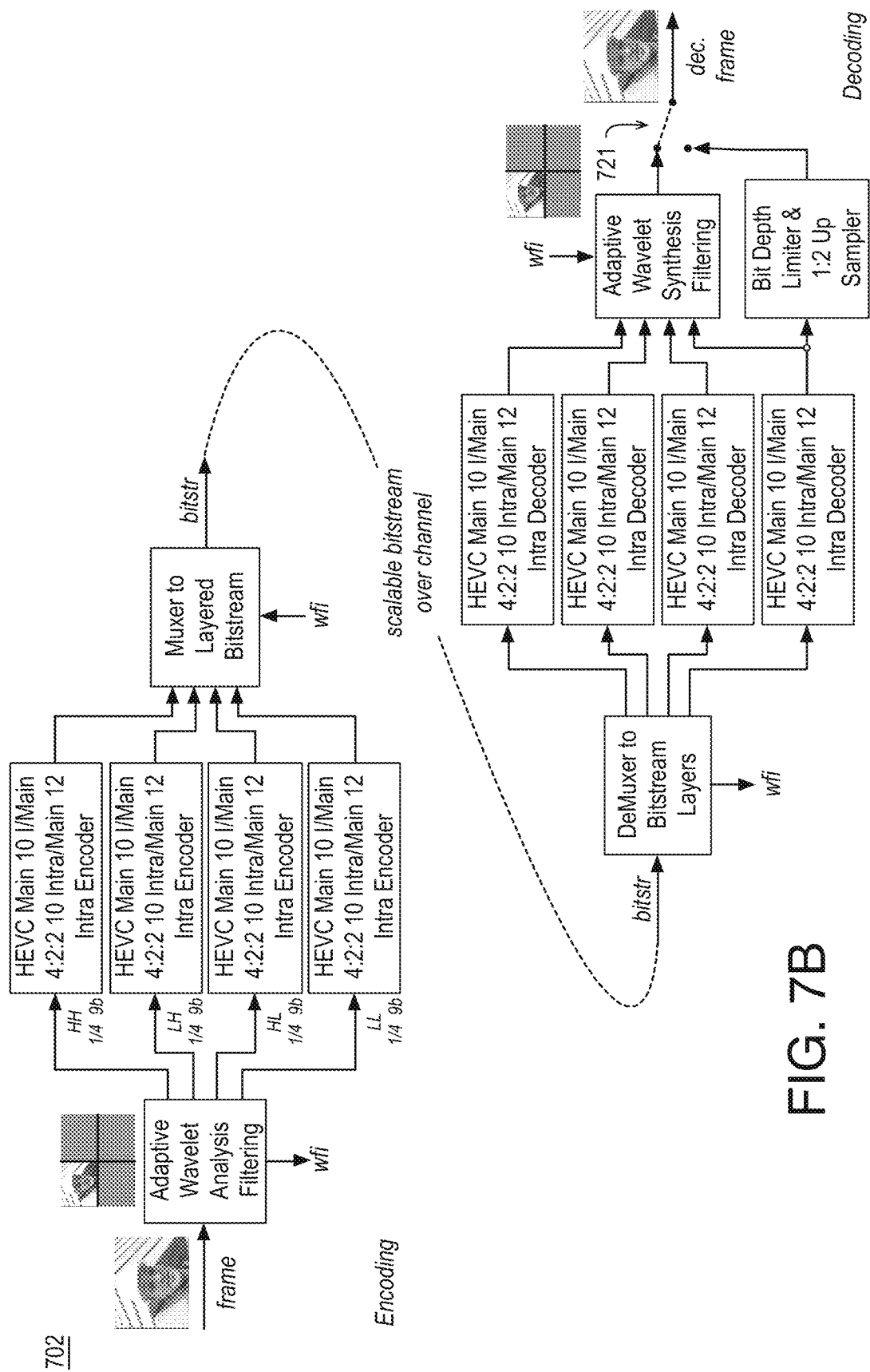
FIG. 7B is a block diagram of another example one level scalable Adaptive Wavelet HEVC (AW1HVC) coder.

FIG. 7B is a block diagram of another example one level scalable Adaptive Wavelet HEVC (AW1HVC) coder 702, arranged in accordance with at least some implementations of the present disclosure. For example, FIG. 7B may provide a 1 level scalable Adaptive Wavelet HEVC (AW1HVC) Intra codec combines 1 Level Adaptive Wavelet Analysis/Synthesis with an HEVC Intra coder such as Main10 I Picture coder or Main 4:2:2 10 Intra or Main 12 Intra Encoder/Decoder with control on whether the LL band only or all 4 bands are to be decoded. As shown, at the encoding side, an input video (or image) YUV frame (frame) may undergo adaptive wavelet decomposition by an "Adaptive Wavelet Analysis Filtering". Such adaptive wavelet decomposition may use a filter set from a codebook of filter-sets with selection of filter based on application (e.g., resolution, content, and bitrate). Using the selected filter set, the process of analysis filtering may be performed for one level decomposition that may convert the frame into LL, HL, LH, and HH subbands, each of which are one-quarter in size and with bit depth of 9 bits (assuming 8 bit input video or image). The LL subband may be encoded by an HEVC Main 10 I/Intra encoder or the like (e.g., "HEVC Main 10 I/Main 4:2:2 10 Intra/Main 12 Intra Encoder"). Furthermore, the HL, LH, and HH subbands may be encoded with HEVC Main 10 I/Intra encoders (e.g., respective "HEVC Main 10 I/Main 4:2:2 10 Intra/Main 12 Intra Encoder"). The outcome of such encoding processing may include four individual bitstreams such as an LL bitstream, an HL bitstream, an LH bitstream, and an HH bitstream that may be multiplexed by a "Muxer to Layered Bitstream" into a single scalable bitstream (bistr) with headers including an index of the selected wavelet filter set (wfi).

As also shown in FIG. 7B, at the decoding side, a bitstream (bistr) may be received. Based on the bitstream, a "DeMuxer to Bitstream Layers" may decode headers including an index of a selected wavelet filter set that may be decoded and the bitstream may be demultiplexed into individual LL, HL, LH, and HH bitstreams. The demultiplexed LL bitstream may be provided to an HEVC Main 10 I/Intra decoder (e.g., "HEVC Main 10 I/Main 4:2:2 10 Intra/Main 12 Intra Decoder"). Depending on an output selection based on user input, a system selection, or the like as implemented by a switch 721, low resolution decoded video (or image) frame (dec. frame) may be provided for display after optional bit depth limiting and/or upsampling by 2 in each dimension by a "Bit Depth Limiter & 1:2 Up Sampler". If the output selection (e.g., from a user or the system or the like) selects a full resolution video (or image) frame, the remaining 3 (HL, LH and HH) bands may be provided to corresponding custom HEVC Main 10 I/Intra decoders (e.g., respective "HEVC Main 10 I/Main 4:2:2 10 Intra/Main 12 Intra Decoder") and all four, quarter size decoded subbands may be combined using a matching filter set (e.g., as indicated by the index decoded from the bitstream) by an "Adaptive Wavelet Synthesis Filtering". Such a process of combination of bands may be characterized as synthesis filtering and may provide a full resolution/size final reconstructed video (or image) frame (dec. frame) for display.

Figure 8A:
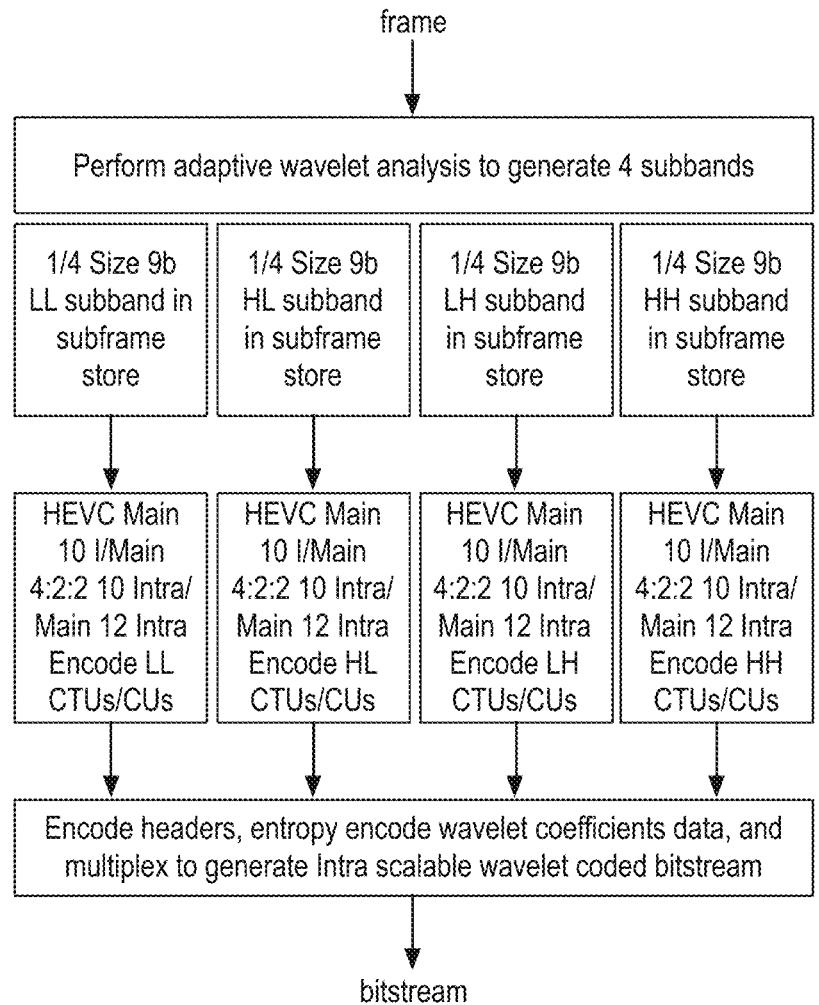
FIG. 8A illustrates an example process for AW1HVC Intra Encoding.

FIG. 8A illustrates an example process 801 for AW1HVC Intra Encoding, arranged in accordance with at least some implementations of the present disclosure. As shown, an input video (or image) frame (labeled "frame") may undergo one-level adaptive wavelet analysis filtering (at the operation labeled "Perform adaptive wavelet analysis to generate 4 subbands") that may allow for a choice of best suited wavelet filter set depending on the application (e.g., resolution, content and bitrate) parameters. The analysis filtering process may result in four subbands with each subband being $\frac{1}{4}^{th}$ in size of the input frame and including subband coefficients (e.g., also referred to as subband pixels or samples) that are of 9 bit in accuracy when pixels of input frame are of 8 bit accuracy. Each of the generated subbands may be stored in respective one-quarter size subframe stores (at the operations labeled "¼ Size 9b LL/HL/LH/HH subband in subframe store") and partitioned into LCUs and CUs. Blocks of the LL subband may be coded by HEVC Main 10 I/Intra encoder or the like (at the operation labeled "HEVC Main 10 I/Main 4:2:2 10 Intra/Main 12 Intra Encode LL CTUs/CUs"). The blocks of HL, LH, and HH subbands may be coded by HEVC Main 10 I/Intra encoder(s) (at the operations labeled "HEVC Main 10 I/Main 4:2:2 10 Intra/Main 12 Intra Encode HL/LH/HH CTUs/CUs"). The individual generated bitstreams from such HEVC Main 10 I/Intra or HEVC Main 10* I/Intra encoders may be combined with headers including a header that signals the wavelet filter set used for analysis and multiplexed (at the operation labeled "Encode headers, entropy encode wavelet coefficients data, and multiplex to generate Intra scalable wavelet coded bitstream") to generate a single AW1HVC coded bitstream (labeled "bitstream") for storage or transmission. Such encoding techniques may generate a scalable bitstream in which the LL subband bitstream may be decoded independently or all four subbands may be decoded together.

Figure 8B:
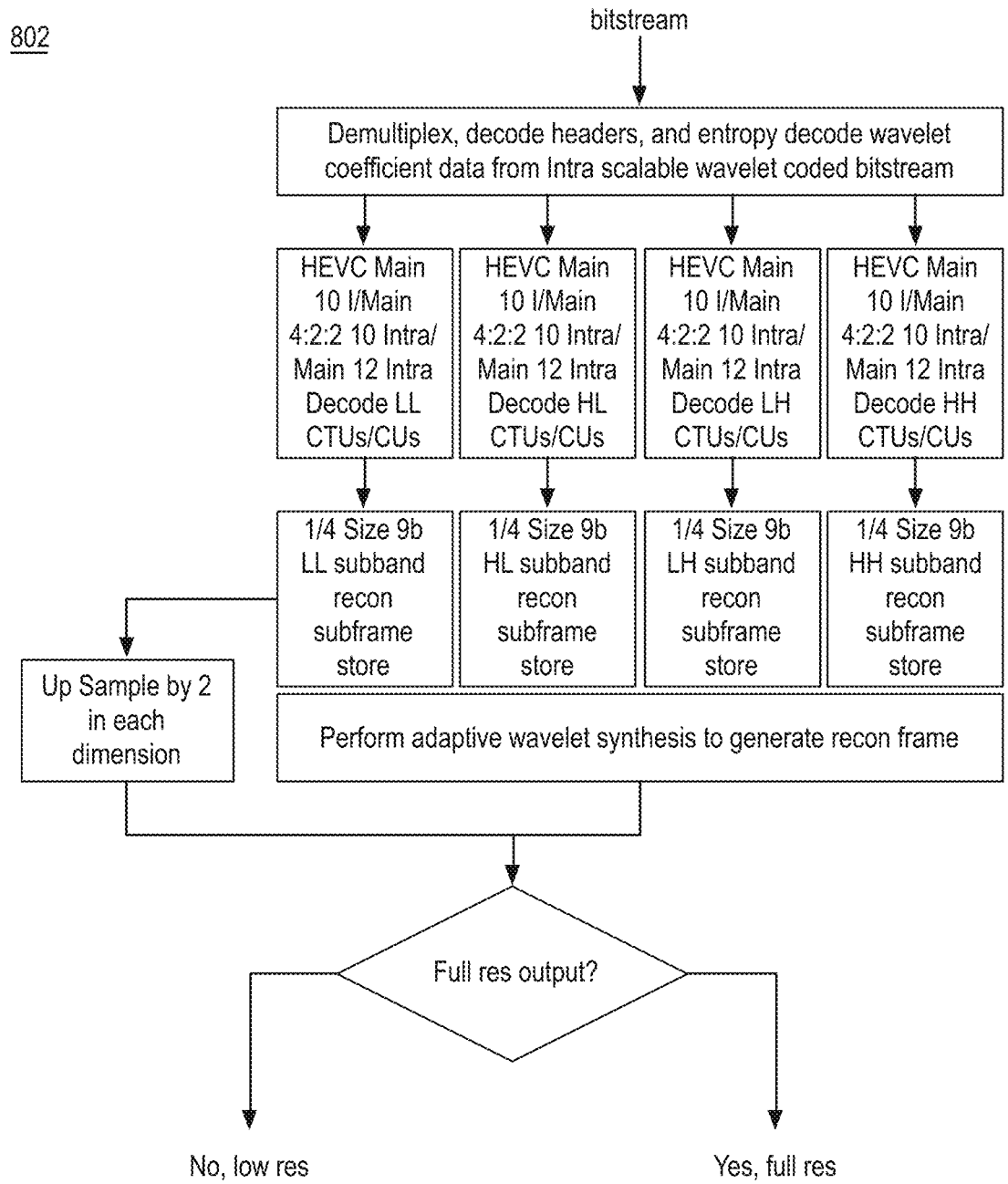
FIG. 8B illustrates an example process for AW1HVC Intra Decoding that inverts the process performed by AW1HVC Intra encoding.

FIG. 8B illustrates an example process 802 for AW1HVC Intra Decoding that inverts the process performed by AW1HVC Intra encoding, arranged in accordance with at least some implementations of the present disclosure. As shown an AW1HVC Intra bitstream (labeled "bitstream") may be received and headers may be decoded including decoding information on a wavelet filter set used for wavelet analysis at the encoder and the remaining bitstream may be demultiplexed (at the operation labeled "Demultiplex, decode headers, and entropy decode wavelet coefficient data from Intra scalable wavelet coded bitstream") into each of individual LL, HL, LH, and HH bitstreams. If an output selection by a user or system selects low resolution output (as provided by the decision operation labeled " "), the LL subband may be HEVC Main 10 I/Intra decoded (at the operation labeled "HEVC Main 10 I/Main 4:2:2 10 Intra/Main 12 Intra Decode LL CTUs/CUs"), bit depth limited, and optionally upsampled (at the operation labeled "Up Sample by 2 in each dimension") to generate a low resolution upsampled video/image frame that may be output for display (labeled "No, low res"). If the output selection selects or requires full resolution output, each of the remaining subbands may be decoded by HEVC Main 10 I/Intra decoders or the like (at the operations labeled "HEVC Main 10 I/Main 4:2:2 10 Intra/Main 12 Intra Decode HL/LH/HH CTUs/CUs") and, including the decoded LL band, all four subbands may be stored in sub-frame stores (at the operations labeled "¼ Size 9b LL/HL/LH/HH subband recon subframe store"). Based on the decoded header indicating the wavelet filter set used for wavelet analysis filtering, a matching wavelet synthesis filter set may be determined. The decoded LL, HL, LH, and HH subbands from sub-frame stores may undergo frame synthesis using these filters (at the operation labeled "Perform adaptive wavelet synthesis to generate recon frame") to combine the decoded subbands resulting in a full reconstructed video/image frame that may be output for display (labeled "Yes, full res"). As discussed, such conditional decoding where either a low resolution output or a full resolution output is decoded from the same bitstream depending on output selection (e.g., due to decoding resource limitations, etc.) may be referred to as scalable decoding and may be possible due to scalable (e.g., embedded) encoding that may be performed due to wavelet coding. The scalability discussed with respect to FIG. 8B may provide 2 layers: a one quarter resolution layer and a full resolution layer.

Figure 9A:
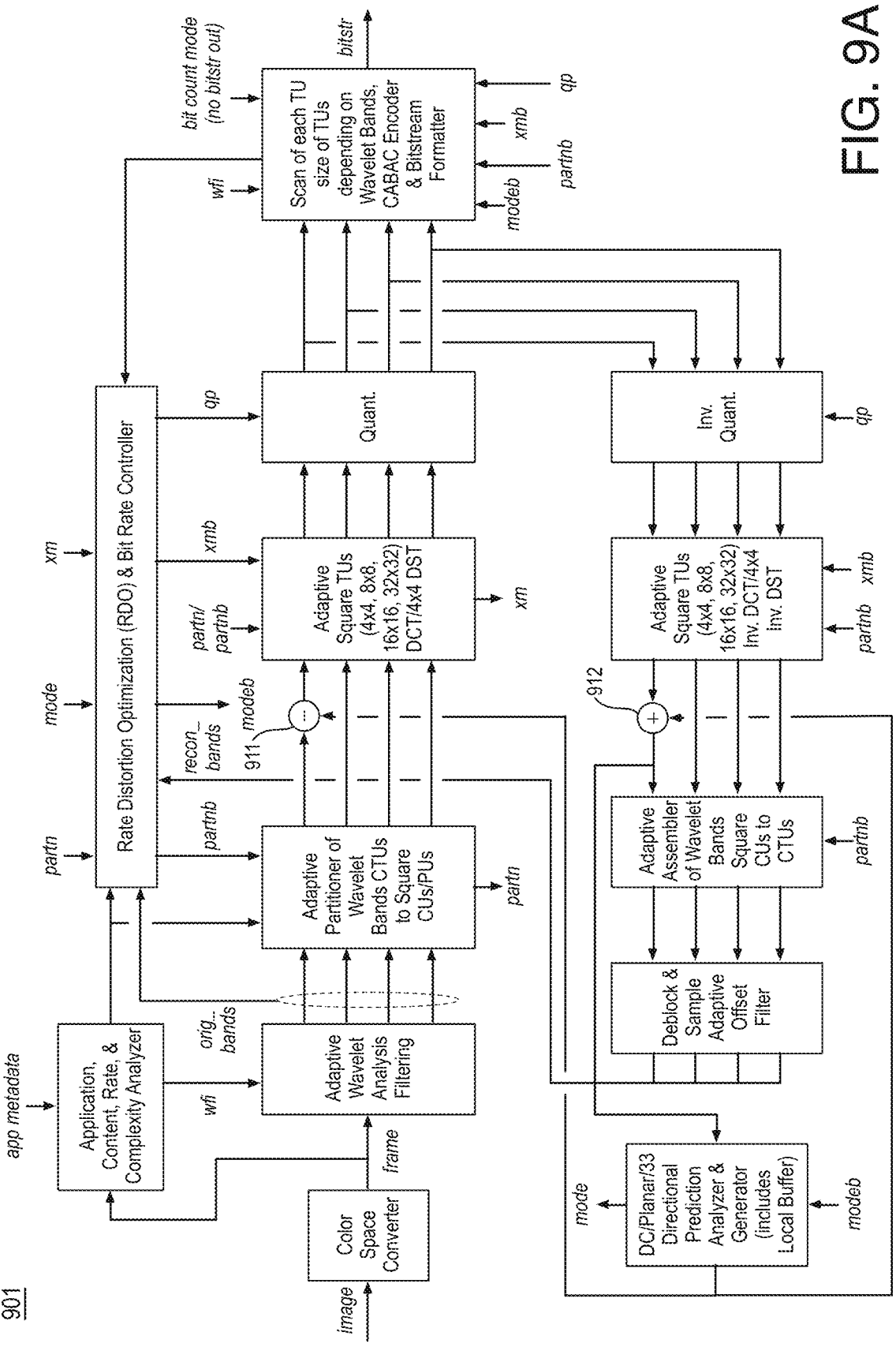
FIG. 9A is a block diagram of an example AWHVC Intra Encoder.

FIG. 9A is a block diagram of an example AWHVC Intra Encoder 901, arranged in accordance with at least some implementations of the present disclosure. As shown, an input image (image) may be color converted by a "Color Space Converter" from RGB to a YUV frame (frame) (if the input is a YUV video frame rather than an RGB image then this step is not needed). Furthermore, without loss of generality it is assumed that YUV frame is of 4:2:0 format (e.g., U and V resolutions are one-half of that of Y both in horizontal and vertical direction). Based on an evaluation of application parameters (e.g., image/frame resolution, bitrate) and content (e.g., complexity) by an "Application, Content, Rate & Complexity Analyzer," wavelet decomposition/analysis filters may be selected, quality and rate targets may be set, partitioning of bands may be regulated, and bitrate control may be performed.

As shown, the YUV frame may undergo one level wavelet decomposition (using wavelet filter pair selected based on application/resolution) into LL, HL, LH, and HH subbands by the "Adaptive Wavelet Analysis Filtering" unit, and then content of each LCU (e.g., CTU) of each band may partitioned under control of a "Rate Distortion Optimization & Bit Rate Controller" into CUs and further into PUs blocks by an "Adaptive Partitioner of Wavelet Bands CTUs to Square CUs/PUs." For example, the "Rate Distortion Optimization & Bit Rate Controller" may provide for a best selection of partition size, prediction mode, and transform type. Such processing may result in many candidate partitions (partn) of each LCU.

Furthermore, for each LL band LCU partition, several candidate intra (e.g., DC, planar, and 33 directional) prediction modes (mode) may be generated by a "DC/Planar/33 Directional Prediction Analyzer & Generator (includes Local Buffer)" using decoded neighboring CUs. For other (HL, LH, HH) band LCU partitions, intra prediction is not performed.

As shown, LL band LCU partitioned PUs/blocks may be differenced with candidate prediction partitions at a differencer 911 to compute candidate difference partition blocks that may be transformed by an "Adaptive Square TUs (4×4, 8×8, 16×16, 32×32) DCT/4×4 DST" module resulting in candidate transform coefficient blocks. For other bands, no predictions are needed and thus the prediction partition/blocks samples may be directly transformed resulting in transform coefficient blocks. All transform block coefficients may be quantized by a "Quantizer" and entropy encoded by a CABAC Entropy encoder of a "Scan of each TU size of TUs depending on Wavelet Bands, CABAC Encoder & Bitstream Formatter" module and included in a bitstream (bistr). All bit costs such as transform coefficients entropy coding bit costs, LCU partitioning bit costs, and prediction mode bit costs may be determined by the "Scan of each TU size of TUs depending on Wavelet Bands, CABAC Encoder & Bitstream Formatter." Scanning of TU coefficients in each subband may be performed as specified in the HEVC standard (e.g., even though properties of other subbands are different than that of LL subband) to provide for compliant bitstreams. Overall, for a combination (e.g., partition size, prediction mode, transform type, and transform coefficients block), cost may be calculated and a reconstructed partition may be determined and thus the distortion may be determined. Such costs and distortions may be used in rate distortion optimization as follows.

Given a set of candidate partitions (partn) of each LCU, candidate intra prediction modes (mode), transform (xm), and potential quantizer values (q), the "Rate Distortion Optimization & Bit Rate Controller" may make a decision using the bitrate (from bit costs provided by the entropy encoder) and the distortion measure (computed from difference of the original and the reconstructed subband partitions) on the best encoding strategy by determining the best partitioning (partnb) and the best intra prediction mode (modeb) to use for coding of each partition, the selected transform (xmb), and the quantizer (qp) that will allow achieving the best (RD tradeoff) quality results under constraint of available bitrate. The selections of partnb, modeb, xmb, and qp may be sent via bitstream to the decoder.

Furthermore, the process of forming predictions from neighbors requires reconstruction of neighboring blocks, requiring a decoding loop at the encoder. For example, as discussed, a "reconstructed partition" may be generated for use by RDO. As shown, quantized coefficient blocks of each band at the encoder may go through dequantization at an "Inverse Quantizer," followed by inverse transform at an "Adaptive Square TUs (4×4, 8×8, 16×16, 32×32) Inverse DCT/4×4 Inverse DST" module resulting in CUs/blocks of reconstructed samples of HL, LH, and HH bands, and interim TUs/blocks of reconstructed samples of LL band. For the LL band a prediction mode may be used to acquire PUs/blocks to add, by an adder 912, to the LL band interim reconstructed TUs/blocks to generate final reconstructed CUs. Reconstructed LL band CUs are also saved in local buffer and used for current CU prediction by the "DC/Planar/33 Directional Prediction Analyzer & Generator (includes Local Buffer)", with the PU/block forming one input to differencer 911 and the other input being the current partition/block being coded. Also, since full reconstruction of all bands may be needed for the purpose of computing distortion, the reconstructed LL band and the other (HL, LH, HH) band CUs may be assembled to form LCUs at an "Adaptive Assembler of Wavelet Bands Square CUs to CTUs", which may undergo deblocking at a "Deblock Filtering" module and edge fixing at a "Sample Adaptive Offset Filter" module resulting in reconstructed LL, HL, LH, and HH bands with reduced artifacts that may be input to RDO for use in computing distortion.

Figure 9B:
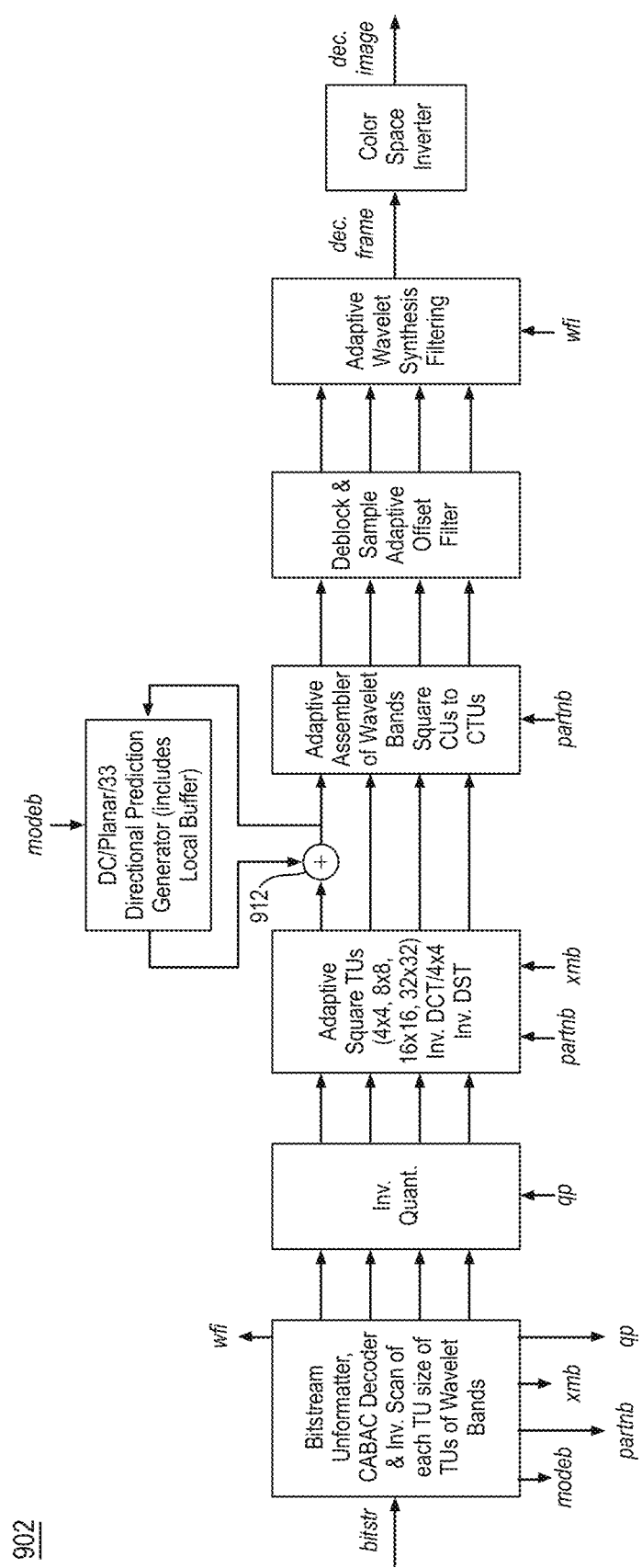
FIG. 9B is a block diagram of an example functional standalone AWHVC Intra Decoder corresponding to encoder of FIG. 9A.

FIG. 9B is a block diagram of an example functional standalone AWHVC Intra Decoder 902 corresponding to encoder of FIG. 9A, arranged in accordance with at least some implementations of the present disclosure. For example, much of this decoder was discussed with respect to the decoding loop in the AWHVC Intra Encoder of FIG. 9A, except for operation of an "Adaptive Wavelet Synthesis Filtering" module and a "Color Space Inverter." As shown, an encoded AWHVC bitstream (bistr) may be decoded by a "Bitstream Unformatter, CABAC Decoder & Inverse Scan of each TU size of TUs of Wavelet Bands" resulting in selected partitioning info (partnb), selected intra pred mode info (modeb), detected transform info (xmb), and selected quantizer (qp), as well as quantized TU coefficient blocks. For reasons of compliance to HEVC standard, the same scanning as in HEVC may be used for each subband. The transform coefficient blocks may be dequantized using quantizer qp by an "Inverse Quantizer" and inverse transformed by an "Adaptive Square TUs (4×4, 8×8, 16×16, 32×32) Inverse DCT/4×4 Inverse DST" module resulting in TUs of reconstructed samples of HL, LH and HH bands, and blocks of interim samples for LL band. As discussed, by adding prediction blocks, as generated using prediction modeb info by a "DC/Planar/33 Directional Prediction Generator (includes Local Buffer)" at adder 912 to decoded interim TUs, final CUs of LL band may be generated. All CUs of each wavelet band may be assembled assembled into LCUs and thus to full bands at an "Adaptive Assembler of Wavelet Bands Square CUs to CTUs" that may undergo deblocking in and edge fixing in "Deblock & Sample Adaptive Offset Filter" module to reduce coding artifacts and then may be input to an "Adaptive Wavelet Synthesis Filtering" module that may use filters that are complimentary of wavelet analysis filters (with information on filters used at the encoder sent via bitstream) to perform synthesis filtering that combines all 4 bands to generate a decoded YUV frame (dec. frame). Depending on the application either this frame itself maybe used or it may need to be converted to an RGB format image by optional processing performed by a "Color Space Inverter."

Figure 10A:
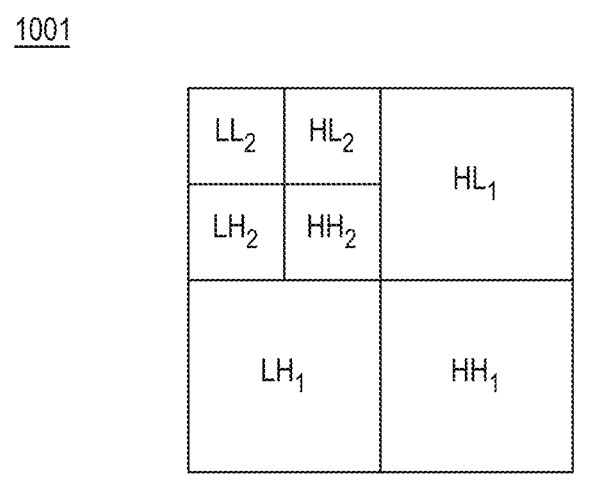

FIG. 10A illustrates an example two level dyadic decomposition process 1001 of an image, arranged in accordance with at least some implementations of the present disclosure. For example, FIG. 10A illustrates 7 wavelet bands resulting from 2 level decomposition of a video frame/image. As shown, the process may include performing one level decomposition of an image by applying low-pass and high-pass filtering on rows and then on columns resulting in $LL_1$, $HL_1$, $LH_1$, and $HH_1$ subbands. Furthermore, the low-low ($LL_1$) subband may be decomposed further by an identical decomposition process. This results in decomposition of the $LL_1$ subband further into 4 subbands that may be characterized as $LL_2$, $HL_2$, $LH_2$, and $HH_2$, with $LL_2$ now being the low-low subband. Overall the two level dyadic decomposition process, generates 7 subbands: $LL_2$, $HL_2$, $LH_2$, $HH_2$, $HL_1$, $LH_1$, and $HH_1$.

Figure 10B:
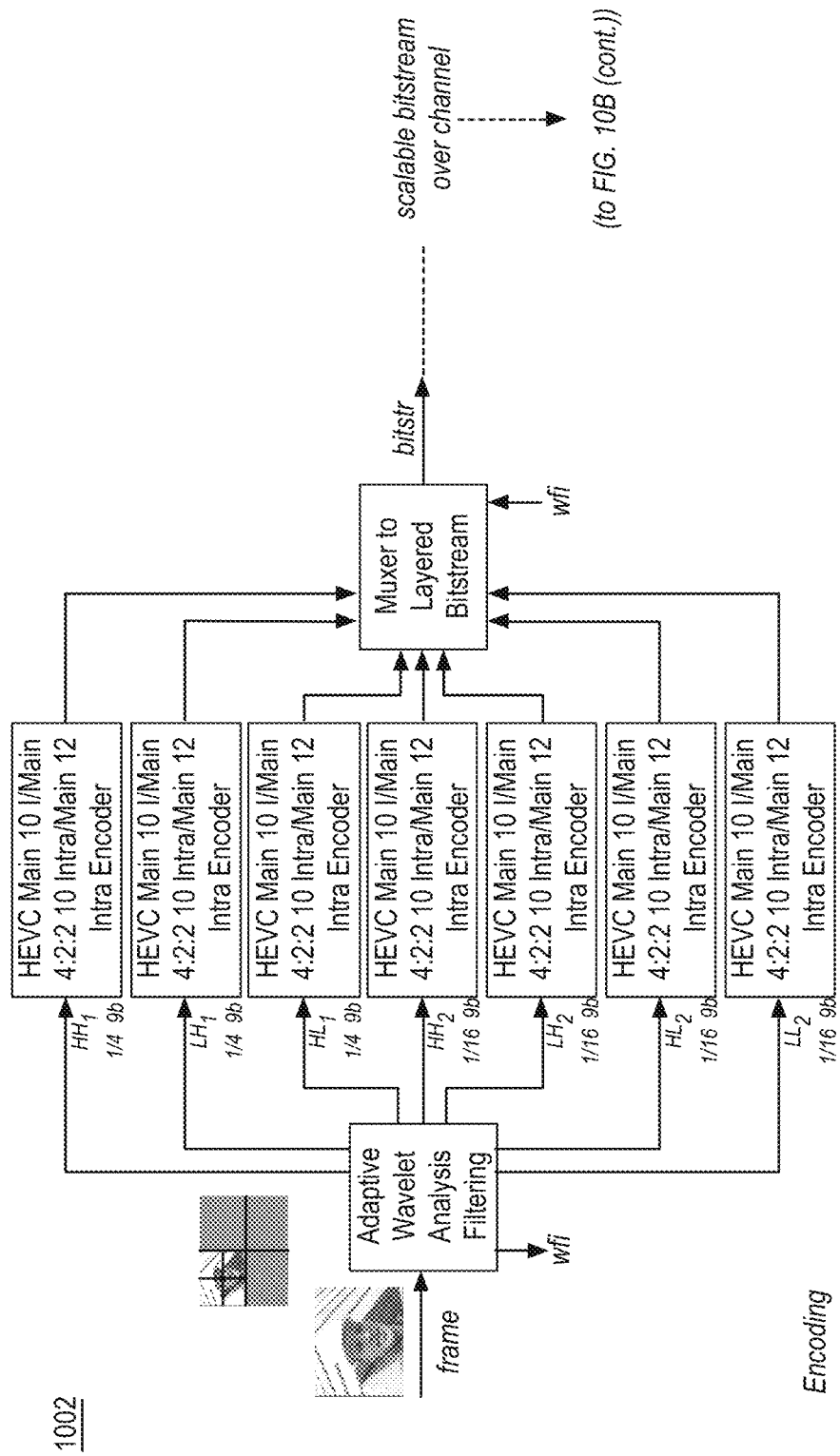
FIG. 10B is a block diagram of an example AWHVC (AW2HVC) Intra Encoder/Decoder.

FIG. 10B is a block diagram of an example AWHVC (AW2HVC) Intra Encoder/Decoder 1002, arranged in accordance with at least some implementations of the present disclosure. For example, the Encoder/Decoder of FIG. 10B may provide encoding/decoding of 7 subbands of a video/image frame resulting from two level decomposition. For example, FIG. 10B may provide an Adaptive Wavelet HEVC (AW2HVC) Intra Encoder/Decoder that combines 2 Level Adaptive Wavelet Analysis/Synthesis with an HEVC Encoder/Decoder.

As shown, at the encoding side, an input video (or image) YUV frame (frame) may undergo adaptive wavelet decomposition by an "Adaptive Wavelet Analysis Filtering" using a filter set from a codebook of filter-sets with selection of filter based on application (e.g., resolution, content, and bitrate). For example, using the selected filter set, the process of analysis filtering may be performed for two level decomposition that may convert the frame into $LL_2$, $HL_2$, $LH_2$, $HH_2$, $HL_1$, $LH_1$, and $HH_1$ subbands. Subbands $LL_2$, $HL_2$, $LH_2$, and $HH_2$ are one-sixteenth in size, subbbands $HL_1$, $LH_1$, and $HH_1$ are one-quarter in size, and all subbands have a bit depth of 9 bits (assuming 8 bit input video or image). For example, one level decomposition may expands the amplitude by square root of 2 (e.g., by a factor of 1.414) such that 8 bit input video with a 0-255 range, after one level decomposition, may have a 0-361 range requiring 9 bits. The same is again true of performing another level decomposition of $LL_1$ band that multiplies the 0-361 range by square root of 2 with the resulting range of 0-511 still fitting into a 9 bit value. Therefore, after 2 level decomposition, 10 bit precision is not needed. For exmaple, subbands $LL_2$, $HL_2$, $LH_2$ and $HH_2$ from 2 level decomposition result in subbands of $\frac{1}{16}^{th}$ size of input video/image frame and subbands $HL_1$, $LH_1$ and $HH_1$ are of $\frac{1}{4}^{th}$ size of the input video/image frame.

As shown, all 7 subbands (e.g., $LL_2$, $HL_2$, $LH_2$, $HH_2$, $HL_1$, $LH_1$, and $HH_1$ subbands) may be encoded by HEVC Main 10 I/Intra encoder(s) or the like (e.g., respective "HEVC Main 10 I/Main 4:2:2 10 Intra/Main 12 Intra Encoder"). While using the same encoder on every band may not provide the highest compression efficiency (since all subbands will use intra prediction and scans will not be optimized for each subband, etc.), the architecture of the encoder of FIG. 10B may offer simplicity (e.g., not having to tune a HEVC Main 10* I/Intra encoder to each subband) and may provide compatibility that allows use of existing hardware (or software) HEVC Main 10 encoders. The resulting 7 bitstreams may be multiplexed with headers by a "Muxer to Layered Bitstream" to form a single encoded bitstream (bitstr) such that one of the headers in the bitstream may be an index of wavelet filter set used for decomposition (wfi).

As shown, the decoding side of FIG. 10B may reverse the encoding process. For example, a scalable bitstream (bitstr) may be received and demultiplexed headers may be decoded by a "DeMuxer to Bitstream Layers". One of the decoded headers may include wavelet filter set selection information (wfi). Depending on an output selection based on a user requirement, system requirement, or the like as implemented by switch 1021, if the decoded $LL_2$ subband of $\frac{1}{16}^{th}$ size/lowest quality (a low quality selection) (e.g., a frame which may be upsampled for display) is selected, only the $LL_2$ band may be decoded by an HEVC Main 10 I/Intra decoder or the like (e.g., "HEVC Main 10 I/Main 4:2:2 10 Intra/Main 12 Intra Decoder"). For example, the decoded $LL_2$ band may be bit depth limited and up sampled by "Bit Depth Limiter & 1:4 Up Sampler" and provided for display (dec. frame). If the output selection is of a medium (e.g., the user or system requires the next available resolution, which is $\frac{1}{4}^{th}$ the size of input frame). Such a frame may be formed by additionally decoding the $LL_2$, $HL_2$, $LH_2$, and $HH_2$ using HEVC Main 10 I/Intra decoders or the like (e.g., respective "HEVC Main 10 I/Main 4:2:2 10 Intra/Main 12 Intra Decoder") and synthesizing the $LL_2$, $HL_2$, $LH_2$, and $HH_2$ by applying 1 level Adaptive Synthesis Filtering by an "Adaptive Wavelet Synthesis Filtering" to reconstruct a $\frac{1}{4}^{th}$ size middle quality frame, which may be bit depth limited and upsampled by a "Bit Depth Limiter & 1:2 Up Sampler" for display (dec.

frame). If the user or system requirement (e.g., output selection) selects a full size full quality frame, such a frame may be generated by decoding all 7 bands by HEVC Main 10 I/Intra decoder(s) or the like (e.g., respective "HEVC Main 10 I/Main 4:2:2 10 Intra/Main 12 Intra Decoder") and combining the decoded subbands by 2 level Adaptive Synthesis Filtering by the "Adaptive Wavelet Synthesis Filtering" for display (dec. frame). In outputting a 9 bit per luma component image on 8 bit per luma component intended display, bit depth limitation (such as by truncation or rounding or more sophisticated means) may be necessary.

Figure 11A:
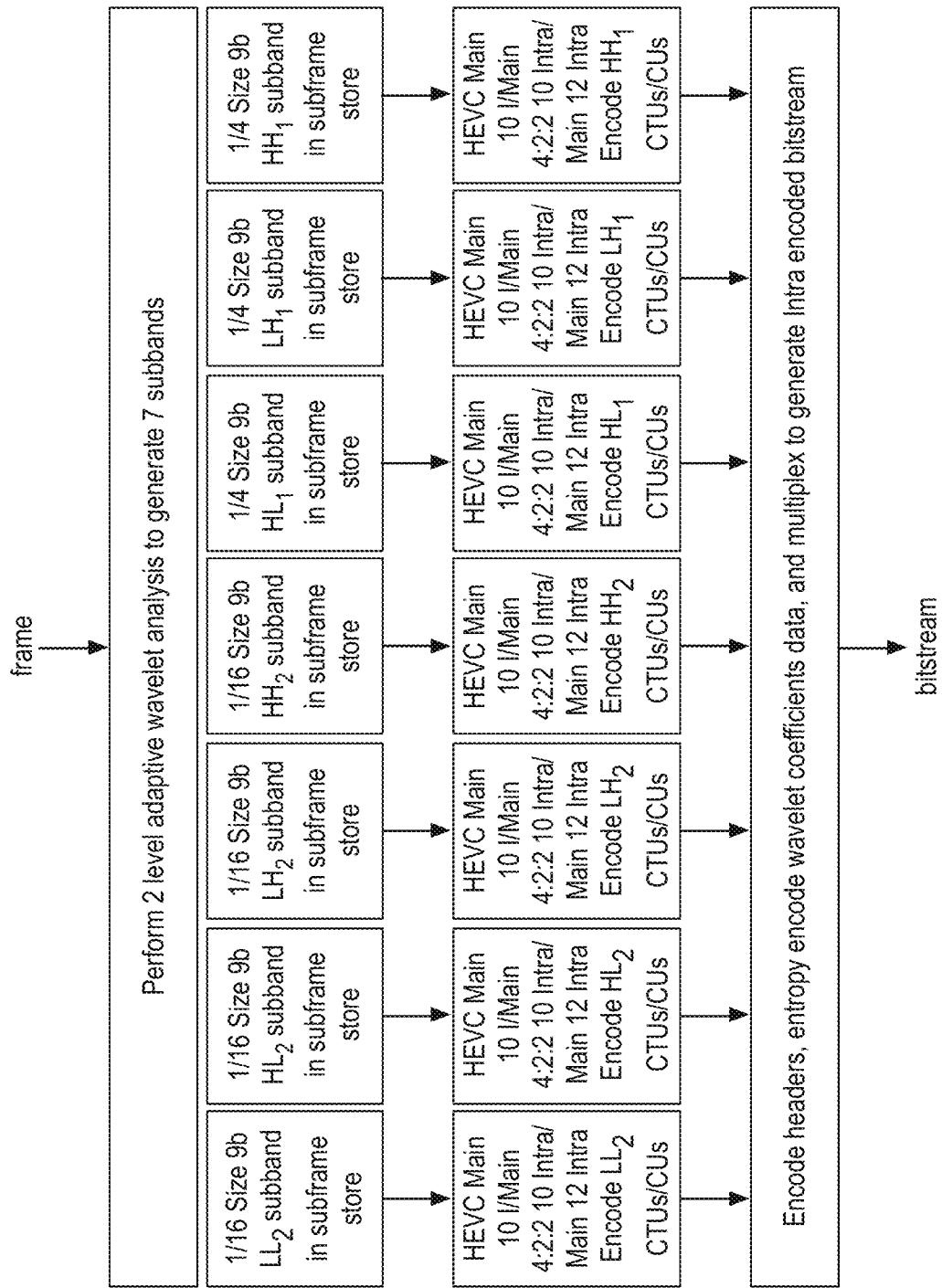
FIG. 11A illustrates an example process for AW2HVC encoding.

FIG. 11A illustrates an example process 1101 for AW2HVC encoding, arranged in accordance with at least some implementations of the present disclosure. As shown, an input video/image frame (labeled "frame") may undergo 2 level adaptive wavelet analysis filtering (at the operation labeled "Perform 2 level adaptive wavelet analysis to generate 7 subbands") to decompose it into 7 bands, which may be stored in their own subframe buffers (at the operations labeled "1/16 Size 9b $LL_2/HL_2/LH_2/HH_2$ subband in subframe store" and "1/4 Size 9b $HL_1/LH_1/HH_1$ subband in subframe store")–4 of the seven bands are $1/16^{th}$ of original frame size and thus require frame buffers of this size and the remaining 3 bands are of $1/4^{th}$ of input frame size and thus require 1/4 size frame buffers. Each sample (e.g., subband coefficient) in each subband may be of 9-bit bit depth when the input is of 8-bit bit depth. Each of the seven subbands may be partitioned into LCUs and CUs and encoded with HEVC High 10 I/Intra encoder(s) or the like (at the operations labeled "HEVC Main 10 I/Main 4:2:2 10 Intra/Main 12 Intra Encode $LL_2/HL_2/LH_2/HH_2/HL_1/LH_1/HH_1$ CTUs/CUs"). The resulting 7 subband bitstreams may be multiplexed with encoded headers (including a header that identifies the selected wavelet filter set) (at the operation labeled "Encode headers, entropy encode wavelet coefficients data, and multiplex to generate Intra encoded bitstream") and output as a single scalable bitstream (labeled "bitstream").

Figure 11B:
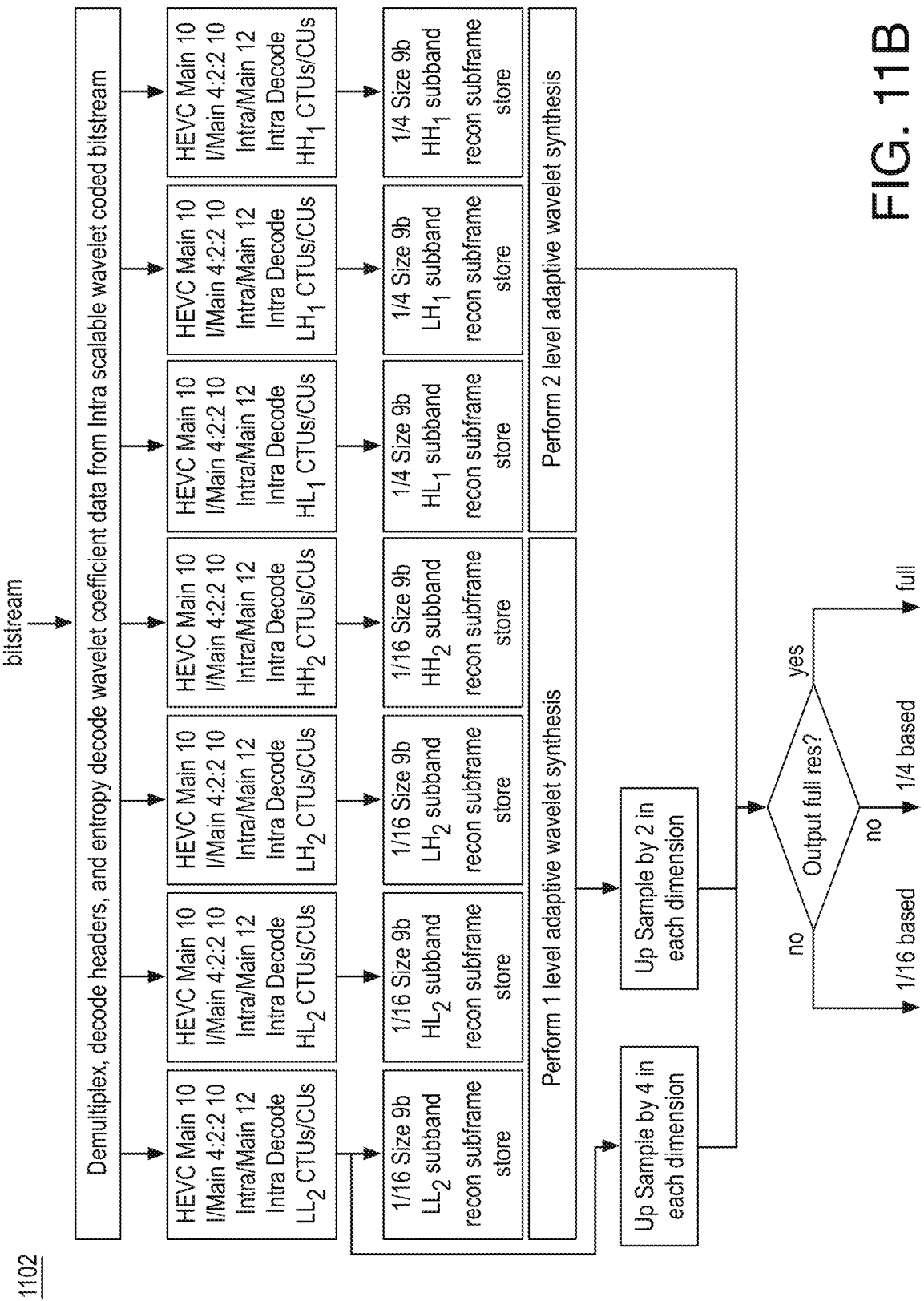
FIG. 11B illustrates an example process for AW2HVC decoding.

FIG. 11B illustrates an example process 1102 for AW2HVC decoding, arranged in accordance with at least some implementations of the present disclosure. As shown, an AW2HVC encoded bitstream (labeled "bitstream") may be input to a demultiplexer and header decoder that may separate out and decode headers and separate individual subband bitstreams (at the operation labeled "Demultiplex, decode headers, and entropy decode wavelet coefficient data from Intra scalable wavelet coded bitstream"). As shown, the decoding process may work in one of the three different ways depending on an output selection made based on user or system requirements or the like (as implemented by the decision operation labeled "Output full res?"). For example, if a $1/16^{th}$ resolution/quality image (low resolution) is selected, the $LL_2$ band may be decoded by an HEVC Main 10 I/Intra decoder or the like (at the operation labeled "HEVC Main 10 I/Main 4:2:2 10 Intra/Main 12 Intra Decode $LL_2$ CTUs/CUs") and upsampled (at the operation labeled "Up Sample by 4 in each dimension") for display (labeled as "1/16 based"). If the output selection is a middle resolution/quality image, the $LL_2$, $HL_2$, $LH_2$, and $HH_2$ bands may be decoded by HEVC Main 10 I/Intra decoder(s) (at the operations labeled "HEVC Main 10 I/Main 4:2:2 10 Intra/Main 12 Intra Decode $LL_2/HL_2/LH_2/HH_2$ CTUs/CUs") and stored, along with the $LL_2$ band, in subframes (at the operations labeled "1/16 Size 9b $LL_2/HL_2/LH_2/HH_2$ subband recon subframe store") and used by Adaptive Wavelet Synthesis Filtering (at the operation labeled "Perform 1 level adaptive wavelet synthesis") to create a $1/4^{th}$ resolution decoded video/image frame that may be upsampled (at the operation labeled "Up Sample by 2 in each dimension") for display (labeled "1/4 based"). If the output selection selects a full resolution/quality frame, all seven bands may be decoded by HEVC Main 10 I/Intra decoder(s) (at the operations labeled "HEVC Main 10 I/Main 4:2:2 10 Intra/Main 12 Intra Decode $LL_2/HL_2/LH_2/HH_2/HL_1/LH_1/HH_1$ CTUs/CUs") and stored in subframes (at the operations labeled "1/16 Size 9b $LL_2/HL_2/LH_2/HH_2$ subband recon subframe store" and "1/4 Size 9b $HL_1/LH_1/HH_1$ subband recon subframe store") and used by Adaptive Wavelet Synthesis Filtering based on the wavelet filter set identified by wfi (at the operation labeled "Perform 2 level adaptive wavelet synthesis") to create a full resolution/quality decoded video/image frame for display (labeled "full").

For example, as discussed with respect to FIGS. 7A, 7B, 8A, 8B, 9A, 9B, 10A, 10B, 11A, and 11B and elsewhere herein, coding an original image or frame may include performing wavelet decomposition on the original image or frame to generate multiple subbands, encoding each of multiple subbands with an High Efficiency Video Coding (HEVC) compliant encoder to generate a plurality of HEVC compliant bitstreams that are forward compatible with HEVC coding such that each is associated with a subband of the multiple subbands, and multiplexing the plurality of subbands to generate a single scalable bitstream such that at least portions of the single scalable bitstream are HEVC compliant. The wavelet decomposition may be fixed or adaptive (which may include selecting a wavelet analysis filter set for performing the wavelet decomposition). In an embodiment, the original image or frame has a bit depth of 8 bits and each of the subbands has a bit depth of 9 bits. In another embodiment, the original image or frame has a bit depth of 9 bits and each of the subbands has a bit depth of 10 bits. In an embodiment, the subbands have a bit depth of 9 bits and the HEVC compliant encoder is a 10 bit intra encoder profile or a 12 bit intra encoder profile. In another embodiment, the subbands have a bit depth of 11 bits and the HEVC compliant encoder is a 12 bit intra encoder profile. In an embodiment, the wavelet decomposition is a single level wavelet analysis filtering and the multiple subbands include four subbands (e.g., an LL subband, an LH subband, an HL subband, and an HH subband). In another embodiment, the wavelet decomposition is a multiple level wavelet analysis filtering (e.g., two level such that seven subbands are generated).

Furthermore, as discussed with respect to FIGS. 7A, 7B, 8A, 8B, 9A, 9B, 10A, 10B, 11A, and 11B and elsewhere herein, decoding may include demultiplexing a scalable bitstream, such that at least portions of the scalable bitstream are High Efficiency Video Coding (HEVC) compliant, to generate multiple bitstreams each associated with a subband of multiple wavelet subbands, decoding at least one of the multiple bitstreams with an HEVC compliant decoder, and reconstructing an image or frame based on the decoding. In an embodiment, an output selection associated with the image or frame may be determined such that the output selection is low or full resolution and reconstructing the image or frame is responsive to the output selection. For example, if the output selection is low resolution, reconstructing the image or frame may include decoding only an LL subband with the high efficiency video coding compliant decoder. If the output selection is full resolution, reconstructing the image or frame may include decoding multiple bitstreams each associated with a subband of the plurality of wavelet subbands with at least the HEVC compliant decoder to generate multiple decoded subbands and performing wavelet synthesis filtering on the multiple decoded subbands to generate the original image or frame at full resolution. In another embodiment, an output selection associated with the image or frame may be determined such that the output selection is low, medium, or full resolution and reconstructing the image or frame is responsive to the output selection. For example, if the output selection is low resolution, reconstructing the image or frame may include decoding only an $LL_2$ subband with the high efficiency video coding compliant decoder. If the output selection is medium resolution, reconstructing the image or frame may include decoding multiple bitstreams each associated with a subband of the multiple wavelet subbands with at least the high efficiency video coding compliant decoder to generate multiple decoded subbands such that the multiple bitstreams are a subset of the plurality of bitstreams. If the output selection is full resolution, reconstructing the image or frame may include decoding multiple bitstreams each associated with a subband of the multiple wavelet subbands with at least the high efficiency video coding compliant decoder to generate multiple decoded subbands such that the multiple bitstreams include all of the plurality of bitstreams and performing multiple level wavelet analysis filtering on the plurality of decoded subbands to generate the image or frame at full resolution.

Figure 12:
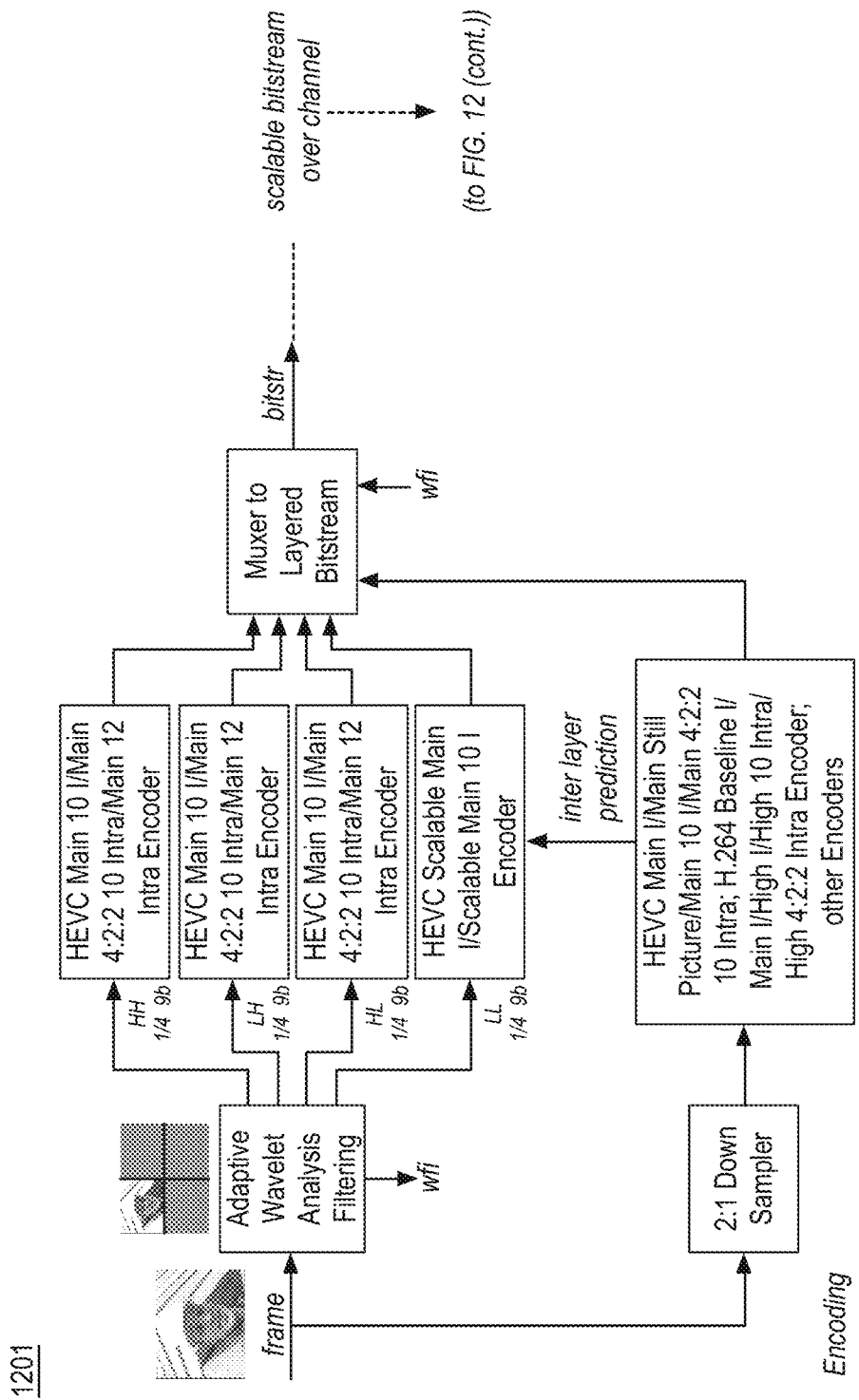
FIG. 12 is a block diagram of an example Adaptive Wavelet Scalable HEVC (AWS1HVC) Intra Encoder/Decoder.
Figure 12:
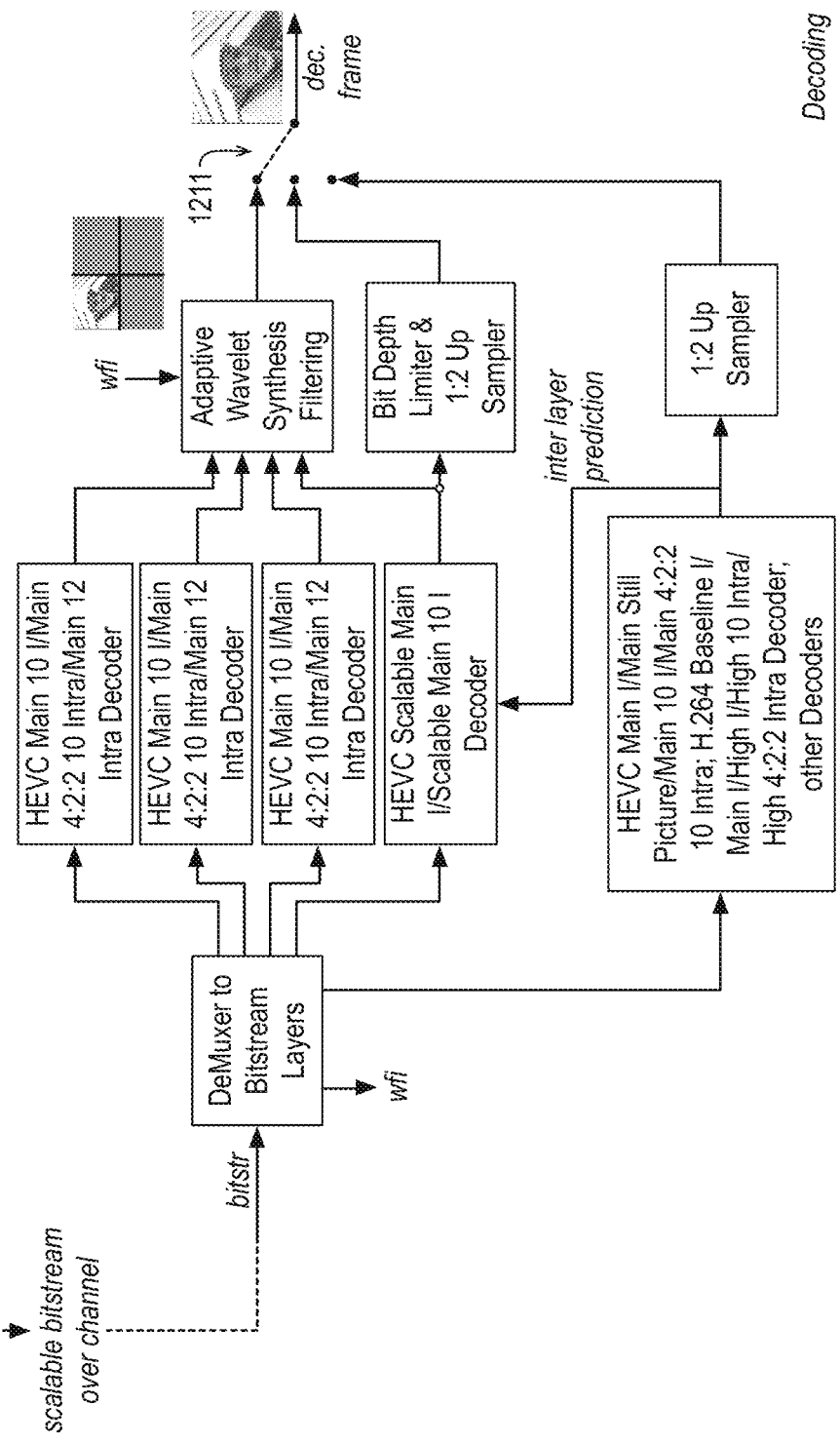

FIG. 12 is a block diagram of an example Adaptive Wavelet Scalable HEVC (AWS1HVC) Intra Encoder/Decoder 1201, arranged in accordance with at least some implementations of the present disclosure. For example, FIG. 12 may provide an Adaptive Wavelet Scalable HEVC (AWS1HVC) Intra Encoder/Decoder including SNR scalable coding by combining Adaptive Wavelet Analysis/Synthesis, down/up sampling, and compatible HEVC Main10 or Main 4:2:2 10 Intra or Main 12 Intra coding As shown, an input video frame (frame) may be filtered and downsampled by a factor of 2 in each dimension by a "2:1 Down Sampler". Since it is normal 8-bit bit-depth pixel-domain signal, the downsampled image may be encoded by an HEVC encoder (e.g. HEVC Main I or HEVC Main Still Picture or HEVC Main 10 I or HEVC Main 10 I or HEVC Main 4:2:2 10 Intra) or an AVC encoder (e.g. H.264 Baseline I or H.264 Main I or H.264 High I or H.264 High 10 Intra or H.264 High 4:2:2 Intra) or the like by a "HEVC Main I/Main Still Picture/Main 10 I/Main 4:2:2 10 Intra; H.264 Baseline I/Main I/High I/High 10 Intra/High 4:2:2 Intra Encoder; other Encoders" module. Furthermore, the input video/image frame may undergo Adaptive Wavelet Analysis Filtering (e.g., with filter set depending on application, resolution or user requirements) at an "Adaptive Wavelet Analysis Filtering" that may decompose the frame into LL, HL, LH and HH subbands.

As shown, the local decoded video/image frame from the "HEVC Main I/Main Still Picture/Main 10 I/Main 4:2:2 10 Intra; H.264 Baseline I/Main I/High I/High 10 Intra/High 4:2:2 Intra Encoder; other Encoders" encoder module may be used for "inter band" prediction (labeled as "inter layer prediction") and coding of the LL band. For example, for coding of LL subband, a Scalable HEVC Main10 I/Intra encoder capable of handling scalable coding of the LL-band, which is a 9-bit bit-depth signal, at an "HEVC Scalable Main I/Scalable Main 10 I Encoder" may be employed. This type of spatial/SNR scalability structure may allow the LL band intra coding to use locally adaptive prediction from the LL band and from a base layer that is wavelet encoded (e.g., this may require bit shifting to extend base layer to 9 bit signal before using it for prediction). In the example of FIG. 12, the Base layer uses the same resolution as in wavelet LL band subband so the base layer decoded video/image frame does not need to be upsampled prior to prediction of the LL band. Such scalability may be characterized as SNR scalability as the two layers (base layer and LL band layer) are at the same resolution.

As shown, coding of the remaining 3 (HL, LH and HH) subbands may be performed as discussed earlier (e.g., such coding may use HEVC Main 10 I/Intra encoder(s) or the like—respective "HEVC Main 10 I/Main 4:2:2 10 Intra/Main 12 Intra Encoder"). The resulting base layer bitstream and 4 subband bitstreams may be multiplexed along with headers by a "Muxer to Layered Bitstream" into a single bitstream (bitstr). The headers included may indicate which filter set was used for adaptive wavelet analysis filtering and that the LL band is SNR scalably encoded with respect to an external (non subband decomposed) base layer.

As shown, the decoding side may perform the reverse process by receiving a bitstream (bitstr) and demultiplexing the multiplexed base layer bitstream and subband bitstreams and decoding the necessary headers to determine the scalability used and create decoding structures necessary for successfully decoding the scalable streams by a "DeMuxer to Bitstream Layers". There are three output selection available for decoding as implemented by a switch 1211: of decoding standalone coded base layer stream at $\frac{1}{4}^{th}$ resolution (low resolution selection) that results in a lower quality decoded video/image frame than the LL band, the $\frac{1}{4}^{th}$ resolution LL band stream decoding that may provide $\frac{1}{4}^{th}$ resolution video/image frame but at higher quality (medium quality selection), and the output of adaptive wavelet synthesis filtering that combines 4 subbands resulting in a full resolution/quality decoded video/image frame (full resolution selection). For example, the actual decoding method chosen may depend on user or sytem requirements.

If standalone base-layer resolution/quality (low resolution) is selected, that bitstream may be decoded by using a matching (depending on encoder used on encoding side) HEVC (e.g. HEVC Main I or HEVC Main Still Picture or HEVC Main 10 I or HEVC Main 10 I or HEVC Main 4:2:2 10 Intra) decoder or an AVC (e.g. H.264 Baseline I or H.264 Main I or H.264 High I or H.264 High 10 Intra or H.264 High 4:2:2 Intra) decoder at an "HEVC Main I/Main Still Picture/Main 10 I/Main 4:2:2 10 Intra; H.264 Baseline I/Main I/High I/High 10 Intra/High 4:2:2 Intra Decoder; other Decoders" module. The decoded video/image frame may be upsampled by 2 in each dimension at a "1:2 Up Sampler" for display (dec. frame). If middle resolution quality is selected, the base layer needs to be decoded (as just described) and the LL band needs to be decoded by an HEVC Scalable Main 10 I/Intra decoder that uses decoded base layer video/image frame for SNR scalable prediction at an "HEVC Scalable Main I/Scalable Main 10 I Decoder" module (with inter layer prediction, as shown). The resultant image may be bit depth limited and up sampled by a "Bit Depth Limiter & 1:2 Up Sampler" to provide an output image or frame (dec. frame). If the output selection is a full resolution/quality decoded video/image frame, in addition to the process just described for decoding the LL subband, the 3 remaining wavelet subbands (e.g., HL, LH and HH subbands) need to be decoded by using HEVC Main 10 I/Intra decoder(s) or the like at respective "HEVC Main 10 I/Main 4:2:2 10 Intra/Main 12 Intra Decoder". All four decoded subbands may be input to an "Adaptive Wavelet Synthesis Filtering" module that performs synthesis filtering using the filter set information decoded from header in the bitstream to provide a decoded full resolution/quality video/image frame (dec. frame) for display.

While in the system of FIG. 12, the base layer and LL band have the same (¼$^{th}$ size) resolution, the base layer may be encoded at lower spatial resolution such as ⅟16$^{th}$ resolution by using 4:1 instead of 2:1 downsampling filter. In such a case, the LL-subband may use Spatial (instead of SNR) scalability.

Figure 13A:
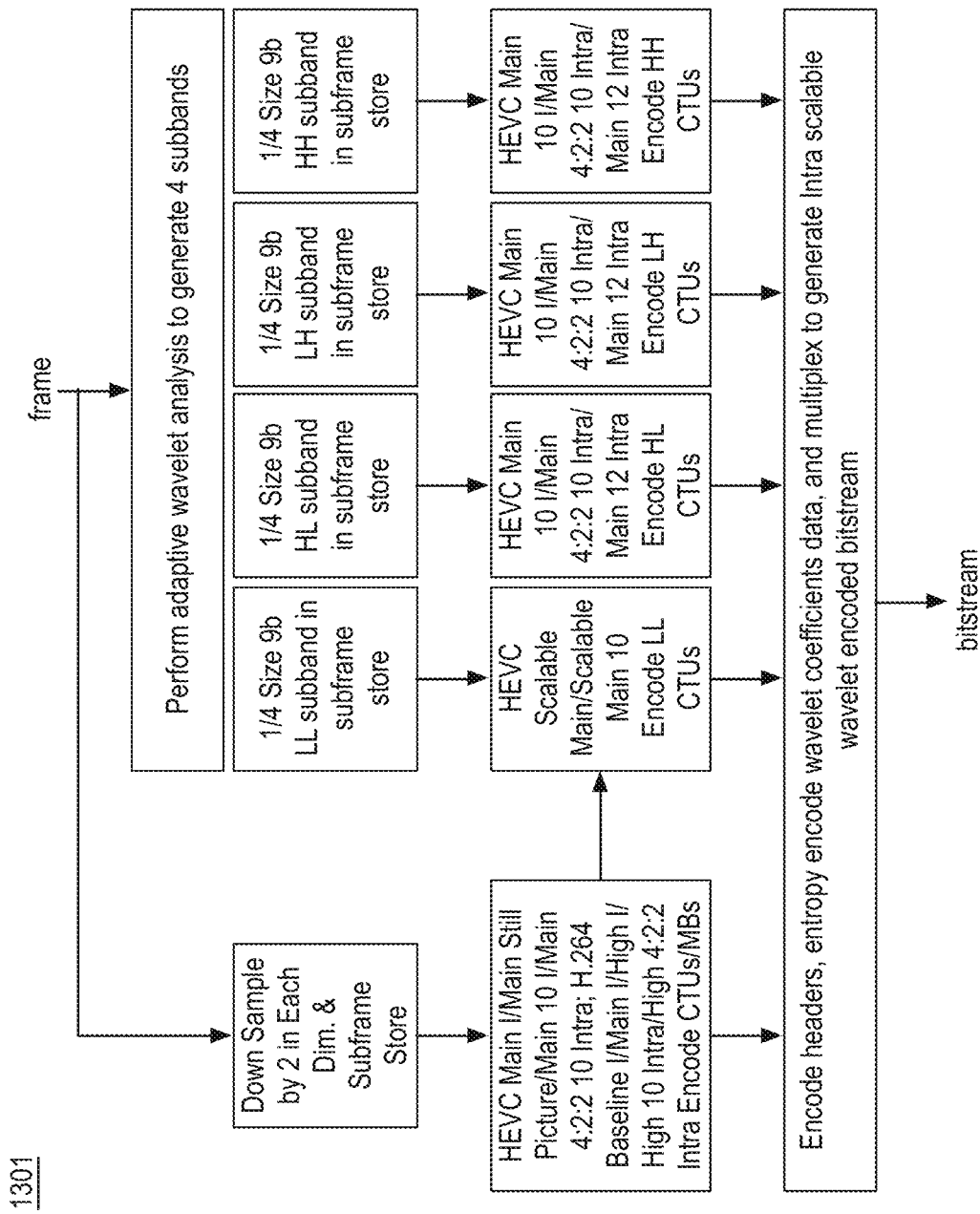
FIG. 13A illustrates an example process for Adaptive Wavelet Scalable HEVC (AWS1HVC) Intra Encoding.

FIG. 13A illustrates an example process 1301 for Adaptive Wavelet Scalable HEVC (AWS1HVC) Intra Encoding, arranged in accordance with at least some implementations of the present disclosure. For example, process 1301 may be performed by the system of FIG. 12. As shown, an input video/image frame (labeled "frame") may be filtered and downsampled by a factor of 2 in each dimension (at the operation labeled "Down Sample by 2 in Each Dim. & Subframe Store") resulting in a ¼$^{th}$ size image that may be stored (at the operation labeled "Down Sample by 2 in Each Dim. & Subframe Store") and encoded by an encoder such as HEVC Main I or HEVC Main Still Picture or Main 10 I or HEVC Main 10 I or HEVC Main 4:2:2 10 Intra or H.264 Baseline I or H.264 Main I or H.264 High I or H.264 High 10 Intra or H.264 High 4:2:2 Intra encoder (at the operation labeled "HEVC Main I/Main Still Picture/Main 10 I/Main 4:2:2 10 Intra; H.264 Baseline I/Main I/High I/High 10 Intra/High 4:2:2 Intra Encode CTUs/MBs"). The generated encoded stream may be characterized as a base-layer bitstream. Furthermore, the input video/image frame may be adaptive wavelet analysis filtered (at the operation labeled "Perform adaptive wavelet analysis to generate 4 subbands") using a filter set (e.g., depending on application, content, or user requirement) into LL, HL, LH and HH wavelet subbands. The 4 subbands may be stored in corresponding frame stores that can store ¼$^{th}$ size 9-bit bit depth subframes (at the operations labeled "¼ Size 9b LL/HL/LH/HH subband in subframe store"). The subframes may then be encoded. For example, LL band may undergo Scalable HEVC Main10 I/intra encoding (at the operation labeled "HEVC Scalable Main/Scalable Main 10 Encode LL CTUs") that uses SNR scalability encoding with respect to the locally decoded base-layer video/image frame and the HL, LH, and HH subbands may undergo HEVC encoding as discussed herein (at the operations labeled "HEVC Main 10 I/Main 4:2:2 10 Intra/Main 12 Intra Encode HL/LH/HH CTUs"). All five encoded streams may be multiplexed with several encoded headers (at the operation labeled "Encode headers, entropy encode wavelet coefficients data, and multiplex to generate Intra scalable wavelet encoded bitstream") that carry information such as which wavelet filter set was used for analysis and which type of scalability is used for coding LL band with respect to non-wavelet encoded base layer to generate a bitstream.

Figure 13B:
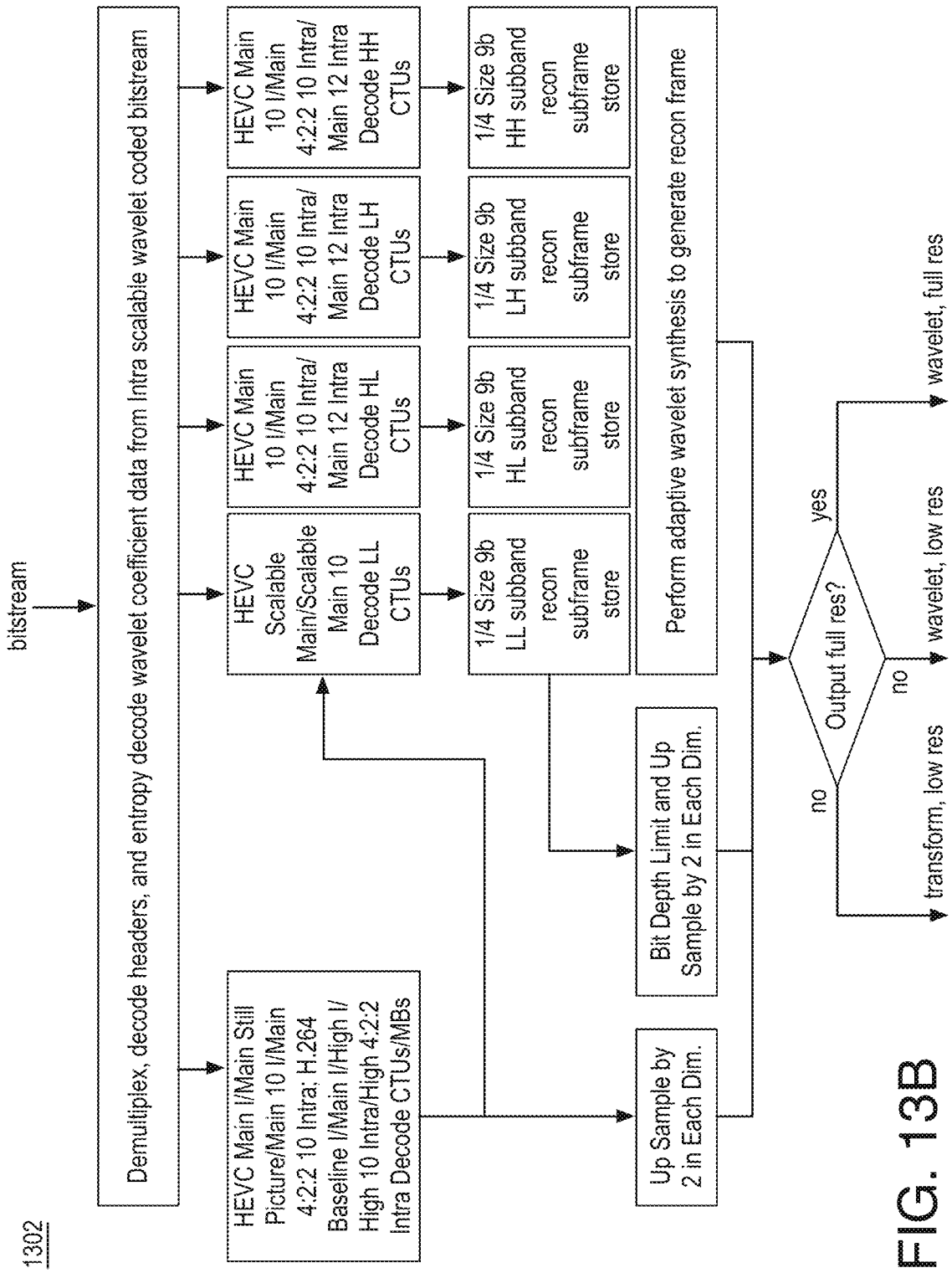
FIG. 13B illustrates an example process for Adaptive Wavelet Scalable HEVC (AWS1HVC) Intra Decoding.

FIG. 13B illustrates an example process 1302 for Adaptive Wavelet Scalable HEVC (AWS1HVC) Intra Decoding, arranged in accordance with at least some implementations of the present disclosure. For example, FIG. 13B may illustrate the decoding flowchart of the system of FIG. 12. As shown, a bitstream to be decoded (labeled "bitstream") may be demultiplexed into each of five different bitstreams and headers may be decoded (at the operation labeled "Demultiplex, decode headers, and entropy decode wavelet coefficient data from Intra scalable wavelet coded bitstream"). As discussed, headers may carry information on which wavelet filter set was chosen at encoder as well as which type of scalability is used so that the necessary decoding structure may be used. Of the five bitstreams demultiplexed, the first one is a base layer bitstream while the others are LL, HL, LH and HH subband bitstreams. Three types of decoding selections are possible (as implemented at the decision operation labeled "Output full res?"): decoding a standalone coded base layer bitstream at ¼$^{th}$ resolution that results in lower quality decoded video/image frame (low resolution), decoding a ¼$^{th}$ resolution LL band bitstream that can provide a ¼$^{th}$ resolution video/image frame but at higher quality (medium resolution), or decoding all 4 bands and then performing adaptive wavelet synthesis filtering resulting in a full resolution/quality decoded video/image frame. The selected decoding option may depend on user or system requirements or the like.

If a standalone base-layer resolution/quality (low resolution) option is selected, the base layer bitstream is decoded by using matching decoding such as by an HEVC (e.g. Main I or HEVC Main Still Picture or Main 10 I or HEVC Main 10 I or HEVC Main 4:2:2 10 Intra) decoder or an AVC (H.264 Baseline I or H.264 Main I or H.264 High I or H.264 High 10 Intra or H.264 High 4:2:2 Intra) decoder (at the operation labeled "HEVC Main I/Main Still Picture/Main 10 I/Main 4:2:2 10 Intra; H.264 Baseline I/Main I/High I/High 10 Intra/High 4:2:2 Intra Decode CTUs/MBs"). The decoded video/image frame is upsampled by 2 in each dimension (at the operation labeled "Up Sample by 2 in Each Dim.") for display (labeled "transform, low res"). If medium quality LL band output is desired, the base layer needs to be decoded (as just described) and the LL band needs to be decoded by an HEVC Scalable Main 10 I/Intra decoding that uses decoded base layer video/image frame for SNR scalable prediction (at the operation labeled "HEVC Scalable Main/Scalable Main 10 Decode LL CTUs"). The decoded LL band may be bit depth limited and up sampled (at the operation labeled "Bit Depth Limit and Up Sample by 2 in Each Dim.") and provided for display (labeled "wavelet, low res"). If the selection is full resolution/quality decoded video/image frame, in addition to the process just described for decoding LL subband, the 3 remaining wavelet subbands such as HL, LH and HH subbands need to be decoded by using HEVC Main 10 I/Intra decoding (at the operations labeled "HEVC Main 10 I/Main 4:2:2 10 Intra/Main 12 Intra Decode HL/LHHH CTUs"). All four decoded subbands may be stored (at the operation labeled "¼ Size 9b LL/HL/LH/HH subband recon subframe store") and input to Adaptive Wavelet Synthesis Filtering that performs synthesis filtering (at the operation labeled "Perform adaptive wavelet synthesis to generate recon frame") using the filter set information decoded from header in the bitstream. The output of such processing is decoded full resolution/quality video/image frame that may be provided for display (labeled "wavelet, full res").

Figure 14:
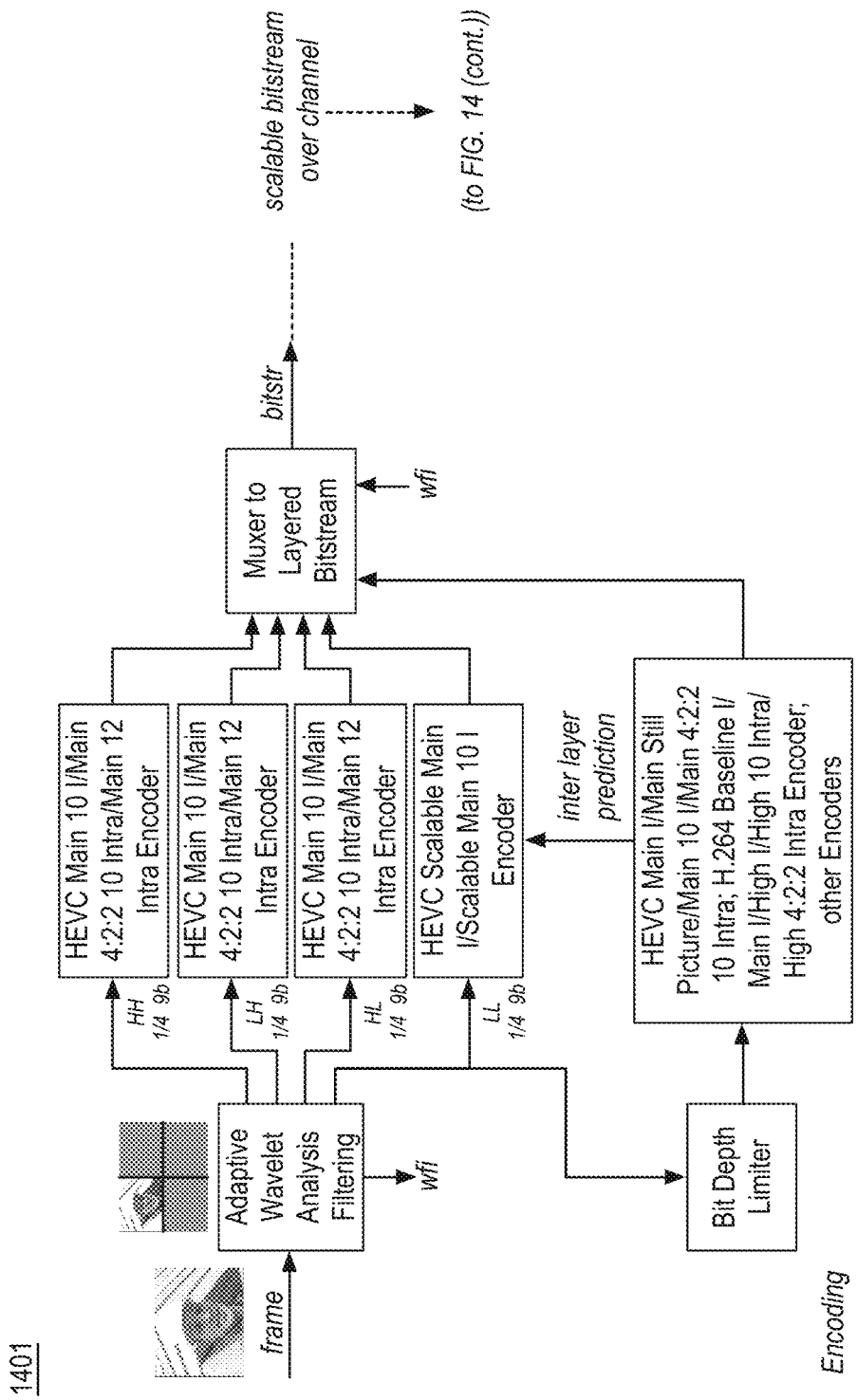
FIG. 14 is a block diagram of an example Adaptive Wavelet Scalable HEVC (AWS2HVC) encoder/decoder.
Figure 14:
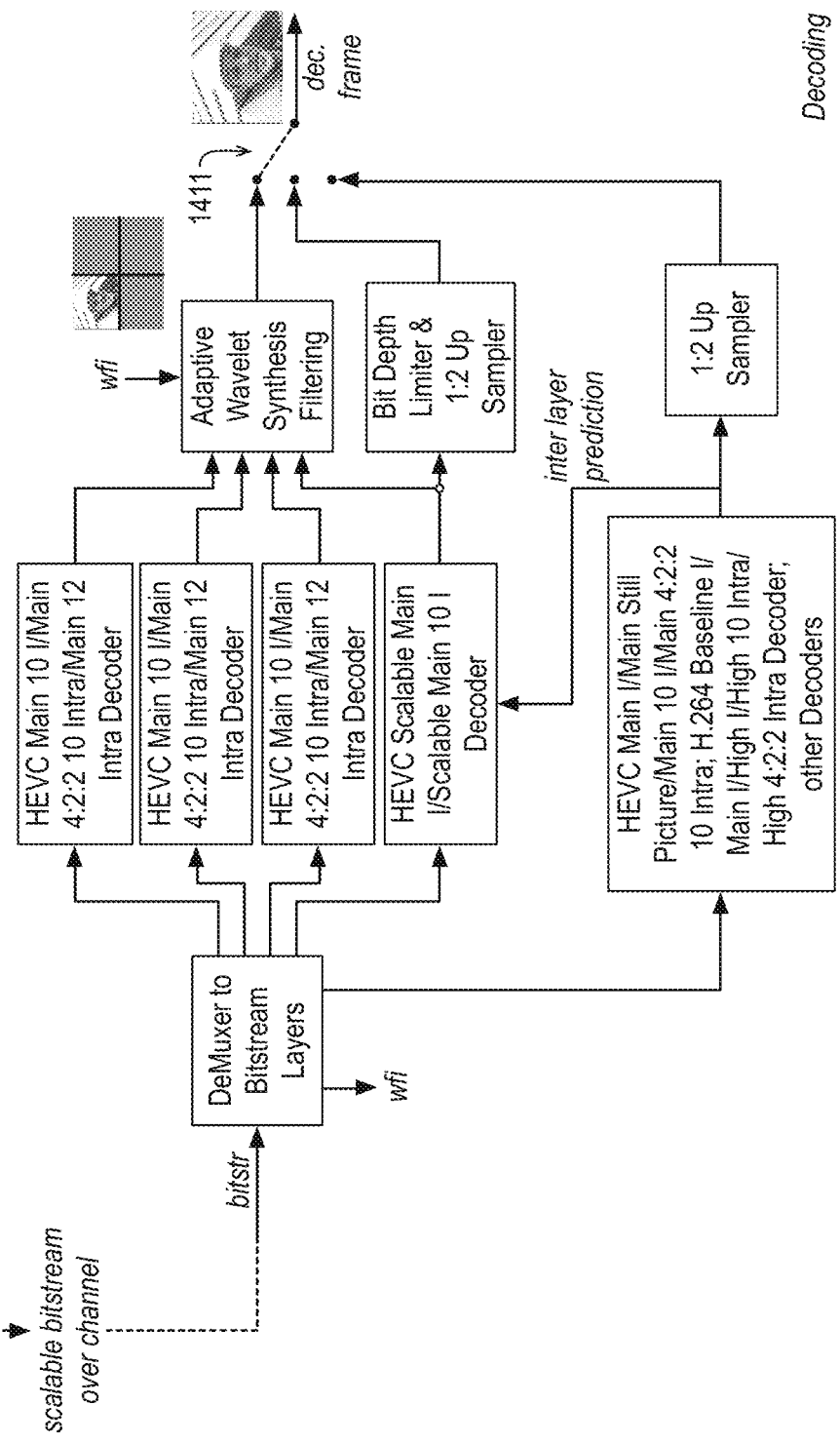

FIG. 14 is a block diagram of an example Adaptive Wavelet Scalable HEVC (AWS2HVC) encoder/decoder 1401, arranged in accordance with at least some implementations of the present disclosure. For example, FIG. 14 may provide a second embodiment of an Adaptive Wavelet Scalable HEVC (AWS2HVC) Intra Encoder/Decoder providing SNR scalable coding by combining Adaptive Wavelet Analysis/Synthesis, bit depth limiting and compatible HEVC Main10 or Main 4:2:2 10 Intra or Main 12 Intra coding. As shown, at an encoder side, an input video/image frame (frame) may undergo one level wavelet decomposition at an "Adaptive Wavelet Analysis Filtering" module resulting into 4 subbands (e.g., LL, HL, LH, and HH subbands) each of which are ¼$^{th}$ the size of input frame and 9 bit bit-depth. As discussed, adaptive wavelet analysis filtering may refer to the ability to choose, depending on the application, resolution or the like, a wavelet filter-set for analysis filtering. An index to the chosen filter-set (wfi) identifies the chosen filter set. As shown, the LL band (9 bit in bit depth) may be bit depth limited to 8 bits and encoded by a Base layer encoder such as an HEVC encoder (such as HEVC Main I/Main Still Picture/Main 10 I/Main 4:2:2 10 Intra) or an AVC encoder (such as H.264 Baseline I/Main I/High I/High 10 Intra/High 4:2:2 Intra) or the like at an "HEVC Main I/Main Still Picture/Main 10 I/Main 4:2:2 10 Intra; H.264 Baseline I/Main I/High I/High 10 Intra/High 4:2:2 Intra Encoder; other Encoders" resulting in a corresponding coded bitstream, and a locally decoded output. Furthermore, the LL subband may be input to a scalable HEVC encoder such as HEVC Scalable Main 10 I/Intra Encoder or the like at an "HEVC Scalable Main I/Scalable Main 10 I Encoder" that may use the local decoded base layer frame for prediction in SNR scalable encoding (labeled as "inter layer prediction"). Each of the other (e.g., HL, LH, and HH) subbands may be encoded by individual HEVC Main 10 I/Intra encoders at respective "HEVC Main 10 I/Main 4:2:2 10 Intra/Main 12 Intra Encoder". All 5 bitstreams (e.g., 1 base layer bitstream and 4 subband bitstreams) may be multiplexed along with headers (including a header that carries wfi index) by a "Muxer to Layered Bitstream" resulting in a single scalable AWS2HVC bitstream (bitstr).

FIG. 14 also shows the decoding side including receiving an AWS2HVC bitstream (bitstr) and demultiplexing the bitstream into headers and 5 individual bitstreams (e.g., 1 base layer bitstream and 4 subband bitstreams) by a "DeMuxer to Bitstream Layers". Based on an output selection implemented by a switch 1411, a user or system request or the like may provide a low, medium, or full resolution image or frame for presentment. For example, a decoded base layer of low resolution and quality may be selected (low resolution), a decoded LL band of the same resolution but higher quality than the base layer may be selected (medium resolution), or a full resolution output may be selected. If low resolution is selected (e.g., a decoded base layer is sufficient), the base layer bitstream is decoded by appropriate an HEVC Main I/Main Still Picture/Main 10 I/Main 4:2:2 10 Intra; H.264 Baseline I/Main I/High I/High 10 Intra/High 4:2:2 Intra decoder at an "HEVC Main I/Main Still Picture/Main 10 I/Main 4:2:2 10 Intra; H.264 Baseline I/Main I/High I/High 10 Intra/High 4:2:2 Intra Decoder; other Decoders" module depending on which encoder was for encoding. The decoded base layer output may be output with or without upsampling performed at a "1:2 Up Sampler" and sent to display (dec. frame). If a medium resolution output selection is made, a decoded LL band of the same resolution but higher quality (e.g., referred to as SNR scalability) may be provided by, in addition to decoding the base layer, decoding the LL band using the base layer as prediction. For decoding of LL band, a suitable decoder such as an HEVC Scalable Main 10 I/Intra decoder may be used at an "HEVC Scalable Main I/Scalable Main 10 I Decoder" module. The decoded output LL band may be bit depth limited and optionally 1:2 upsamped by a "Bit Depth Limiter & 1:2 Up Sampler" and output for display (dec. frame). If a full resolution decoded output is selected, then, in addition to decoding the LL subband, the remaining 3 subbands need to be decoded. Such subbands may be decoded by HEVC Main 10 I/Intra decoders at respective "HEVC Main 10 I/Main 4:2:2 10 Intra/Main 12 Intra Decoder" modules. The four decoded subbands may be combined at an "Adaptive Wavelet Analysis Filtering" module that uses the complimentary version of filter set (indexed by wfi) used at the encoder to generate a full resolution output (dec. frame).

Figure 15A:
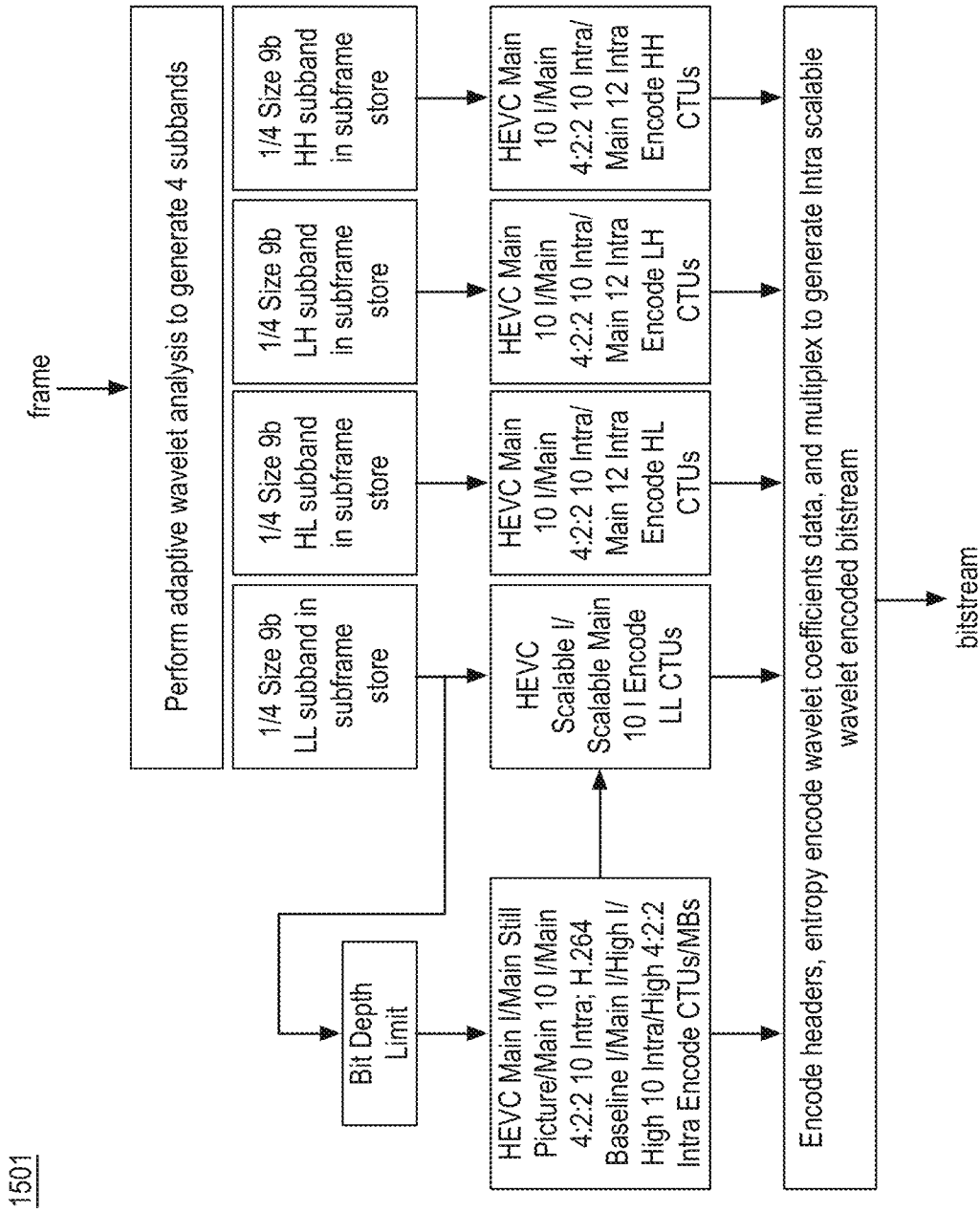
FIG. 15A illustrates an example process for Adaptive Wavelet Scalable HEVC (AWS2HVC) encoding.

FIG. 15A illustrates an example process 1501 for Adaptive Wavelet Scalable HEVC, referred to here as AWS2HVC encoding, example Adaptive Wavelet Scalable HEVC (AWS2HVC) encoder/decoder 1401, arranged in accordance with at least some implementations of the present disclosure. As shown, a video/image frame (labeled "frame") to be encoded may undergo decomposition into 4 wavelet subbands (LL, HL, LH, and HH) by one level adaptive wavelet analysis filtering (at the operation labeled "Perform adaptive wavelet analysis to generate 4 subbands"). Each of these subbands are of one-quarter size and each sample of each subband is of 9 bit bit-depth if the input is 8 bit bit-depth. The subbands may be stored in respective subframe stores (at the operation labeled "¼ Size 9b LL/HL/LH/HH subband in subframe store"). The LL band signal may be bit depth limited (at the operation labeled "Bit Depth Limit") and encoded as a base layer either by an HEVC encoder (e.g. HEVC Main I/Main Still Picture/Main 10 I/Main 4:2:2 10 I) by first partitioning it into CTUs, or by an AVC encoder (e.g. H.264 Baseline I/Main I/High I/High 10 Intra/High 4:2:2 Intra) by first partitioning it into MBs, resulting in a base layer bitstream and a locally decoded (LL) base layer signal (at the operation labeled "HEVC Main I/Main Still Picture/Main 10 I/Main 4:2:2 10 Intra; H.264 Baseline I/Main I/High I/High 10 Intra/High 4:2:2 Intra Encode CTUs/MBs"). Furthermore, the original LL band signal without bit-depth limiting may be encoded as an SNR quality enhancement layer with respect to the locally decoded LL band base layer signal used as prediction (along with prediction from previous decoded neighboring blocks of LL enhancement layer frame being coded). For example, the scalable encoding may be performed using HEVC Scalable Main 10 I/Intra encoder (at the operation labeled "HEVC Scalable I/Scalable Main 10 I Encode LL CTUs"). Next, the 3 remaining subbands of 9 bit bit depth are encoded with HEVC Main10 I/Intra encoder(s) (at the operations labeled "HEVC Main 10 I/Main 4:2:2 10 Intra/Main 12 Intra Encode HL/LH/HH CTUs") resulting in corresponding individual bitstreams. All the bitstreams and headers (including header that signals index of wavelet filter-set used for analysis by the encoder) may be multiplexed (at the operation labeled "Encode headers, entropy encode wavelet coefficients data, and multiplex to generate Intra scalable wavelet encoded bitstream") and output as a single scalable bitstream (labeled "bitstream").

Figure 15B:
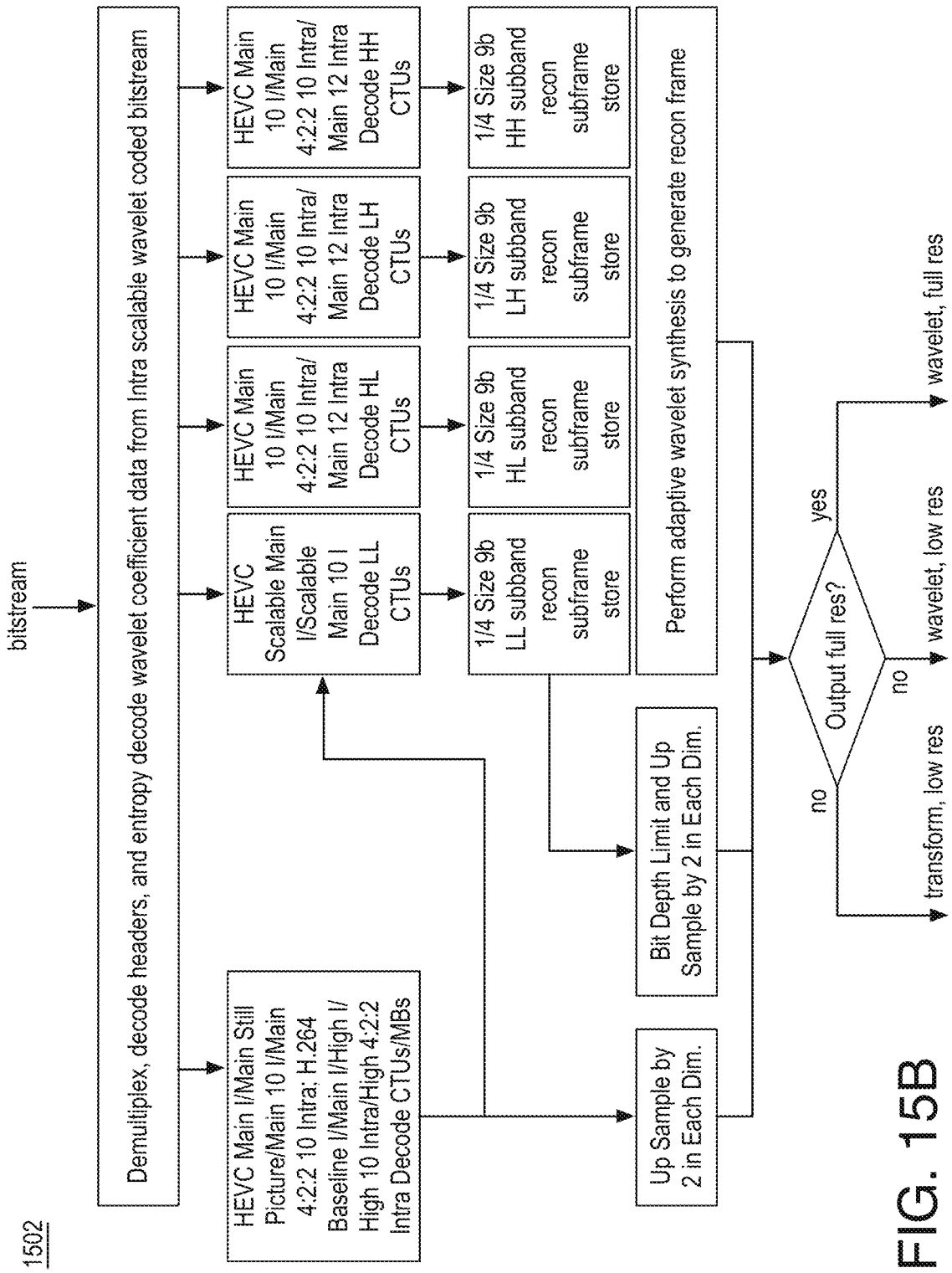
FIG. 15B illustrates an example process for Adaptive Wavelet Scalable HEVC (AWS2HVC) decoding.

FIG. 15B illustrates an example process 1502 for Adaptive Wavelet Scalable HEVC (AWS2HVC) decoding, arranged in accordance with at least some implementations of the present disclosure. As shown, an AWS2HVC scalable bitstream (labeled "bitstream") input to an AWS2HVC decoder may undergo demultiplexing into headers, a base layer encoded bitstream and four subband encoded bitstreams (at the operation labeled "Demultiplex, decode headers, and entropy decode wavelet coefficient data from Intra scalable wavelet coded bitstream"). Based on an output selection determined based on user input, system, or applications requirements or the like, an output frame or image may be generated (as implemented at the decision operation labeled "Output full res?"). If a low resolution/quality base layer signal is selected, a base layer bitstream may be decoded by an appropriate HEVC (e.g. HEVC Main I/Main Still Picture/Main 10 I/Main 4:2:2 10) or an AVC (H.264 Baseline I/Main I/High I/High 10 Intra/High 4:2:2 Intra) decoder (at the operation labeled "HEVC Main I/Main Still Picture/Main 10 I/Main 4:2:2 10 Intra; H.264 Baseline I/Main I/High I/High 10 Intra/High 4:2:2 Intra Decode CTUs/MBs") and provided with optional up sampling (at the operation labeled "Up Sample by 2 in Each Dim.") for display (labeled "transform, low res"). If medium resolution is selected, then, in addition to the base layer, the enhancement layer LL band signal is also decoded (at the operation labeled "HEVC Scalable Main I/Scalable Main 10 I Decode LL CTUs") and stored in subframe store (at the operation labeled "¼ Size 9b LL subband recon subframe store"). For decoding the enhancement layer, a scalable HEVC decoder such as an HEVC Scalable Main 10 I/Intra decoder may be employed, which takes as an additional input the decoded base layer signal for generating predictions required for decoding the enhancement layer. The decoded LL band enhancement layer may be bit depth limited and optionally up sampled (at the operation labeled "Bit Depth Limit and Up Sample by 2 in Each Dim.") for display (labeled "wavelet, low res"). If the output selection is full resolution, then decoding of all 5 demultiplexed bitstreams may be performed such that the LL band streams is decoded as discussed and the remaining 3 subbands are decoded (at the operations labeled "HEVC Main 10 I/Main 4:2:2 10 Intra/Main 12 Intra Decode HL/LH/HH CTUs") and stored (at the operations labeled "¼ Size 9b HL/LH/HH subband recon subframe store") in corresponding subframe stores. For example, decoding these subbands may be performed by HEVC Main 10 I/Intra decoder(s) or the like. All 4 decoded subband signals from subframe stores may be combined via adaptive wavelet synthesis filtering (at the operation labeled "Perform adaptive wavelet synthesis to generate recon frame") using the filter-set indicated by wfi index, to form higher resolution/quality signal that may be sent to display (labeled "wavelet, full res").

Figure 16:
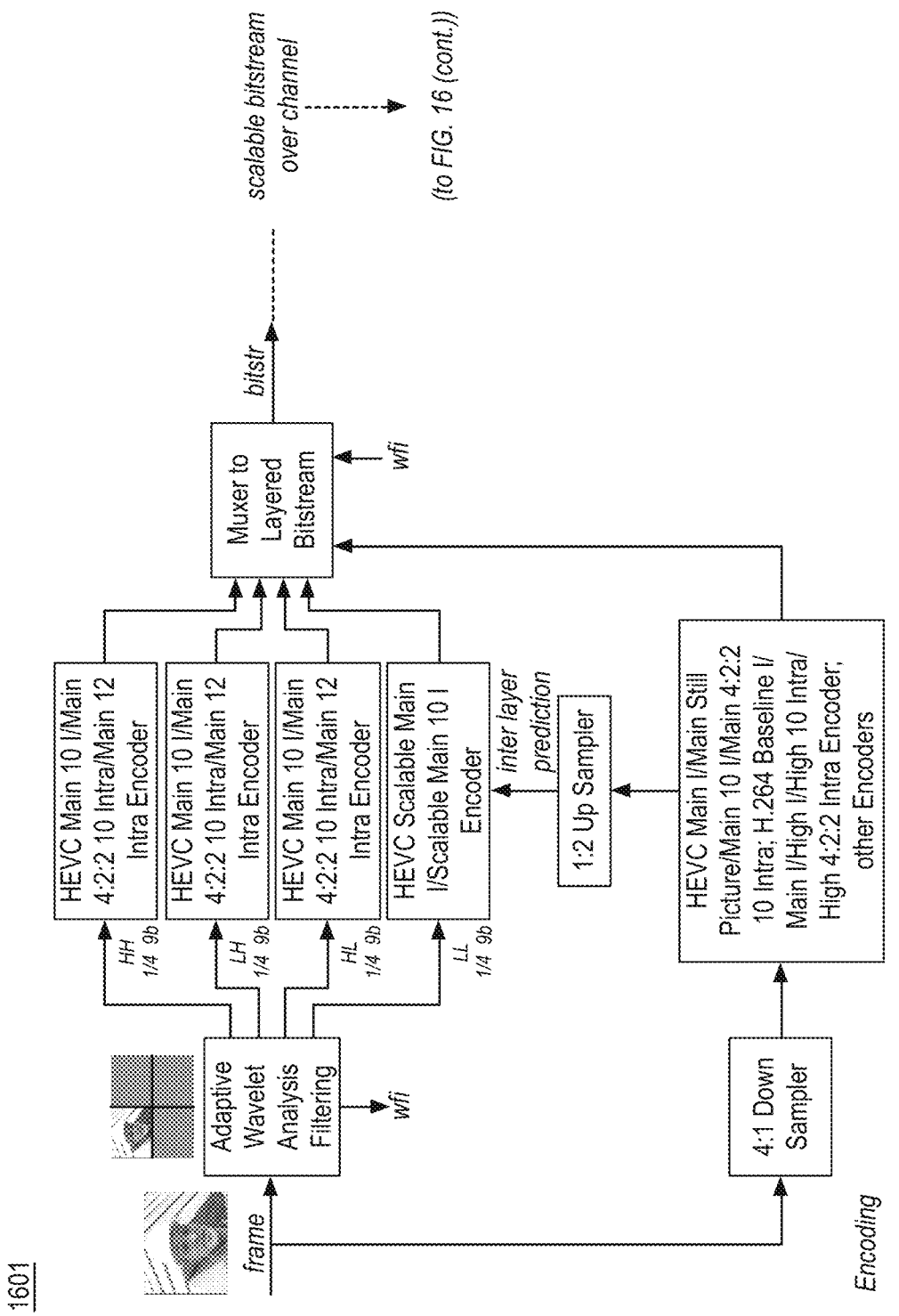
FIG. 16 is a block diagram of an example Adaptive Wavelet Scalable HEVC (AWS3HVC) coding system.
Figure 16:
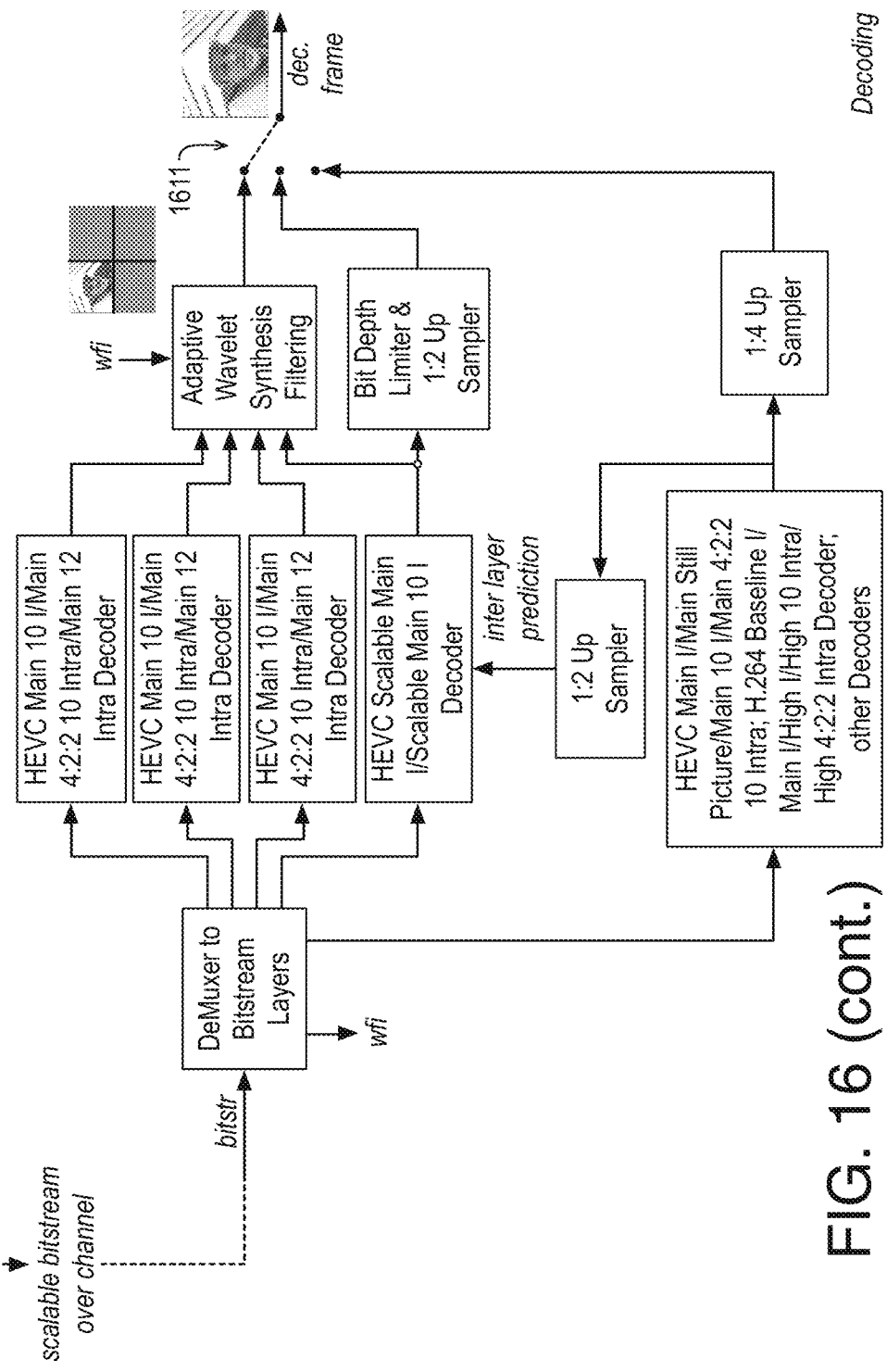

FIG. 16 is a block diagram of an example Adaptive Wavelet Scalable HEVC (AWS3HVC) coding system 1601, arranged in accordance with at least some implementations of the present disclosure. For example, FIG. 16 may provide a third embodiment of an Adaptive Wavelet Scalable HEVC (AWS3HVC) Intra Encoder/Decoder including Spatially scalable coding by combining Adaptive Wavelet Analysis/Synthesis, down/upsampling, and compatible HEVC Main10 or Main 4:2:2 10 Intra or Main 12 Intra coding. As shown, at the encoding side, an input video frame or image (frame) may be filtered and downsampled by a factor of 4 in each dimension by a "4:1 Down Sampler". Since it is normal 8-bit bit-depth pixel-domain signal, the down sampled image or frame may be encoded by an HEVC encoder (e.g. HEVC Main I or HEVC Main Still Picture or HEVC Main 10 I or HEVC Main 10 I or HEVC Main 4:2:2 10 Intra) or an AVC encoder (e.g. H.264 Baseline I or H.264 Main I or H.264 High I or H.264 High 10 Intra or H.264 High 4:2:2 Intra) or the like at an "HEVC Main I/Main Still Picture/Main 10 I/Main 4:2:2 10 Intra; H.264 Baseline I/Main I/High I/High 10 Intra/High 4:2:2 Intra Encoder; other Encoders" module. The result of the encoding may be an encoded bitstream referred to as base layer bitstream and decoded base layer signal. Furthermore, the same input video/image frame (without downsampling) may undergo Adaptive Wavelet Analysis Filtering (with filter-set depending on application, resolution or user requirements) at an "Adaptive Wavelet Analysis Filtering" module that decomposes the frame into LL, HL, LH and HH subbands. The local decoded video/image subframe from the base layer encoder may be upsampled by 2 in each direction by a "1:2 Up Sampler" and used for "inter-band" prediction (labeled "inter layer prediction") and coding of the LL band. For coding the LL subband, a Scalable HEVC Main10 I/Intra encoder capable of handling spatially scalable coding of LL-band which is a 9-bit bit-depth signal may be used at an "HEVC Scalable Main I/Scalable Main 10 I Encoder" module. Such a spatial scalability structure may allow the LL band intra coding to use locally adaptive prediction from the LL band and from the base layer that is not wavelet encoded (e.g., this may require bit shifting to extend base layer to 9 bit signal before using it for prediction). In the example of FIG. 16, the Base layer may use $¼^{th}$ resolution of the wavelet LL subband so the base layer decoded video/image frame needs to be upsampled by 2 in each dimension prior to prediction of the LL band as shown. Such scalability may be characterized as two layer (e.g., base layer and LL band layer) spatial scalability.

Coding of the remaining 3 (HL, LH and HH) subbands may be performed as discussed herein. For example, such coding may use HEVC Main 10 I/Intra encoder(s) or the like at respective "HEVC Main 10 I/Main 4:2:2 10 Intra/Main 12 Intra Encoder" modules. The resulting base layer bitstream and 4 subband bitstreams may be multiplexed along with headers by a "Muxer to Layered Bitstream" into a single bitstream (bitstr). The headers included indicate which filter set was used for adaptive wavelet analysis filtering and that the LL band is Spatial scalably encoded with respect to an external (non subband) base layer.

The decoding end of the AWS3HVC system may perform the reverse process by receiving a multiplexed base layer bitstream (bitstr) and demultiplexing the multiplexed base layer bitstream and subband bitstreams and decoding the necessary headers to determine the scalability used and create decoding structures necessary for successfully decoding the scalable streams. Three output selections may available for decoding as implemented by a switch 1611: decoding a standalone coded base layer stream at $¹⁄_{16}^{th}$ resolution (¼ in each dimension) that results in a lower quality decoded video/image frame than the LL band (low resolution selection), a $¼^{th}$ resolution LL band stream decoding the may provide $¼^{th}$ resolution video/image frame at moderate resolution/quality (medium resolution selection), and an output of adaptive wavelet synthesis filtering that combines 4 subbands resulting in full resolution/quality decoded video/image frame (full resolution selection). The actual decoding techniques chosen may depend on user, application, or system requirements as implemented by switch 1611.

If a low resolution selection is made (e.g., a standalone base-layer resolution/quality is sufficient), the standalone base-layer stream may be decoded using a matching (depending on the encoder used on encoding side) HEVC (e.g. HEVC Main I or HEVC Main Still Picture or HEVC Main 10 I or HEVC Main 10 I or HEVC Main 4:2:2 10 Intra) decoder or an AVC (e.g. H.264 Baseline I or H.264 Main I or H.264 High I or H.264 High 10 Intra or H.264 High 4:2:2 Intra) decoder as implemented by an "HEVC Main I/Main Still Picture/Main 10 I/Main 4:2:2 10 Intra; H.264 Baseline I/Main I/High I/High 10 Intra/High 4:2:2 Intra Decoder; other Decoders" module. As shown, the decoded video/image frame may be upsampled by a "1:4 Up Sampler" and presented for display (dec. frame). If a medium quality selection is made (e.g., the LL band output is desired), the base layer needs to be decoded (as just described) and the LL band needs to be decoded by, for example, an HEVC Scalable Main 10 I/Intra decoder at the "HEVC Scalable Main I/Scalable Main 10 I Decoder" that uses decoded upsampled base layer video/image frame(s) as generated by the "HEVC Main I/Main Still Picture/Main 10 I/Main 4:2:2 10 Intra; H.264 Baseline I/Main I/High I/High 10 Intra/High 4:2:2 Intra Decoder; other Decoders" and the "1:2 Up Sampler" (labeled "inter layer prediction") for Spatially scalable prediction. The resultant image may be optionally bit depth limited and up sampled by a "Bit Depth Limiter & 1:2 Up Sampler" and presented for display (dec. frame). If the output selection is full resolution (e.g., the user or system requires full resolution/quality decoded video/image frame(s), in addition to the process just described for decoding the LL subband, the 3 remaining wavelet subbands such as HL, LH and HH subbands need to be decoded by using HEVC Main 10 I/Intra decoder(s) at respective "HEVC Main 10 I/Main 4:2:2 10 Intra/Main 12 Intra Decoder" modules. All four decoded subbands may be input to an "Adaptive Wavelet Synthesis Filtering" module that performs synthesis filtering using the filter set information decoded from header in the bitstream and the output of this process is a decoded full resolution/quality video/image frame for presentment (dec. frame).

Figure 17A:
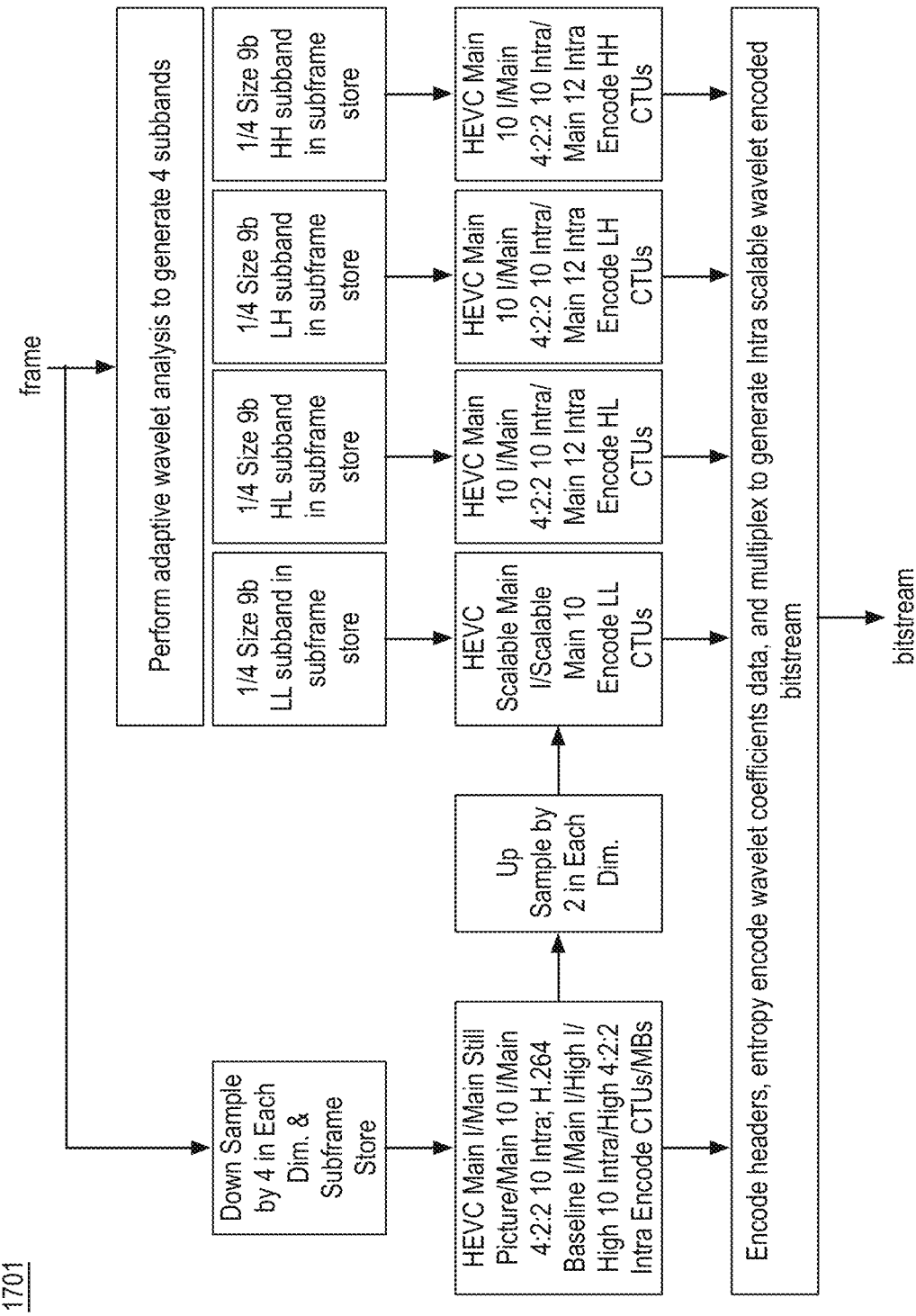
FIG. 17A illustrates an example process for Adaptive Wavelet Scalable HEVC (AWS3HVC) Intra Encoding.

FIG. 17A illustrates an example process 1701 for Adaptive Wavelet Scalable HEVC (AWS3HVC) Intra Encoding, arranged in accordance with at least some implementations of the present disclosure. For example, FIG. 17A may provide a third embodiment of Adaptive Wavelet Scalable HEVC (AWS3HVC) Intra Encoding. As shown, an input video/image frame (labeled "frame") may be filtered and downsampled by a factor of 4 in each dimension (at the operation labeled "Down Sample by 4 in Each Dim. & Subframe Store") resulting in a $\frac{1}{16}^{th}$ size frame that may be stored (at the operation labeled "Down Sample by 4 in Each Dim. & Subframe Store") and encoded by an encoder such as an HEVC (HEVC Main I or HEVC Main Still Picture or Main 10 I or HEVC Main 10 I or HEVC Main 4:2:2 10 Intra) encoder or an AVC (H.264 Baseline I or H.264 Main I or H.264 High I or H.264 High 10 Intra or H.264 High 4:2:2 Intra) encoder (at the operation labeled "HEVC Main I/Main Still Picture/Main 10 I/Main 4:2:2 10 Intra; H.264 Baseline I/Main I/High I/High 10 Intra/High 4:2:2 Intra Encode CTUs/MBs"). The generated encoded bitstream may be characterized as a base-layer bitstream. Furthermore, the input video/image frame may be adaptive wavelet analysis filtered (at the operation labeled "Perform adaptive wavelet analysis to generate 4 subbands") using a filter set (depending on application, content, or user requirement) into LL, HL, LH and HH wavelet subbands. The 4 subbands may be stored in corresponding frame stores that can store ¼ size 9-bit bit depth subframes that are then encoded (at the operations labeled "¼ Size 9b LL/HL/LH/HH subband in subframe store"). The LL band may undergo Scalable HEVC Main10 I/intra encoding that uses spatial scalability encoding (at the operation labeled "HEVC Scalable Main I/Scalable Main 10 Encode LL CTUs") with respect to the locally decoded upsampled base-layer video/image frame (as provided by the operations labeled "HEVC Main I/Main Still Picture/Main 10 I/Main 4:2:2 10 Intra; H.264 Baseline I/Main I/High I/High 10 Intra/High 4:2:2 Intra Encode CTUs/MBs" and "Up Sample by 2 in Each Dim."). As shown, all five encoded streams may be multiplexed with several headers that carry information such as which wavelet filter set was used for analysis and which type of scalability is used for coding LL band with respect to non-wavelet encoded base layer (at the operation labeled "Encode headers, entropy encode wavelet coefficients data, and multiplex to generate Intra scalable wavelet encoded bitstream") to generate a single bitstream (labeled "bitstream").

Figure 17B:
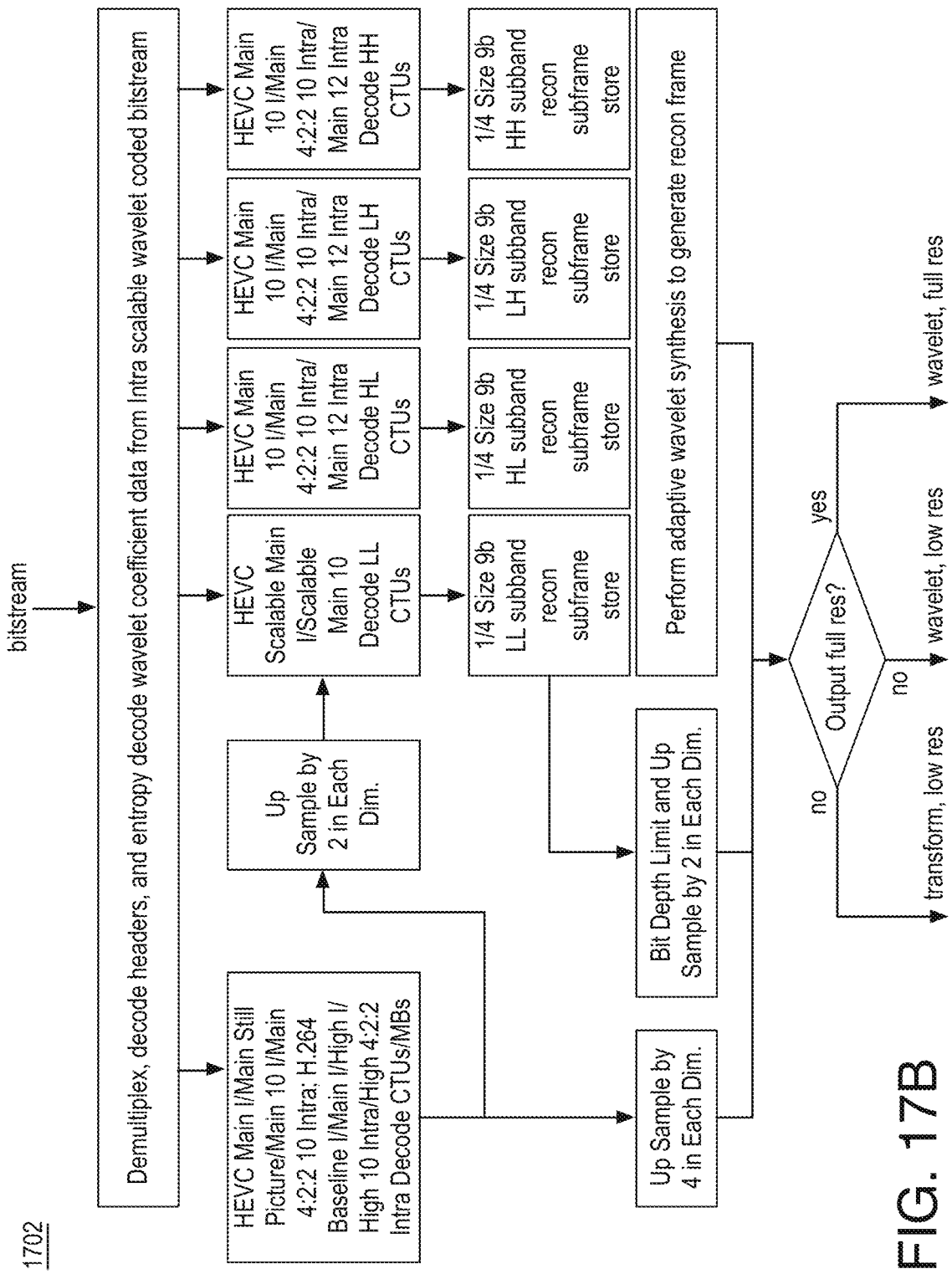
FIG. 17B illustrates an example process for Adaptive Wavelet Scalable HEVC (AWS3HVC) Intra Decoding.

FIG. 17B illustrates an example process 1701 for Adaptive Wavelet Scalable HEVC (AWS3HVC) Intra Decoding, arranged in accordance with at least some implementations of the present disclosure. For example, FIG. 17B may provide Adaptive Wavelet Scalable HEVC (AWS3HVC) Intra Decoding as performed by the AWS3HVC system of FIG. 16. As shown, a bitstream to be decoded (labeled "bitstream") may be demultiplexed into each of five different bitstreams and headers may be decoded (at the operation labeled "Demultiplex, decode headers, and entropy decode wavelet coefficient data from Intra scalable wavelet coded bitstream"). As discussed headers may carry information on which wavelet filter-set was chosen at encoder as well as which type of scalability is used so that the necessary decoding structure may be used. Of the five bitstreams demultiplexed, the first one is a base layer bitstream while the others are LL, HL, LH and HH subband bitstreams. Three output selections may be available including: decoding the standalone coded base layer bitstream at $\frac{1}{16}^{th}$ resolution that results in lower quality decoded video/image frame (low resolution selection), decoding the $\frac{1}{4}^{th}$ resolution LL band bitstream which can provide a $\frac{1}{4}^{th}$ resolution video/image frame at medium resolution/quality (medium resolution selection), and decoding all 4 bands and providing adaptive wavelet synthesis filtering resulting in full resolution/quality decoded video/image frame (full resolution selection). The actual decoding technique selected may depend on application or user requirements or the like (as implemented by the decision operation labeled "Output full res?").

If low resolution is selected (e.g., standalone base-layer resolution/quality is deemed sufficient), the base layer bitstream may be decoded using a matching decoding (to the encoding) such as an HEVC (e.g. HEVC Main I or HEVC Main Still Picture or Main 10 I or HEVC Main 10 I or HEVC Main 4:2:2 10 Intra) decoder or an AVC (e.g. H.264 Baseline I or H.264 Main I or H.264 High I or H.264 High 10 Intra or H.264 High 4:2:2 Intra) decoder (at the operation labeled "HEVC Main I/Main Still Picture/Main 10 I/Main 4:2:2 10 Intra; H.264 Baseline I/Main I/High I/High 10 Intra/High 4:2:2 Intra Decode CTUs/MBs"). The decoded video/image frame may be optionally upsampled (at the operation labeled "Up Sample by 4 in Each Dim.") for display (labeled "transform, low res"). If medium resolution is selected (e.g., middle quality LL band output is desired), the base layer needs to be decoded (as discussed) and the LL band needs to be decoded by an HEVC Scalable Main 10 I/Intra decoding (at the operation labeled "HEVC Scalable Main I/Scalable Main 10 Decode LL CTUs") that uses decoded base layer video/image frame for spatially scalable prediction (as provided by the operations labeled "HEVC Main I/Main Still Picture/Main 10 I/Main 4:2:2 10 Intra; H.264 Baseline I/Main I/High I/High 10 Intra/High 4:2:2 Intra Decode CTUs/MBs" and "Up Sample by 2 in Each Dim."). The generated LL band output may be stored (at the operation labeled "¼ Size 9b LL subband recon subframe store") optionally bit depth limited and/or upsampled (at the operation labeled "Bit Depth Limit and Up Sample by 2 in Each Dim.") for display (labeled "wavelet, low res"). If high resolution is selected (e.g., the user or application requires a full resolution/quality decoded video/image frame), in addition to the process just described for decoding the LL subband, the 3 remaining wavelet subbands such as HL, LH and HH subbands need to be decoded by using HEVC Main 10 I/Intra decoding (at the operations labeled "HEVC Main 10 I/Main 4:2:2 10 Intra/Main 12 Intra Decode HL/LH/HH CTUs"). All four decoded subbands may be stored (at the operations labeled "¼ Size 9b HL/LH/HH subband recon subframe store") and input to adaptive wavelet synthesis filtering that combines the 4 subbands (at the operation labeled "Perform adaptive wavelet synthesis to generate recon frame") using the filter-set the index of which is decoded from header in the bitstream. The output of such processing is a decoded full resolution/quality video/image frame that may be output for display (labeled "wavelet, full res").

Figure 18:
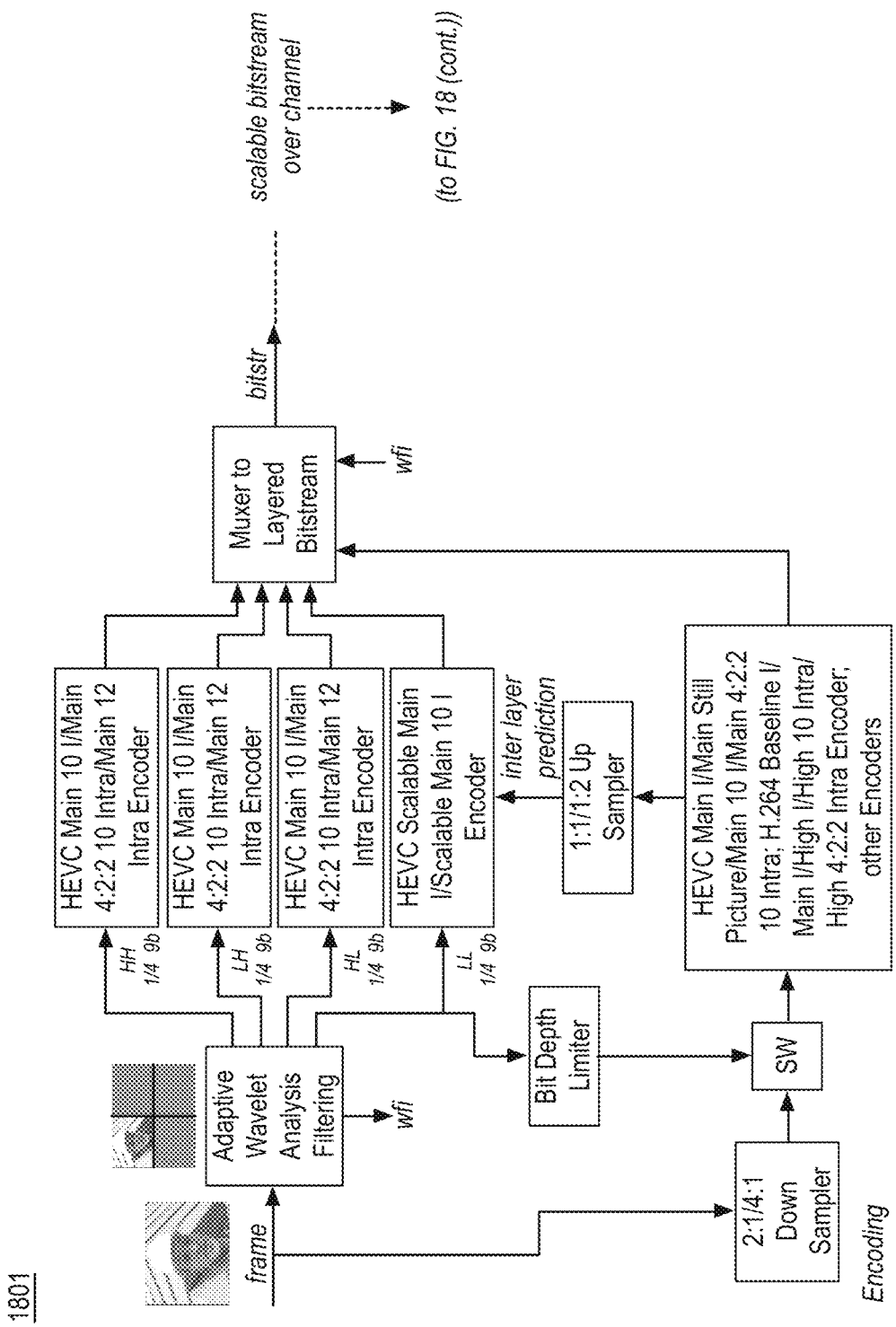
FIG. 18 is a block diagram of an example Adaptive Wavelet Scalable HEVC (AWS4HVC) coding system.
Figure 18:
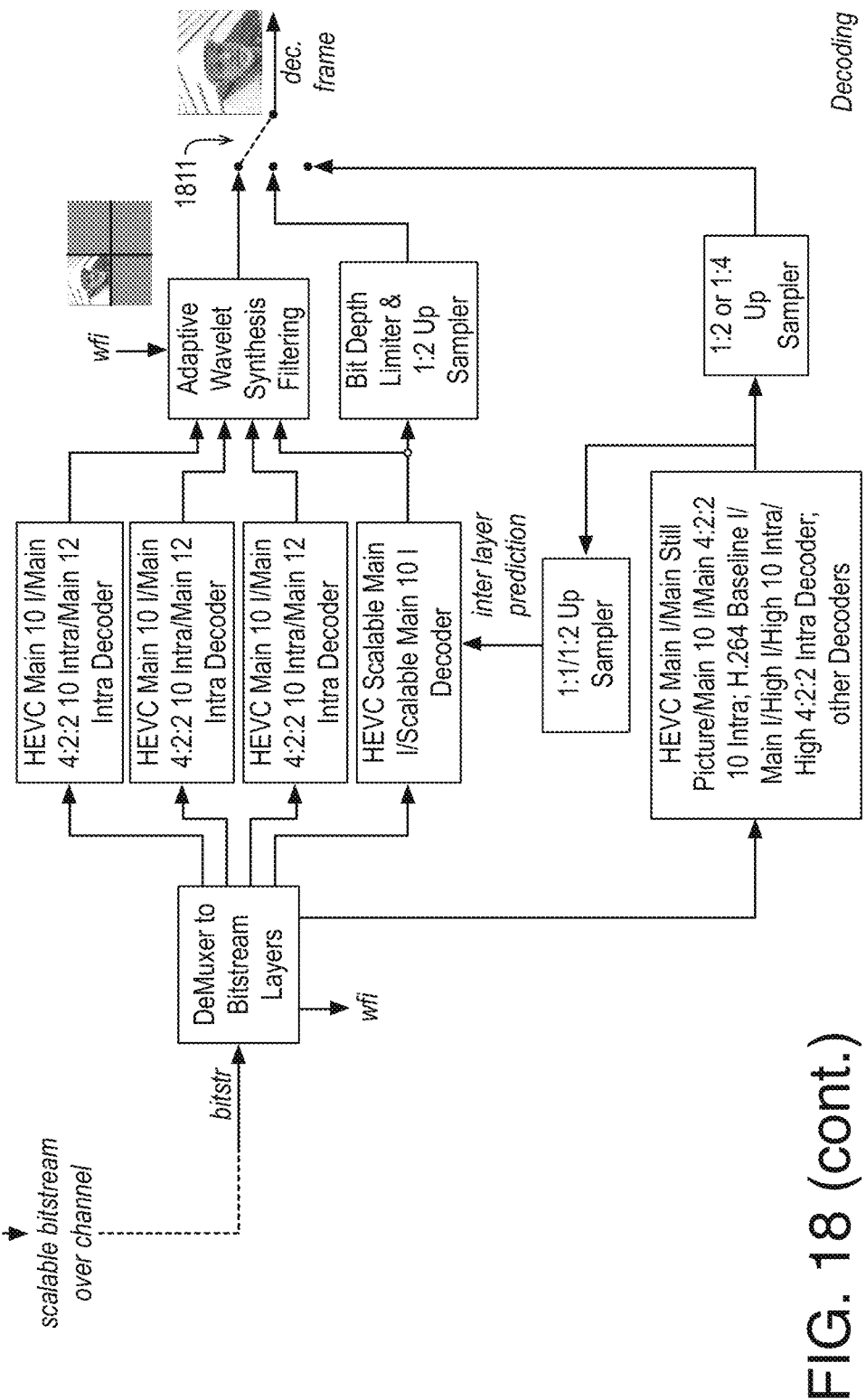

FIG. 18 is a block diagram of an example Adaptive Wavelet Scalable HEVC (AWS4HVC) coding system 1801, arranged in accordance with at least some implementations of the present disclosure. For example, FIG. 18 may provide a fourth embodiment of an Adaptive Wavelet Scalable HEVC (AWS4HVC) Intra Encoder/Decoder including Spatial and/or SNR scalable coding by combining Adaptive Wavelet Analysis/Synthesis, down/upsampling, bit depth limiting, and compatible HEVC Main10 or Main 4:2:2 10 Intra or Main 12 Intra coding. For example, FIG. 18 embodies a combined coding functionality of FIG. 12 (which provides SNR scalability with LL band using external base layer), FIG. 14 (which provides SNR scalability coding LL band as two quality layers), and FIG. 16 (which provides spatial scalability with LL band using external base layer). The AWS4HVC system of FIG. 18 represents both encoding and decoding side as is the case for AWS1HVC system of FIG. 12, AWS2HVC system of FIG. 14, and AWS3HVC system of FIG. 16. Furthermore, the decoding side of AWS4HVC system also represents 3 different potential choices for decoding and display in all cases that may be characterized as lower quality output, a medium quality output, and a high quality output.

The encoding subsystem of FIG. 18 may use 3 types of encoders such as a base layer encoder (e.g. either an HEVC encoder, an HEVC Main I or HEVC Main Still Picture or Main 10 I or HEVC Main 10 I or HEVC Main 4:2:2 10 Intra or an AVC encoder, H.264 Baseline I or H.264 Main I or H.264 High I or H.264 High 10 Intra or H.264 High 4:2:2 Intra encoder as implemented at a "HEVC Main I/Main Still Picture/Main 10 I/Main 4:2:2 10 Intra; H.264 Baseline I/Main I/High I/High 10 Intra/High 4:2:2 Intra Encoder; other Encoders" module), a spatial/SNR enhancement layer encoder (e.g. a scalable encoder such as an HEVC Scalable Main 10 I/Intra implemented at a "HEVC Scalable Main I/Scalable Main 10 I Encoder" module), and a normal encoder (e.g. a nonscalable encoder such as n HEVC Main 10 I/Intra encoder at respective "HEVC Main 10 I/Main 4:2:2 10 Intra/Main 12 Intra Encoder" modules) for the remaining 3 subbands. For encoding of the base layer, a "Bit Depth Limiter" which may be needed necessary to bit-depth the LL-band from 9 bits to 8 bits may be provided. The encoding subsystem supports downscaling factors of either 2:1 or 4:1 in each dimension at a "2:1/4:1 Down Sampler", and upscaling factors of 1:1 (no upscaling) or 1:2 in each dimension at a "1:1/1:2 Up Sampler". As shown via the switch (labeled "SW"), a selection may be made between using a downsampled version of the input frame or image or a bit depth limited LL band for base layer encoding.

The encoding system of FIG. 18 may operate similarly to the encoding systems of FIGS. 12, 14, and 16. As shown, an input video/image frame (frame) may be downsampled by 2:1 for SNR scalable encoding or by 4:1 for spatially scalable encoding when an external base layer is used by the "2:1/4:1 Down Sampler" or not at all if such external base layer coding is not selected by the switch "SW". The input frame or image may also be decomposed into 4 subbands by an "Adaptive Wavelet Analysis Filtering" module. If the LL band itself is to be used as a base layer (e.g., in a third scalable coding case), the LL band may be bit depth limited. Depending on scalable coding to be performed as selected by the switch "SW" the appropriate input (2:1 down sampled original, 4:1 down sampled original, or LL band after bit depth limiting) is routed via switch "SW" to a base layer encoder which is either an HEVC encoder (e.g. HEVC Main I or HEVC Main Still Picture or HEVC Main 10 I or HEVC Main 10 I or HEVC Main 4:2:2 10 Intra) or an AVC encoder (e.g. H.264 Baseline I or H.264 Main I or H.264 High I or H.264 High 10 Intra or H.264 High 4:2:2 Intra) as implemented by the "HEVC Main I/Main Still Picture/Main 10 I/Main 4:2:2 10 Intra; H.264 Baseline I/Main I/High I/High 10 Intra/High 4:2:2 Intra Encoder; other Encoders" module. The result of the encoding is an encoded base layer bitstream that may be provided to a "Muxer to Layered Bitstream" and a locally decoded base layer signal. The local decoded base layer signal may be optionally upsampled by 2 in each direction (or not depending on the scalability) by the "1:1/1:2 Up Sampler" and used for "inter-band" prediction and coding of the LL band (labeled "inter layer prediction"). For coding of the LL subband, a Scalable HEVC Main 10 I/Intra encoder capable of handling spatially scalable coding of LL-band (a 9 bit bit depth signal) may be used at the "HEVC Scalable Main I/Scalable Main 10 I Encoder" module. This type of SNR or spatial scalability structure allows the LL band intra coding to use locally adaptive prediction not only from the LL band but also from (optionally upsampled) base layer. As shown, the remaining subbands (e.g., HL, LH, and HH) may be encoded as discussed herein at the respective "HEVC Main 10 I/Main 4:2:2 10 Intra/Main 12 Intra Encoder" modules. The resulting base layer bitstream and 4 subband bitstreams may be multiplexed along with headers by the "Muxer to Layered Bitstream" into a single bitstream (bitstr). The headers included indicate which filter set was used for adaptive wavelet analysis filtering, that the LL band is scalably encoded, and with respect to which base layer the LL band scalably encoded.

As shown, the decoding subsystem of FIG. 18 may use 3 types of decoders such as a base layer decoder (e.g. either an HEVC Main I or HEVC Main Still Picture or Main 10 I or HEVC Main 10 I or HEVC Main 4:2:2 10 Intra decoder or an H.264 Baseline I or H.264 Main I or H.264 High I or H.264 High 10 Intra or H.264 High 4:2:2 Intra decoder as implemented at an HEVC Main I/Main Still Picture/Main 10 I/Main 4:2:2 10 Intra; H.264 Baseline I/Main I/High I/High 10 Intra/High 4:2:2 Intra Decoder; other Decoders modules), a spatial/SNR enhancement layer decoder (e.g., a scalable encoder such as an HEVC Scalable Main 10 I/Intra decoder implemented at an "HEVC Scalable Main I/Scalable Main 10 I Decoder" module), and a normal decoder (e.g. a nonscalable decoder HEVC Main 10 I/Intra implemented at respective "HEVC Main 10 I/Main 4:2:2 10 Intra/Main 12 Intra Decoder" modules) for the remaining 3 subbands. The decoding subsystem supports upscaling factors of either 1:1 or 1:2 in each dimension at a "1:1/1:2 Up Sampler" for generating predictions for encoding and upscaling factors of 1:2 or 1:4 for display (at a "1:2 or 1:4 Up Sampler" and a "Bit Depth Limiter & 1:2 Up Sampler"). For display purposes, bit depth limiting may be necessary to limit bit depth of LL band to 8 bits.

FIG. 18 also shows the decoding end including receiving an AWS4HVC bitstream (bitstr) and demultiplexing it into headers and 5 individual bitstreams (1 base layer bitstream and 4 subband bitstreams) at a "DeMuxer to Bitstream Layers". Furthermore, an output selection may be implemented by a switch 1811. For example, depending on a user or system request or the like either a decoded base layer of lower resolution (low resolution selection) and quality may be sufficient, a decoded LL band of the same resolution but higher quality than the base layer (medium resolution selection) may be used, or a decoded full resolution output (full resolution selection) may be output. If the low resolution selection is made (e.g., a decoded base layer may be sufficient), the base layer bitstream is decoded by an appropriate HEVC Main I/Main Still Picture/Main 10 I/Main 4:2:2 10 Intra; H.264 Baseline I/Main I/High I/High 10 Intra/High 4:2:2 Intra decoder depending on which encoder was for encoding at the "HEVC Main I/Main Still Picture/ Main 10 I/Main 4:2:2 10 Intra; H.264 Baseline I/Main I/High I/High 10 Intra/High 4:2:2 Intra Decoder; other Decoders" module. The decoded base layer may be optionally upsampled at the "1:2 or 1:4 Up Sampler" and sent to display (dec. frame). If a medium resolution seletion is made (e.g., the decoded LL band of the same resolution but medium/better quality is necessary), in addition to decoding the base layer, the LL band also needs to be decoded and uses (optionally upsampled) base layer as prediction. For example, inter layer prediction may be provided from the decoded base layer as optionally up sampled at the "1:1/1:2 Up Sampler". For decoding of LL band, a suitable decoder such as an HEVC Scalable Main 10 I/Intra decoder may be used as implemented at the "HEVC Scalable Main I/Scalable Main 10 I Decoder" module. The decoded output of the LL band may be optionally bit depth limited and/or 1:2 upsampled by the "Bit Depth Limiter & 1:2 Up Sampler" and output for display (dec. frame). If a full resolution selection is made (e.g., a full resolution decoded output is needed), then in addition to decoding the LL subband, the remaining 3 subbands (e.g., LH, HL, HH) also need to be decoded. For decoding such subbands HEVC Main 10 I/Intra decoders may be used at respective "HEVC Main 10 I/Main 4:2:2 10 Intra/Main 12 Intra Decoder" modules. The four decoded subbands may be combined at an "Adaptive Wavelet Analysis Filtering" module that may use the complimentary version of filter set (indexed by wfi) used at the encoder to generate a full resolution output for display (dec. frame).

Figure 19A:
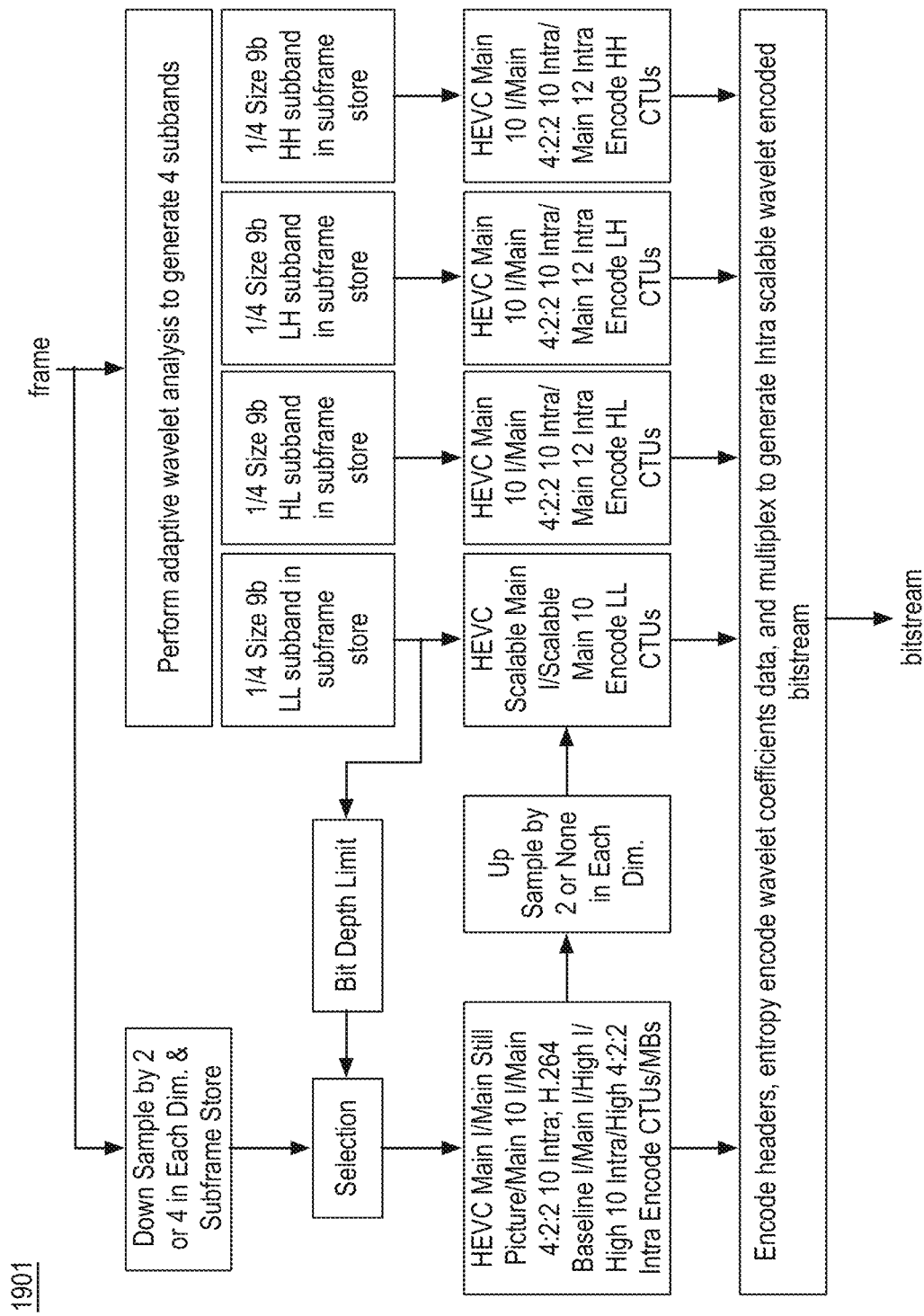
FIG. 19A illustrates an example process for Adaptive Wavelet Scalable HEVC (AWS4HVC) Intra encoding.

FIG. 19A illustrates an example process 1901 for Adaptive Wavelet Scalable HEVC (AWS4HVC) Intra encoding, arranged in accordance with at least some implementations of the present disclosure. For example, FIG. 19A may provide a fourth embodiment of Adaptive Wavelet Scalable HEVC (AWS4HVC) Intra encoding that may be performed by the AWS4HVC system of FIG. 18. As shown, an input video/image frame (labeled "frame") may be downsampled by a factor of 2 or 4 or not at all in each dimension and stored (at the operation labeled "Down Sample by 4 in Each Dim. & Subframe Store") resulting in either a $\frac{1}{16}^{th}$ size or a $\frac{1}{4}^{th}$ size or same size frame for potential use as a base layer (at the selected at the operation labeled "Selection"). Furthermore, the input video/image frame may be adaptive wavelet analysis filtered using a filter set (depending on application, content, or user requirement) into LL, HL, LH and HH wavelet subbands (at the operation labeled "Perform adaptive wavelet analysis to generate 4 subbands"). In one case of scalability, the LL band signal may be bit depth limited (at the operation labeled "Bit Depth Limit"), and is also a candidate for base layer (as provided to the operation labeled "Selection"). A selector switch or the like may determine which of the three signals to use for base layer encoding (at the operation labeled "Selection"). The selected base layer may be encoded by an encoder such as an HEVC (HEVC Main I or HEVC Main Still Picture or Main 10 I or HEVC Main 10 I or HEVC Main 4:2:2 10 Intra) encoder or an AVC (H.264 Baseline I or H.264 Main I or H.264 High I or H.264 High 10 Intra or H.264 High 4:2:2 Intra) encoder (at the operation labeled "HEVC Main I/Main Still Picture/Main 10 I/Main 4:2:2 10 Intra; H.264 Baseline I/Main I/High I/High 10 Intra/High 4:2:2 Intra Encode CTUs/MBs"). The result of the encoding is a base-layer bitstream and local decoded base layer signal. The 4 subbands may be stored (at the operations labeled "¼ Size 9b LL subband in subframe store") in corresponding frame stores that can store ¼ size 9-bit bit depth subframes that may then be encoded. The LL band may undergo Scalable HEVC Main10 I/intra encoding (at the operation labeled "HEVC Scalable Main I/Scalable Main 10 Encode LL CTUs") that uses spatial or SNR scalable encoding with respect to locally decoded optionally upsampled base-layer video/image frame (as provided by the operations labeled "HEVC Main I/Main Still Picture/ Main 10 I/Main 4:2:2 10 Intra; H.264 Baseline I/Main I/High I/High 10 Intra/High 4:2:2 Intra Encode CTUs/MBs" and "Up Sample by 2 or None in Each Dim."). The remaining subbands may be coded as discussed herein (at operations labeled "HEVC Main 10 I/Main 4:2:2 10 Intra/Main 12 Intra Encode HL/LH/HH CTUs"). As shown, all five encoded streams may be multiplexed with several headers that carry information such as which wavelet filter set was used for analysis and which type of scalability is used for coding LL band (at the operation labeled "Encode headers, entropy encode wavelet coefficients data, and multiplex to generate Intra scalable wavelet encoded bitstream").

Figure 19B:
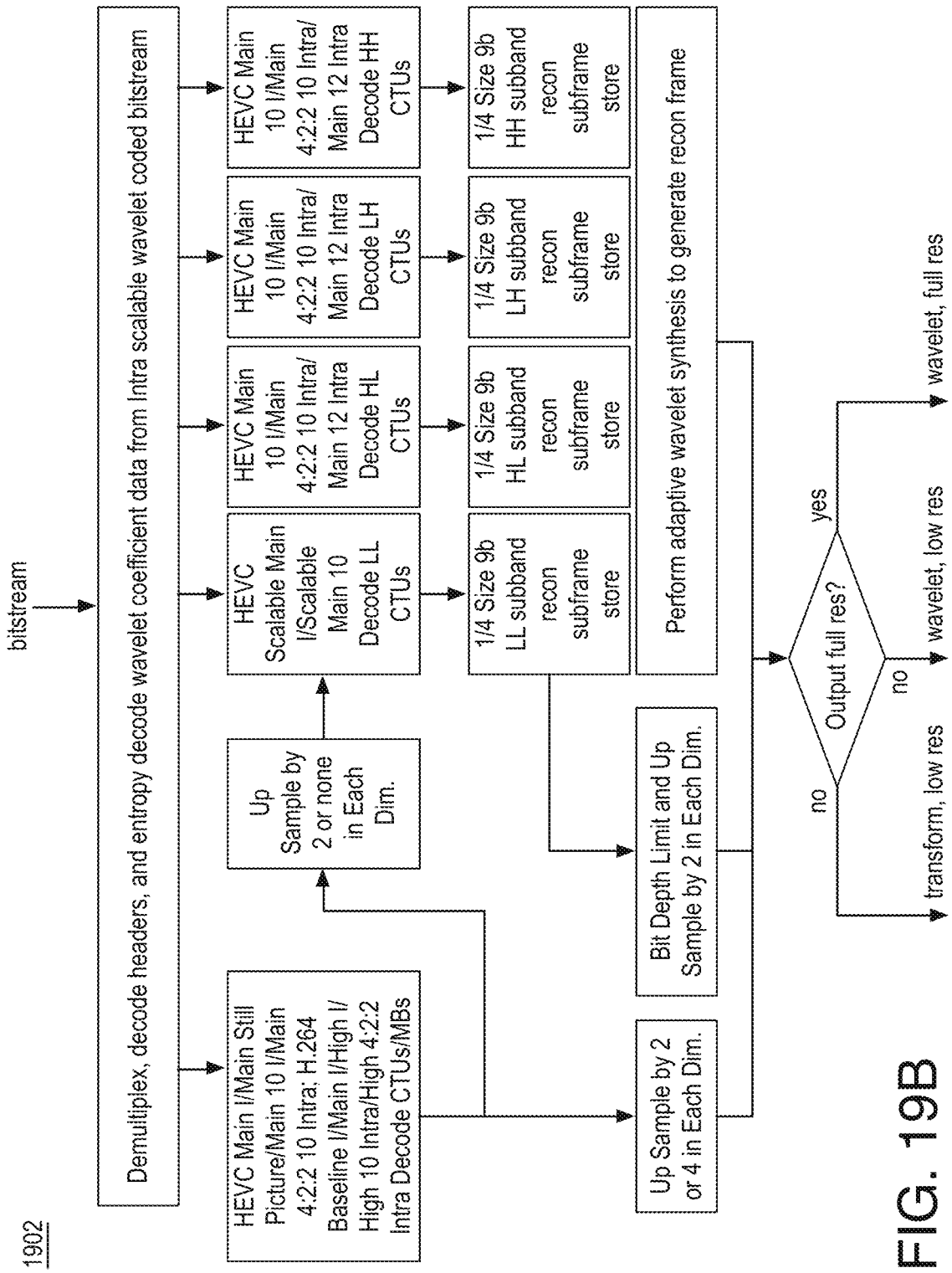
FIG. 19B illustrates an example process for Adaptive Wavelet Scalable HEVC (AWS4HVC) Intra decoding.

FIG. 19B illustrates an example process 1902 for Adaptive Wavelet Scalable HEVC (AWS4HVC) Intra decoding, arranged in accordance with at least some implementations of the present disclosure. For example, FIG. 19B may provide a fourth embodiment of Adaptive Wavelet Scalable HEVC (AWS4HVC) Intra decoding as performed by the AWS4HVC system of FIG. 18. As shown, a bitstream (labeled "bitstream") to be decoded may be demultiplexed into each of five different bitstreams and headers may be decoded (at the operation labeled "Demultiplex, decode headers, and entropy decode wavelet coefficient data from Intra scalable wavelet coded bitstream"). As discussed, headers carry information on which wavelet filter-set was chosen at encoder as well as which type of scalability is used so that the necessary decoding structure may be used. Of the five bitstreams demultiplexed, the first one is a base layer bitstream while the others are LL, HL, LH and HH subband bitstreams. Three output selections may be possible such as decoding a standalone coded base layer bitstream at $\frac{1}{4}^{th}$ or $\frac{1}{16}^{th}$ resolution that results in lower quality output frame (low resolution selection), the $\frac{1}{4}^{th}$ resolution LL band bitstream decoding that can provide a $\frac{1}{4}^{th}$ resolution video/ image frame at medium resolution/quality (medium resolution selection), and decoding of all 4 bands and adaptive wavelet synthesis filtering resulting in a full resolution/ quality decoded video/image frame (full resolution selection). The actual decoding technique chosen may depend on application, system, or user requirements or the like and may be implemented at the decision operation labeled "Output full res?".

If a low resolution selection is made (e.g., a standalone base-layer resolution/quality is sufficient), the base layer stream is decoded by using a matching decoding (to the encoding) such as by using an HEVC (e.g. HEVC Main I or HEVC Main Still Picture or Main 10 I or HEVC Main 10 I or HEVC Main 4:2:2 10 Intra) decoder or an AVC (e.g. H.264 Baseline I or H.264 Main I or H.264 High I or H.264 High 10 Intra or H.264 High 4:2:2 Intra) decoder (at the operation labeled "HEVC Main I/Main Still Picture/Main 10 I/Main 4:2:2 10 Intra; H.264 Baseline I/Main I/High I/High 10 Intra/High 4:2:2 Intra Decode CTUs/MBs"). The decoded video/image frame may be optionally upsampled (at the operation labeled "Up Sample by 2 or 4 in Each Dim.") for display (labeled "transform, low res"). If a medium resolution selection is made (e.g., a middle quality LL band output is desired), the base layer needs to be decoded (as discussed) and optionally upsampled (at the operation labeled "Up Sample by 2 or none in Each Dim.") and the LL band needs to be decoded by an HEVC Scalable Main 10 I/Intra decoding that uses the decoded base layer video/image frame for spatially scalable prediction (at the operation labeled "HEVC Scalable Main I/Scalable Main 10 Decode LL CTUs"). The generated LL band output may be stored (at the operation labeled "¼ Size 9b LL subband recon subframe store") and optionally bit depth limited and/or upsampled (at the operation labeled "Bit Depth Limit and Up Sample by 2 in Each Dim.") for display (labeled "wavelet, low res"). If a full resolution selection is made, (e.g., the user or application requires a full resolution/quality decoded video/image frame), in addition to the process described for decoding and storing the LL subband, the 3 remaining wavelet subbands such as HL, LH and HH subbands need to be decoded by using HEVC Main 10 I/Intra decoding or the like (at the operations labeled "HEVC Main 10 I/Main 4:2:2 10 Intra/Main 12 Intra Decode HL/LH/HH CTUs"). All four decoded subbands may be stored (at the operation labeled "¼ Size 9b LL/HL/LH/HH subband recon subframe store") and input to adaptive wavelet synthesis filtering that combines the 4 subbands using the filter-set the index of which is decoded from header in the bitstream (at the operation labeled "Perform adaptive wavelet synthesis to generate recon frame"). The output of such processing is a decoded full resolution/quality video/image frame for output (labeled "wavelet, full res").

For example, as discussed with respect to FIGS. 12, 13A, 13B, 14, 15A, 15B, 16, 17A, 17B, 18, 19A, and 19B and elsewhere herein, coding an image or frame may include performing wavelet decomposition on the image or frame to generate multiple subbands, generating, based on the image or frame, a reference image for inter layer prediction of a first subband of the multiple subbands, encoding the first subband based on the inter layer prediction using a Scalable High Efficiency Video Coding (SHVC) compliant encoder to generate a bitstream associated with the first subband, encoding remaining subbands of the plurality of subbands to generate one or more second High Efficiency Video Coding (HEVC) compliant bitstreams, and multiplexing the bitstream associated with the first subband and the second bitstreams to generate a scalable bitstream. The wavelet decomposition may be fixed or adaptive wavelet analysis filtering. In an embodiment, generating the reference image includes coding the reference image based on at least one of an HEVC compliant coder or an advanced video coding (AVC) compliant coder. In an embodiment, generating the reference image includes downsampling the original image or frame to generate a downsampled image and coding the downsampled image to generate the reference image. In an embodiment, generating the reference image includes bit depth limiting the first subband to generate a downsampled image and coding the downsampled image to generate the reference image. In an embodiment, generating the reference image includes downsampling the original image or frame to generate a downsampled image, coding the downsampled image to generate the coded image, and upsampling the coded image to generate the reference image. In another embodiment, an inter layer prediction mode associated with the image or frame may be determined and the reference image may be generated responsive to the inter layer prediction mode.

Furthermore, as discussed with respect to FIGS. 12, 13A, 13B, 14, 15A, 15B, 16, 17A, 17B, 18, 19A, and 19B and elsewhere herein, decoding may include demultiplexing a scalable bitstream to provide multiple bitstreams each associated with a subband of multiple wavelet subbands and a second bitstream associated with a reference image for inter layer prediction, decoding the second bitstream to generate the reference image, decoding a first bitstream of the multiple bitstreams using a Scalable High Efficiency Video Coding (SHVC) decoder to generate a first subband, decoding remaining bitstreams of the plurality of bitstreams to generate remaining subbands of the multiple wavelet subbands, and reconstructing an image or frame based on the decoding. In an embodiment, an output selection associated with the image or frame may be determined such that the output selection is low, medium, or full resolution and such that reconstructing the image or frame is responsive to the output selection. For example, if the output selection is low resolution, the reconstructed the image or frame is the reference image. If the output selection is medium resolution, the reconstructed image or frame is the first subband. If the output selection is full resolution, reconstructing the image or frame includes performing wavelet synthesis filtering on the first subband and the remaining subbands to generate the reconstructed image or frame at full resolution.

Scalable encoding may provide efficient use of resources as it allows encoding once to generate a scalable encoded stream from which a subset (including the full resolution version) of the bitstream may be decoded resulting in quality commensurate with the decoded subset.

While one level wavelet decomposition may provide intra frame/image scalability by a factor of 2 in each dimension and two level wavelet decomposition may provide a factor of 4 scalability in each dimension, it is difficult to provide general scalability (beyond powers of 2) while maintaining high coding efficiency. Discussion now turns to techniques for providing generalized scalability.

Figure 20A:
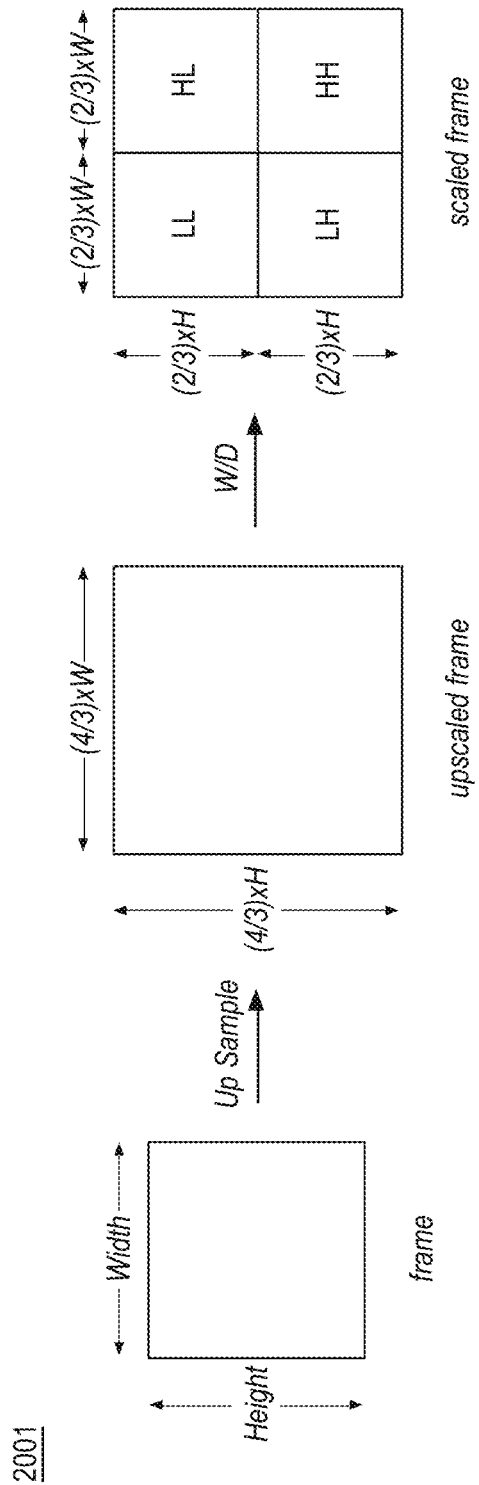
FIG. 20A illustrates an example process to achieve scalability by a factor of 2/3 in each dimension in wavelet based coding.

FIG. 20A illustrates an example process 2001 to achieve scalability by a factor of ⅔ in each dimension in wavelet based coding, arranged in accordance with at least some implementations of the present disclosure. For example, FIG. 20A may provide upsampling and wavelet decomposition in a first embodiment of a Scalable Adaptive Wavelet HEVC (S1AWHVC) Intra encoder to achieve spatial scalability by (3/2=1.5). The need for scalability by ⅔ may arise, for example, in the context of 1080p HD to 720p HD down conversion that requires down scaling from 1920×1080 to 1280×720 (e.g., by a factor of 1.5). As shown in FIG. 20A, to achieve spatial scalability of 1.5, a video/image frame (frame) may be spatially upscaled video/image frame by a factor of 4/3 in each dimension (labeled "Up Sample") to generate a bigger frame (upscaled frame). A one level wavelet decomposition (labeled "W/D") may be performed on the upscaled frame to decompose it into 4 bands (e.g., LL, HL, LH, HH), with the LL band yielding the desired scaled frame (scaled frame) that is $\frac{2}{3}^{rd}$ the size of input in each dimension.

Figure 20B:
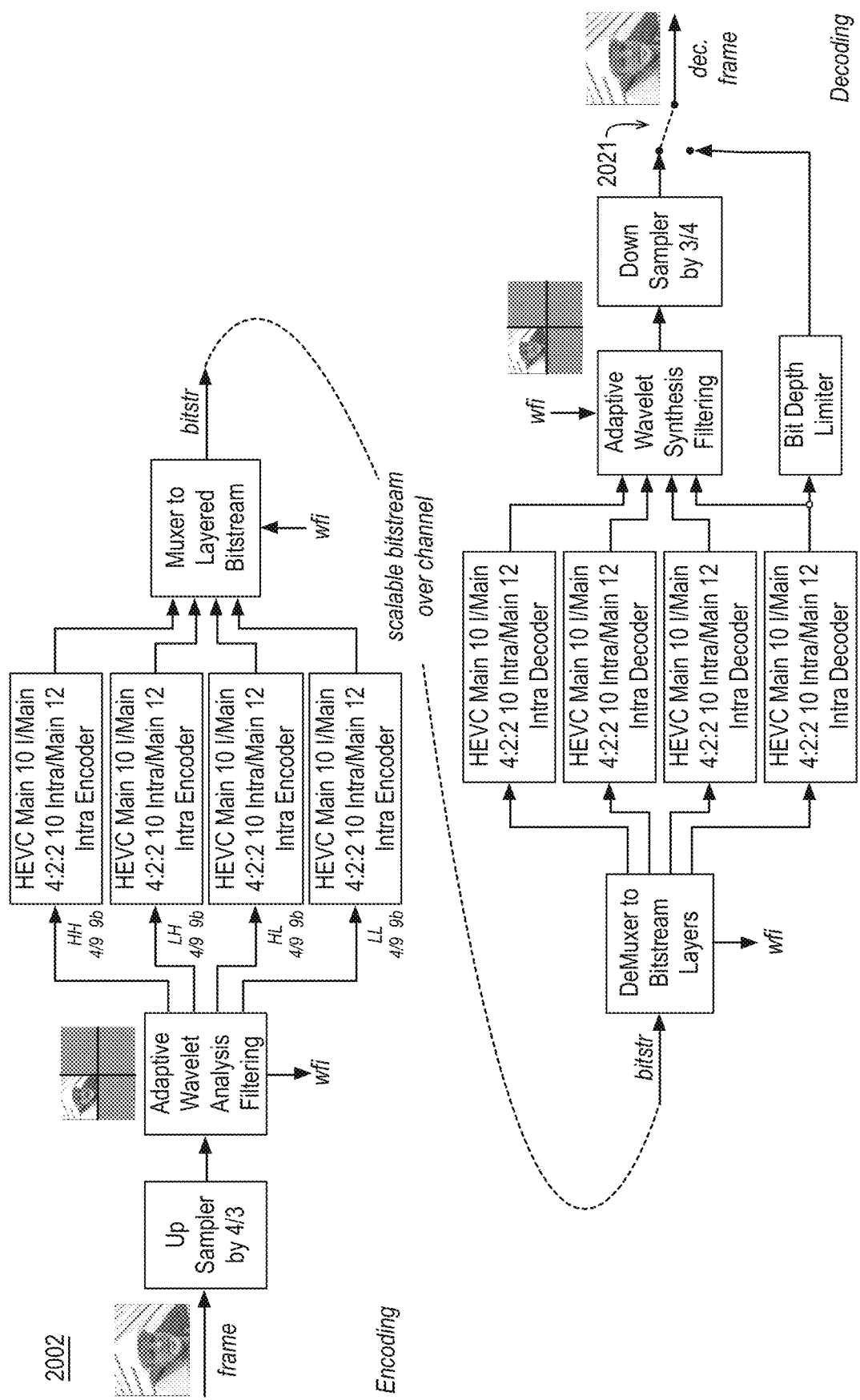
FIG. 20B is a block diagram of an example Scalable Adaptive Wavelet HEVC (S1AWHVC) encoding/decoding system that uses process to provide scalability by a factor of 2/3.

FIG. 20B is a block diagram of an example Scalable Adaptive Wavelet HEVC (S1AWHVC) encoding/decoding system 2002 that uses process 2001 to provide scalability by a factor of ⅔, arranged in accordance with at least some implementations of the present disclosure. For example, FIG. 20B may provide a first embodiment of a Scalable Adaptive Wavelet HEVC (S1AWHVC) Intra codec that combines Adaptive Wavelet Analysis/Synthesis, Up/down sampling, and an HEVC Intra coder such as Main10 I Picture coder or Main 4:2:2 10 Intra or Main 12 Intra Encoder/Decoder. Due to resampling of an image/video frame by 4/3 before wavelet decomposition into 4 bands prior to HEVC encoding, the scheme offers wavelet domain spatial scalability by 1.5. As shown, an input video/image frame (frame) may be filtered and scaled up by a factor of 4/3 in each dimension by an "Up Sampler by 4/3". The upsampled video/image frame may undergo adaptive wavelet decomposition by one level at an "Adaptive Wavelet Analysis Filtering" module resulting in LL, HL, LH, and HH subbands each 9 bit in bit-depth (assuming the input is 8 bit in bit-depth). As used herein, the term adaptive filtering may include the ability to select a wavelet decomposition filter set from available choices depending on application, resolution or content or the like. To maintain compatibility with the HEVC standard, each subband such as LL, HL, LH, and HH subbands may be encoded with HEVC Main 10 I/Intra encoder(s) capable of coding input of up to 10 bit depth (e.g., the example provides 9 bit input) at respective "HEVC Main 10 I/Main 4:2:2 10 Intra/Main 12 Intra Encoder" modules. Each of the encoded subband bitstreams may be multiplexed together with headers including an identifier filter set selected (wfi) by a "Muxer to Layered Bitstream" into a single scalable bitstream (bitstr) that may be transmitted or stored or the like.

FIG. 20B also shows the S1AWHVC decoding side that may include receiving a scalable bitstream (generated by the S1AWHVC encoder) (bitstr) and demultiplexing the bitstream into headers including the selected filter set (wfi) and individual subband bitstreams by a "DeMuxer to Bitstream Layers". As shown, an output selection may be implemented by a switch 2021 such that based on user, system, or applications requirements or the like a low or full resolution output may be selected. If a low resolution output selection is made, (e.g., it is sufficient to decode only LL bitstream), the LL bitstream may be decoded by an HEVC Main10 I/Intra decoder at a "HEVC Main 10 I/Main 4:2:2 10 Intra/Main 12 Intra Decoder" module to generate a lower (e.g., $2/3^{rd}$) resolution video frame or image that may be bit depth limited at a "Bit Depth Limiter" and sent to display (dec. frame). If a full resolution selection is made via switch 2021, all 4 subband bitstreams may be decoded by respective HEVC Main10 I/Intra decoders at respective "HEVC Main 10 I/Main 4:2:2 10 Intra/Main 12 Intra Decoder" modules and the subbands may be combined at an "Adaptive Wavelet Synthesis Filtering" module to generate a high or full resolution frame. The high resolution frame may be scaled down by 3/4 in each direction at a "Down Sampler by 3/4" and provided for display (dec. frame). As discussed, adaptive wavelet synthesis filtering at the "Adaptive Wavelet Synthesis Filtering" module may use a complementary filter set based on decoded headers that carry an index as the selected filter set (wfi).

Figure 21A:
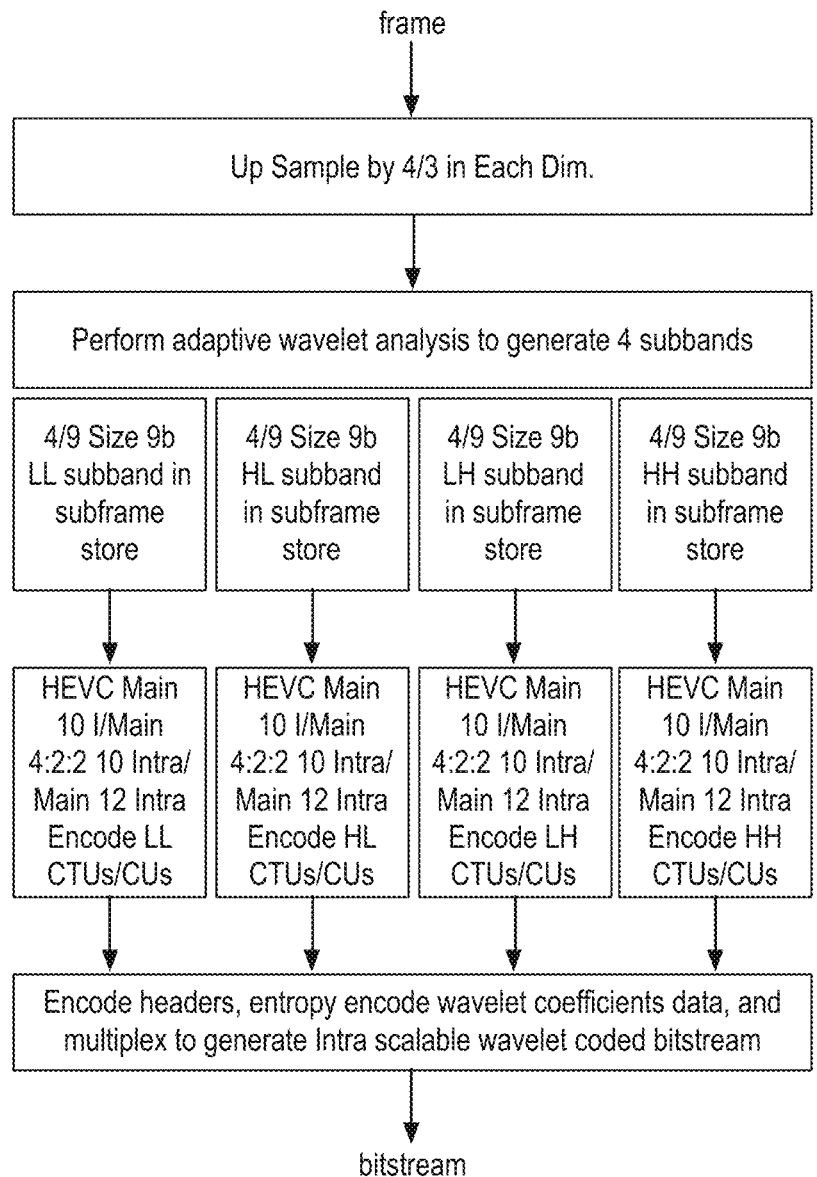
FIG. 21A illustrates an example process for Scalable Adaptive Wavelet HEVC (S1AWHVC) Intra Encoding.

FIG. 21A illustrates an example process 2101 for Scalable Adaptive Wavelet HEVC (S1AWHVC) Intra Encoding, arranged in accordance with at least some implementations of the present disclosure. For example, FIG. 21A may provide a first embodiment of Scalable Adaptive Wavelet HEVC (S1AWHVC) Intra Encoding performed by the S1AWHVC encoding system of FIG. 20. As shown, an input frame (labeled "frame") may be scaled by a factor of 4/3 in each dimension (at the operation labeled "Up Sample by 4/3 in Each Dim."). On the scaled frame, wavelet analysis filtering may be performed to decompose the scaled frame (at the operation labeled "Perform adaptive wavelet analysis to generate 4 subbands") into LL, HL, LH and HH subbands each 9 bit in depth assuming the input is 8 bit in depth. The decomposed subbands may stored in corresponding subframe stores that can store 2/3 size, 9 bit depth subbands (at the operations labeled "4/9 Size 9b LL/HL/LH/HH subband in subframe store"). Each of the subbands may be encoded by respective HEVC Main 10 I/Intra encoders (at the operations labeled "HEVC Main 10 I/Main 4:2:2 10 Intra/Main 12 Intra Encode LL/HL/LH/HH CTUs/CUs") and the individual encoded bitstreams may be multiplexed along with headers including an indicator of the selected filter set (wfi) (at the operation labeled "Encode headers, entropy encode wavelet coefficients data, and multiplex to generate Intra scalable wavelet coded bitstream") into a single scalable S1AWHVC encoded bitstream (labeled "bitstream").

Figure 21B:
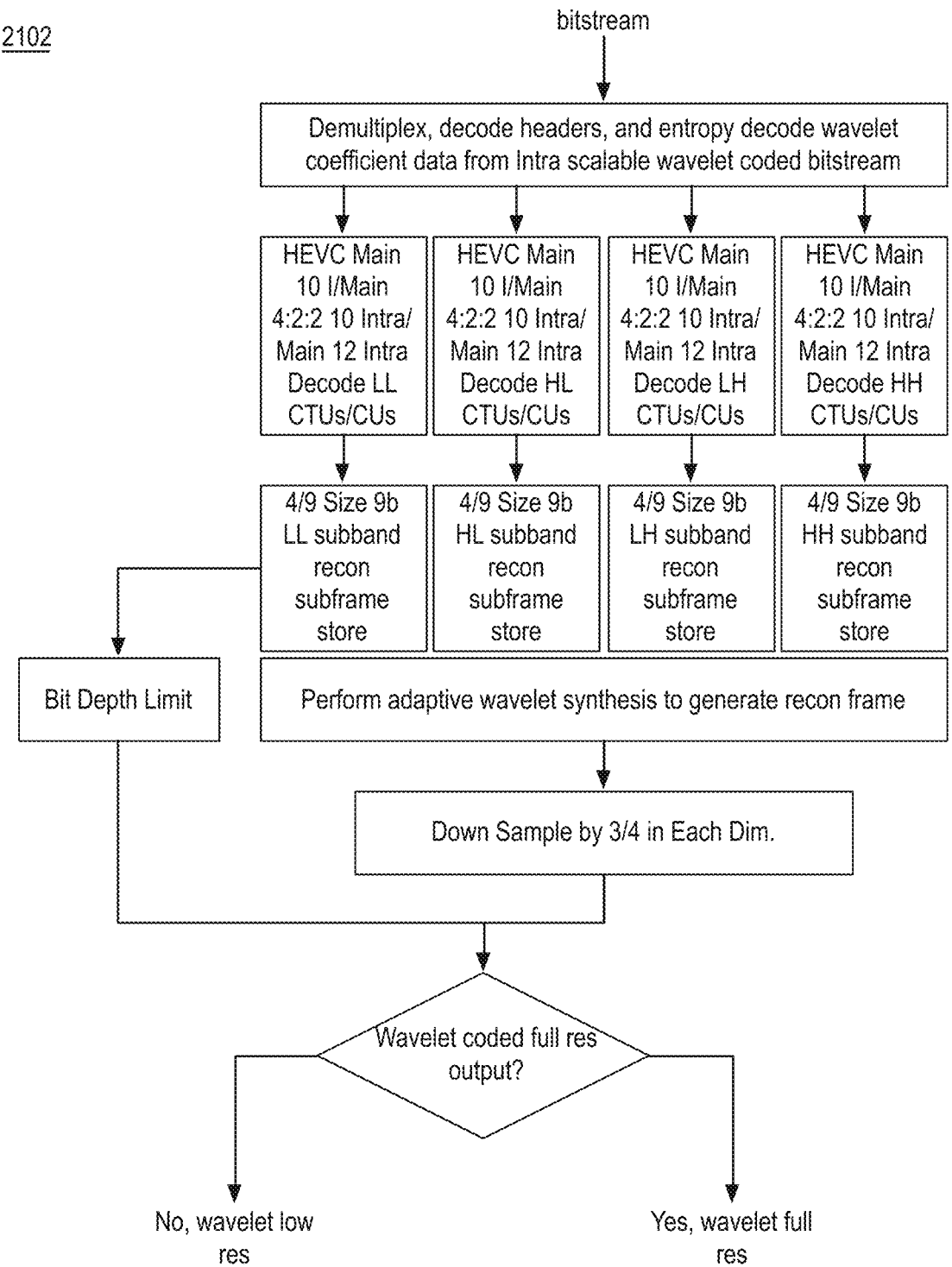
FIG. 21B illustrates an example process for Scalable Adaptive Wavelet HEVC (S1AWHVC) Intra decoding.

FIG. 21B illustrates an example process 2102 for Scalable Adaptive Wavelet HEVC (S1AWHVC) Intra decoding, arranged in accordance with at least some implementations of the present disclosure. For example, FIG. 21B may provide a first embodiment of Scalable Adaptive Wavelet HEVC (S1AWHVC) Intra decoding performed by the S1AWHVC decoding system of FIG. 20. As shown, an S1AWHVC encoded bitstream (labeled "bitstream") may be input to a demultiplexer that may separate individual subband bitstreams for LL, HL, LH and HH bands and decode headers (at the operation labeled "Demultiplex, decode headers, and entropy decode wavelet coefficient data from Intra scalable wavelet coded bitstream"). Based on an output selection or the like that may reflect a user or system request (as implemented at the decision operation labeled "Wavelet coded full res output?"), a low resolution or full resolution selection may be provided. If a low resolution output selection is made (e.g., if a lower resolution decoded frame is sufficient), only the LL band bitstream is decoded by an HEVC Main 10 I/Intra decoder or the like (at the operation labeled "HEVC Main 10 I/Main 4:2:2 10 Intra/Main 12 Intra Decode LL CTUs/CUs") and the LL subband may be stored (at the operation labeled "4/9 Size 9b LL subband recon subframe store"). The lower resolution (e.g., 2/3 resolution) decoded frame may be bit depth limited (at the operation labeled "Bit Depth Limit") and output for display (labeled "No, wavelet low res"). If a full resolution output selection is made (e.g., a full resolution decoded frame is necessary), then all 4 subbands may be decoded by respective HEVC Main 10 I/Intra decoder(s) (at the operations labeled "HEVC Main 10 I/Main 4:2:2 10 Intra/Main 12 Intra Decode LL/HL/LH/HH CTUs/CUs") and the decoded subbands may be stored (at the operations labeled "4/9 Size 9b LL/HL/LH/HH subband recon subframe store"). The four decoded subbands may be combined by synthesis filtering (at the operation labeled "Perform adaptive wavelet synthesis to generate recon frame") into a full resolution frame that may be downsampled by a factor of 3/4 in each dimension (at the operation labeled "Down Sample by 3/4 in Each Dim.") and output for display (labeled "Yes, wavelet full res").

Figure 22A:
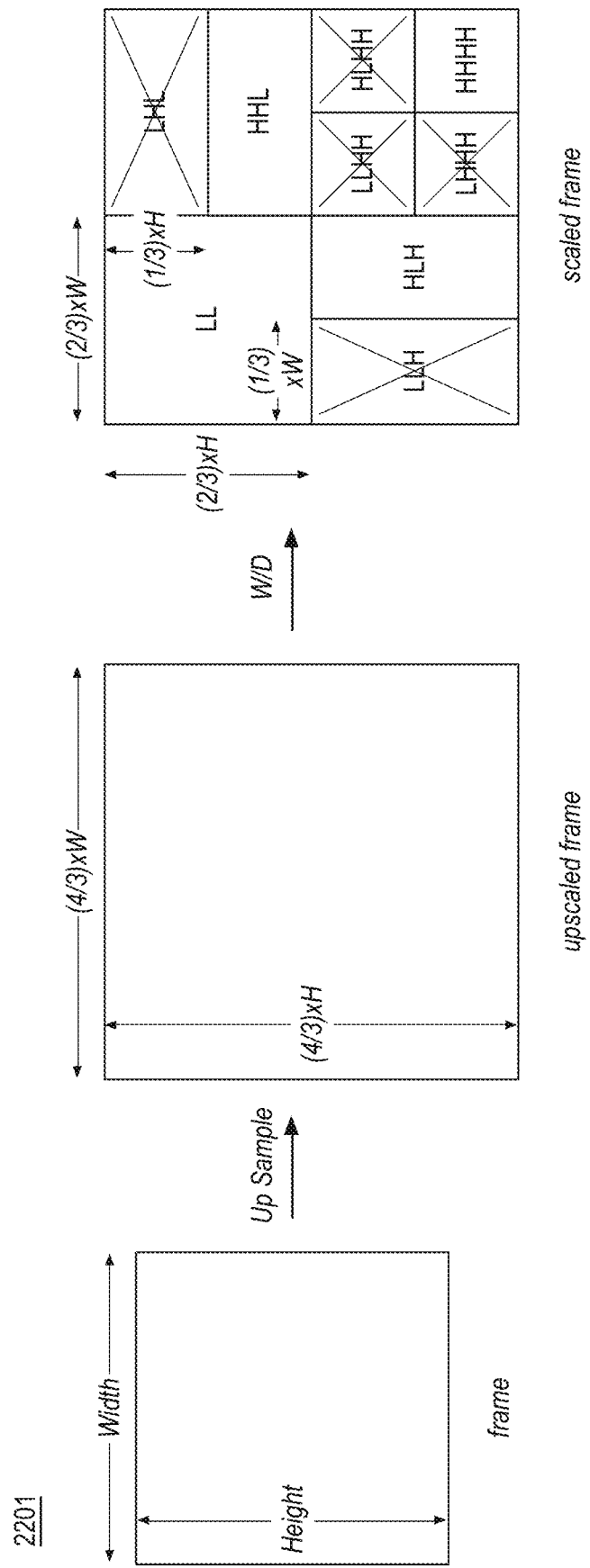
FIG. 22B is a block diagram of an example Scalable Adaptive Wavelet HEVC (S2AWHVC) encoding/decoding system that uses process to provide scalability by a factor of 2/3.

FIG. 22A illustrates another example process 2201 to achieve scalability by a factor of 2/3 in each dimension in wavelet based coding, arranged in accordance with at least some implementations of the present disclosure. For example, FIG. 22A may provide upsampling and wavelet decomposition in a second embodiment of Scalable Adaptive Wavelet HEVC (S2AWHVC) Intra encoder to achieve spatial scalability by (3/2=1.5). As discussed, the need for scalability by 2/3 may arise, for example, in the context of 1080p HD to 720p HD down conversion that requires down scaling from 1920×1080 to 1280×720 (e.g., by a factor of 1.5). As shown in FIG. 22A, to achieve spatial scalability of 1.5, a video/image frame (frame) may be spatially upscaled by a factor of 4/3 in each dimension (labeled "Up Sample") to create a bigger frame (upscaled frame). A one level wavelet decomposition (labeled "W/D") may be performed on the upscaled frame to decompose it into 4 bands (e.g., LL, HL, LH, HH). Such one level wavelet decomposition may be followed by a horizontal decomposition of the HL band into LHL and HHL bands, vertical decomposition of the LH band into LLH and HLH bands, and both vertical and horizontal decomposition of the HH band into LLHL, HLHH, LHHH, and HHHH bands, as shown (also labeled "W/D"). As shown, the following bands: LHL, LLH, LLHH, HLHH and LHHH may be discarded and the bands used for encoding and reconstruction may be the LL, HHL, HLH, and HHHH bands. As in previous example discussed with respect to FIGS. 20A, 20B, 21A, and 21B, the LL band will yield the desired scaled frame that is $\frac{2}{3}^{rd}$ the size of the input in each dimension.

Figure 22B:
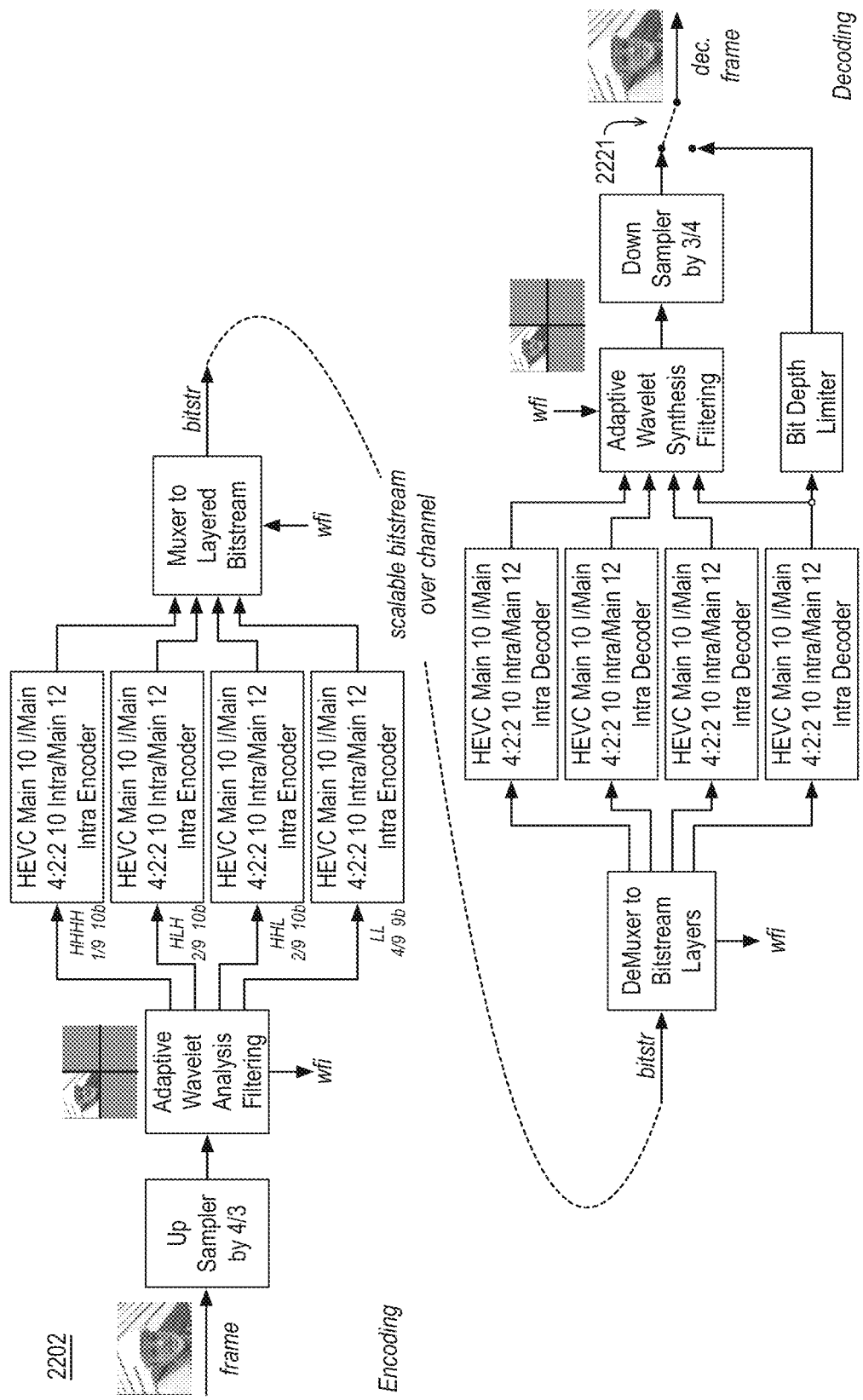

FIG. 22B is a block diagram of an example Scalable Adaptive Wavelet HEVC (S2AWHVC) encoding/decoding system 2202 that uses process 2201 to provide scalability by a factor of ⅔, arranged in accordance with at least some implementations of the present disclosure. For example, FIG. 22B may provide a second embodiment of a Scalable Adaptive Wavelet HEVC (S2AWHVC) Intra codec that combines Adaptive Wavelet Analysis/Synthesis, Up/down sampling, and an HEVC Intra coder such as Main10 I Picture coder or Main 4:2:2 10 Intra, or Main 12 Intra Encoder/Decoder. Due to resampling of an image/video frame by 4/3 before wavelet decomposition into 9 bands prior to HEVC encoding, the scheme offers wavelet domain spatial scalability by 1.5. As shown, an input video/image frame (frame) may be filtered and scaled up by a factor of 4/3 in each dimension by an "Up Sampler by 4/3". The upsampled video/image frame may undergo adaptive wavelet decomposition as discussed with respect to FIG. 22A at an "Adaptive Wavelet Analysis Filtering" module resulting in 9 subbands of which the LL, HHL, HLH, and HHHH subbands each are 9 bit, 10 bit, 10 bit, and 10b it in bit-depth, respectively (assuming the input is 8 bit in bit-depth). As used herein, the term adaptive filtering may include the ability to select a wavelet decomposition filter set from available choices depending on application, resolution or content or the like. To maintain compatibility with the HEVC standard, each of the retained subbands (e.g., the LL, HHL, HLH, and HHHH subbands) may be encoded with HEVC Main 10 I/Intra encoder(s) capable of coding input of up to 10 bit depth at respective "HEVC Main 10 I/Main 4:2:2 10 Intra/Main 12 Intra Encoder" modules. Each of the encoded subband bitstreams may be multiplexed together with headers including an identifier filter set selected (wfi) by a "Muxer to Layered Bitstream" into a single scalable bitstream (bitstr) that may be transmitted or stored or the like.

FIG. 22B also shows the S2AWHVC decoding side that may include receiving a scalable bitstream (generated by the S2AWHVC encoder) (bitstr) and demultiplexing the bitstream into headers including the selected filter set (wfi) and individual subband bitstreams by a "DeMuxer to Bitstream Layers". As shown, an output selection may be implemented by a switch 2211 such that based on user, system, or applications requirements or the like a low or full resolution output may be selected. If a low resolution output selection is made, (e.g., it is sufficient to decode only LL bitstream), the LL bitstream may be decoded by an HEVC Main10 I/Intra decoder at a "HEVC Main 10 I/Main 4:2:2 10 Intra/Main 12 Intra Decoder" to generate a lower (e.g., $\frac{2}{3}^{rd}$ in each dimension) resolution frame or image that may be bit depth limited at a "Bit Depth Limiter" and sent to display (dec. frame). If a full resolution selection is made via switch 2221, all 4 subband bitstreams (e.g., LL, HHL, HLH, and HHHH) may be decoded by respective HEVC Main10 I/Intra decoders at respective "HEVC Main 10 I/Main 4:2:2 10 Intra/Main 12 Intra Decoder" modules and combined at an "Adaptive Wavelet Synthesis Filtering" module to generate a high or full resolution frame that may be scaled down by ¾ in each direction at a "Down Sampler by ¾" and provided for display (dec. frame). As discussed, adaptive wavelet synthesis filtering at the "Adaptive Wavelet Synthesis Filtering" module may use a complementary filter set based on decoded headers that carry an index as the selected filter set (wfi).

Figure 23A:
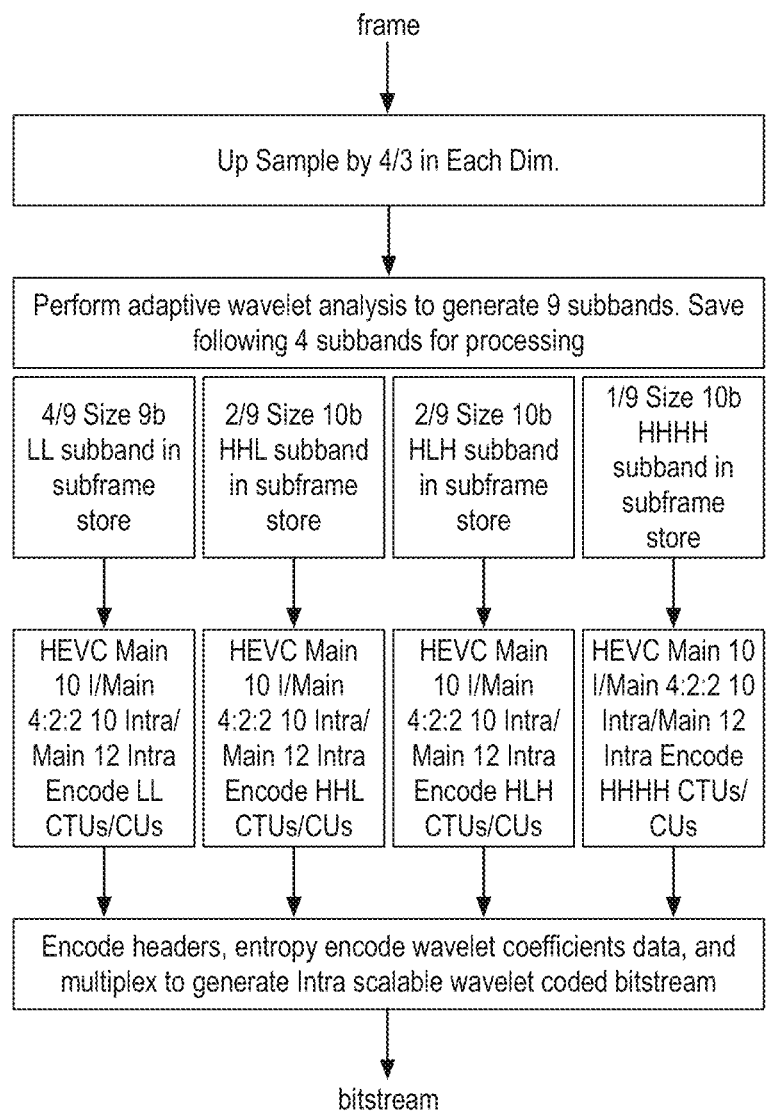
FIG. 23A illustrates an example process for Scalable Adaptive Wavelet HEVC (S2AWHVC) Intra Encoding.

FIG. 23A illustrates an example process 2101 for Scalable Adaptive Wavelet HEVC (S2AWHVC) Intra Encoding, arranged in accordance with at least some implementations of the present disclosure. For example, FIG. 23A may provide a second embodiment of Scalable Adaptive Wavelet HEVC (S2AWHVC) Intra Encoding performed by the S2AWHVC encoding system of FIG. 22. As shown, an input frame (labeled "frame") may be scaled by a factor of 4/3 in each dimension (at the operation labeled "Up Sample by 4/3 in Each Dim."). On the scaled frame, wavelet analysis may be performed to decompose (at the operation labeled "Perform adaptive wavelet analysis to generate 9 subbands. Save following 4 subbands for processing") the scaled frame into 9 subbands (e.g., 4 subbands that are used: LL, HHL, HLH, and HHHH and 5 other subbands LHL, LLH, LLHH, HLHH and LHHH that are discarded). The 4 subbands of interest (e.g., LL, HHL, HLH, and HHHH) of respective sizes 4/9, 2/9, 2/9, and 1/9 of the original size and with bit depths of 9 bit, 10 bit, 10 bit, and 10 bit respectively may be stored in subframe stores (at the operations labeled "4/9 Size 9b LL subband in subframe store" and "2/9 Size 10b HHL/HLH subband in subframe store" and "1/9 Size 10b HHHH subband in subframe store") and input to HEVC Main 10 I/Intra encoder(s) where they may each be partitioned into CTUs (e.g., LCUs) and CUs and encoded (at the operations labeled "HEVC Main 10 I/Main 4:2:2 10 Intra/Main 12 Intra Encode LL/HHL/HLH/HHHH CTUs/CUs") resulting in corresponding 4 individual bitstreams that may be multiplexed along with headers including an indicator of the selected filter set (wfi) (at the operation labeled "Encode headers, entropy encode wavelet coefficients data, and multiplex to generate Intra scalable wavelet coded bitstream") into a single scalable S2AWHVC encoded bitstream.

Figure 23B:
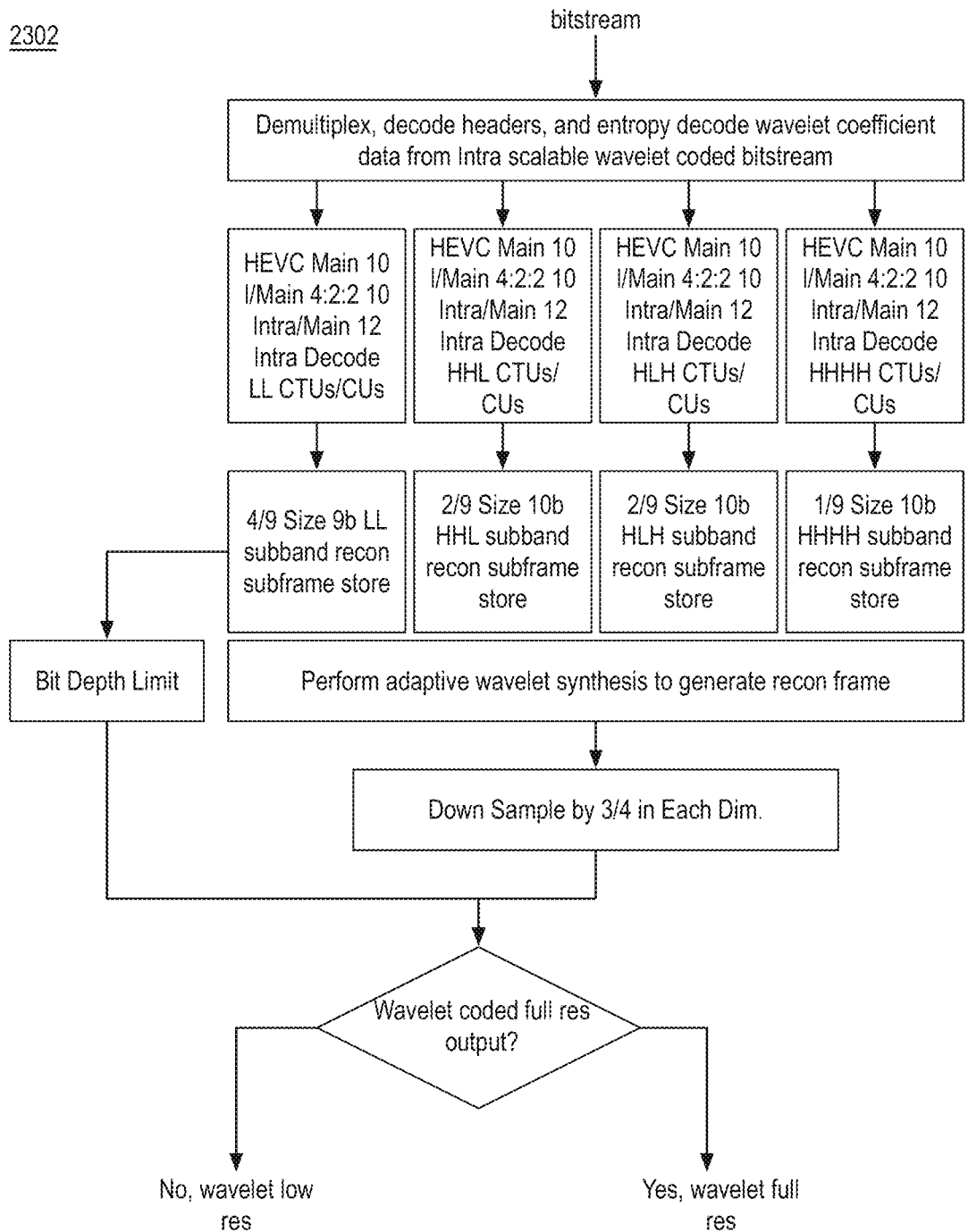
FIG. 23B illustrates an example process for Scalable Adaptive Wavelet HEVC (S2AWHVC) Intra Decoding.

FIG. 23B illustrates an example process 2302 for Scalable Adaptive Wavelet HEVC (S2AWHVC) Intra Decoding, arranged in accordance with at least some implementations of the present disclosure. For example, FIG. 23B may provide a second embodiment of Scalable Adaptive Wavelet HEVC (S2AWHVC) Intra Decoding performed by the S2AWHVC decoding system of FIG. 22. As shown, an S2AWHVC encoded bitstream (labeled "bitstream" may be input to demultiplexer that may separate individual subband bitstreams for LL, HHL, HLH and HHHH subbands and decode headers (at the operation labeled "Demultiplex, decode headers, and entropy decode wavelet coefficient data from Intra scalable wavelet coded bitstream"). Based on an output selection or the like that may reflect a user or system request (as implemented at the decision operation labeled "Wavelet coded full res output?"), a low resolution or full resolution selection may be provided. If a low resolution output selection is made (e.g., if a lower resolution decoded frame is sufficient), only the LL band bitstream is decoded by an HEVC Main 10 I/Intra decoder (at the operation labeled "HEVC Main 10 I/Main 4:2:2 10 Intra/Main 12 Intra Decode LL CTUs/CUs") and the LL subband may be stored (at the operation labeled "⁴⁄₉ Size 9b LL subband recon subframe store"). The lower resolution (e.g., ⅔ in each dimension) frame may be bit depth limited (at the operation labeled "Bit Depth Limit") and output (labeled "No, wavelet low res"). If a full resolution output selection is made (e.g., a full resolution decoded frame is necessary), then all 4 subbands may be decoded by respective HEVC Main 10 I/Intra decoder(s) (at the operation labeled "HEVC Main 10 I/Main 4:2:2 10 Intra/Main 12 Intra Decode LL/HHL/HLH/ HHHH CTUs/CUs") and the decoded subbands may be stored (at the operation labeled "⁴⁄₉ Size 9b LL subband recon subframe store" and "²⁄₉ Size 10b HHL/HLH subband recon subframe store" and "⅑ Size 10b HHHH subband recon subframe store"). The four decoded subbands may be combined by synthesis filtering (at the operation labeled "Perform adaptive wavelet synthesis to generate recon frame") into a full resolution frame that may be downsampled by a factor of ¾ in each dimension (at the operation labeled "Down Sample by ¾ in Each Dim.") resulting in a full size decoded frame that may be output for display (labeled "Yes, wavelet full res").

Figure 24A:
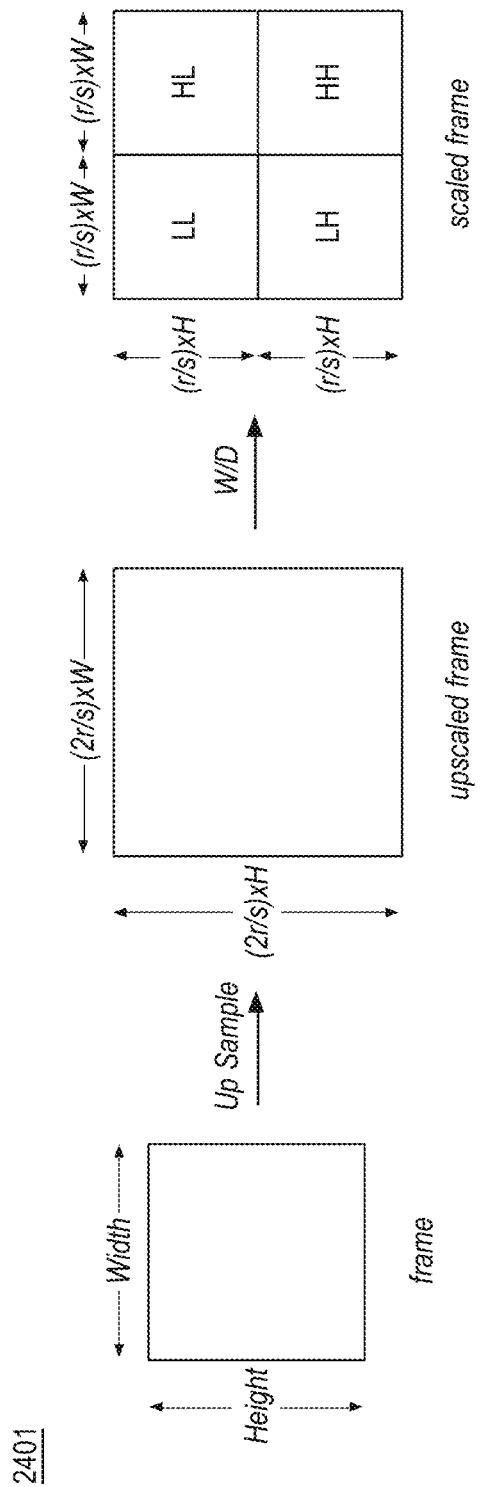
FIG. 24A illustrates an example process to achieve scalability by a factor of r/s in each dimension in wavelet based coding.

FIG. 24A illustrates an example process 2401 to achieve scalability by a factor of r/s in each dimension in wavelet based coding, arranged in accordance with at least some implementations of the present disclosure. For example, FIG. 24A may provide upsampling and wavelet decomposition in a third embodiment of Scalable Adaptive Wavelet HEVC (S3AWHVC) Intra encoder to achieve generalized spatial scalability by a ratio of r/s. The need for scalability by r/s may arise, for example, in the context of 1080p HD to any lower general resolution down conversion. As shown in FIG. 24A, to achieve such spatial scalability, a video/ image frame (frame) may be spatially upscaled by a factor of (2r)/s in each dimension (labeled "Up Sample") to generate a bigger frame (upscaled frame). A one level wavelet decomposition (labeled "W/D") may be performed on the upscaled frame to decompose it into 4 bands into 4 bands, with the LL band yielding the desired scaled frame that is r/s the size of input in each dimension.

Figure 24B:
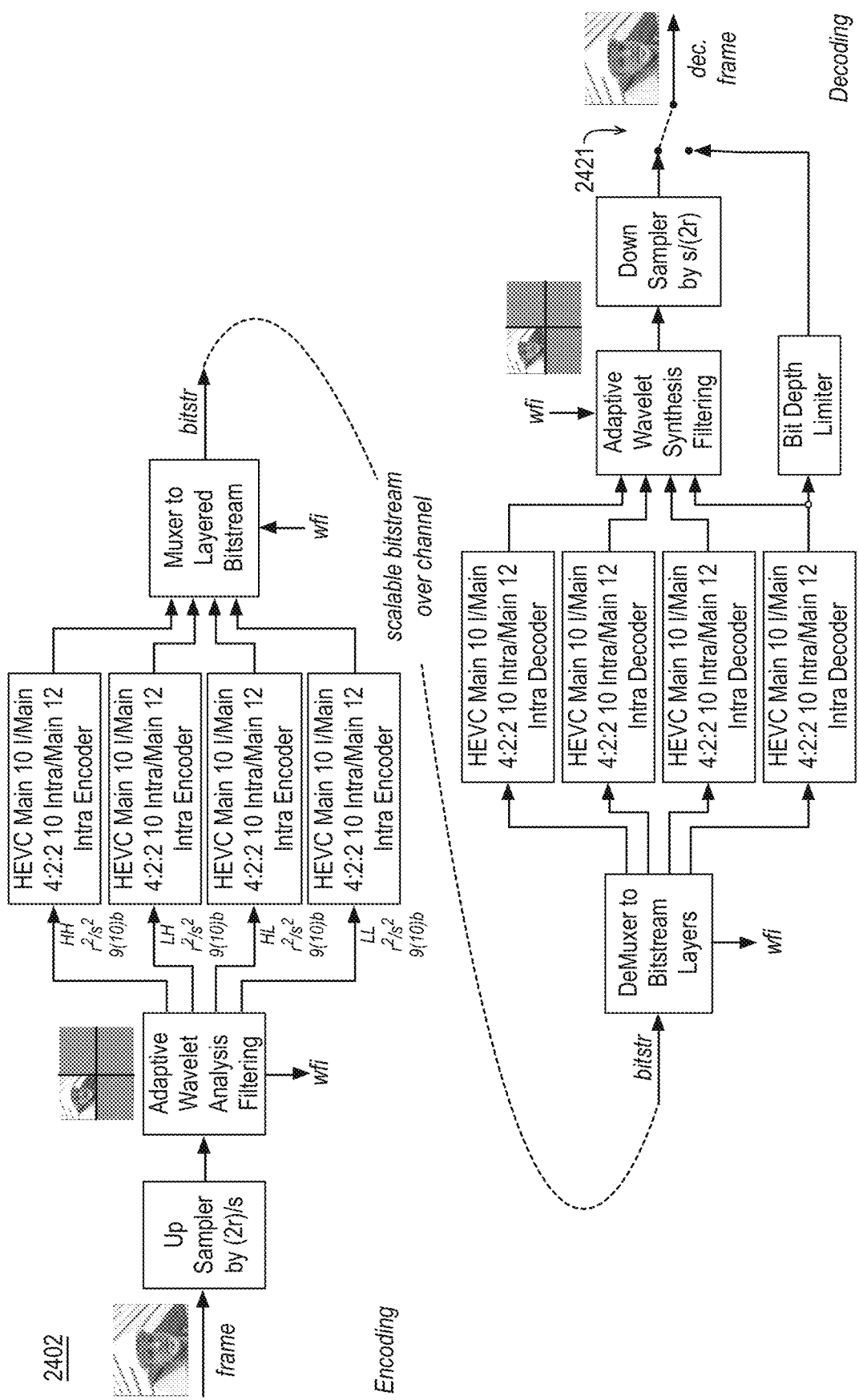
FIG. 24B is a block diagram of an example Scalable Adaptive Wavelet HEVC (S3AWHVC) encoding/decoding system that uses process 2401 to provide scalability by a factor of r/s.

FIG. 24B is a block diagram of an example Scalable Adaptive Wavelet HEVC (S3AWHVC) encoding/decoding system that uses process 2401 to provide scalability by a factor of r/s, arranged in accordance with at least some implementations of the present disclosure. For example, FIG. 24B may provide third embodiment of a Scalable Adaptive Wavelet HEVC (S3AWHVC) Intra codec that combines Adaptive Wavelet Analysis/Synthesis, Up/down sampling, and an HEVC Intra coder such as Main10 I Picture coder or Main 4:2:2 10 Intra, or Main 12 Intra Encoder/Decoder. This embodiment may enable general spatial scalability by a non-integer factor expressed as a ratio of r/s. As shown, an input video/image frame (frame) may be filtered and scaled up by a factor of (2r)/s in each dimension by an "Up Sampler by (2r)/s". The upsampled video/image frame may undergo adaptive wavelet decomposition by one level at an "Adaptive Wavelet Analysis Filtering" module resulting in LL, HL, LH, and HH subbands each 9 bit in bit-depth (assuming the input is 8 bit in bit-depth). As used herein, the term adaptive filtering may include the ability to select a wavelet decomposition filter set from available choices depending on application, resolution or content or the like. To maintain compatibility with the HEVC standard, each subband such as LL, HL, LH, and HH subbands are encoded with HEVC Main 10 I/Intra encoder(s) capable of coding input of up to 10 bit depth (e.g., the example provides 9 bit input) at respective "HEVC Main 10 I/Main 4:2:2 10 Intra/Main 12 Intra Encoder" modules. Each of the encoded subband bitstreams may be multiplexed together with headers including an identifier filter set selected (wfi) by a "Muxer to Layered Bitstream" into a single scalable bitstream (bitstr) that may be transmitted or stored or the like.

FIG. 24B also shows the S3AWHVC decoding side that may include receiving a scalable bitstream (generated by the S3AWHVC encoder) and demultiplexing the bitstream into headers including the selected filter set (wfi) and individual subband bitstreams by a "DeMuxer to Bitstream Layers". As shown, an output selection may be implemented by a switch 2421 such that based on user, system, or applications requirements or the like a low or full resolution output may be selected. If a low resolution output selection is made, (e.g., it is sufficient to decode only LL bitstream), the LL bitstream may be decoded by an HEVC Main10 I/Intra decoder at a "HEVC Main 10 I/Main 4:2:2 10 Intra/Main 12 Intra Decoder" module to generate a lower (e.g., r/s) resolution video frame or image that may be bit depth limited at a "Bit Depth Limiter" and sent to display (dec. frame). If a full resolution selection is made via switch 2421, all 4 subband bitstreams may be decoded by respective HEVC Main10 I/Intra decoders at respective "HEVC Main 10 I/Main 4:2:2 10 Intra/Main 12 Intra Decoder" modules and the subbands may be combined at an "Adaptive Wavelet Synthesis Filtering" module to generate a high or full resolution frame. The high resolution frame may be scaled down by s/(2r) in each direction at a "Down Sampler by s/(2r)" and provided for display (dec. frame). As discussed, adaptive wavelet synthesis filtering at the "Adaptive Wavelet Synthesis Filtering" module may use a complementary filter set based on decoded headers that carry an index as the selected filter set (wfi).

Figure 25A:
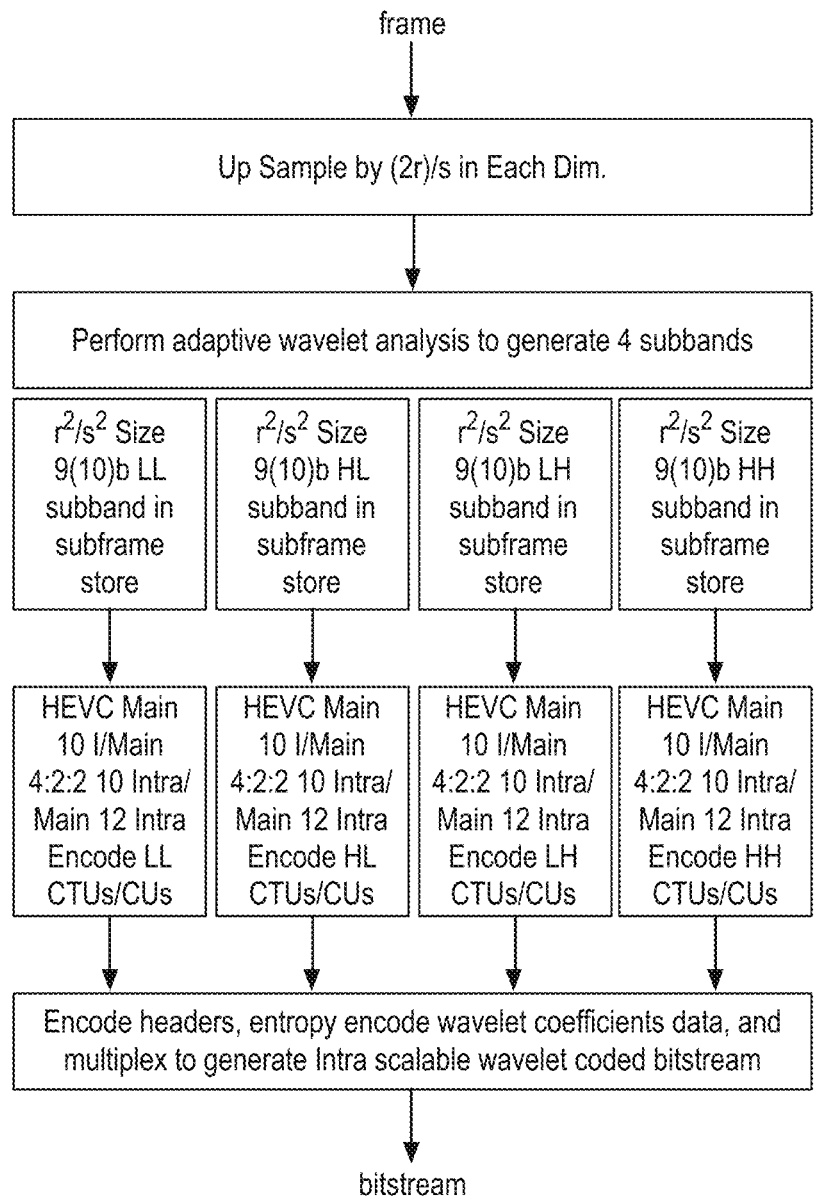
FIG. 25A illustrates an example process for Scalable Adaptive Wavelet HEVC (S3AWHVC) Intra Encoding.

FIG. 25A illustrates an example process 2501 for Scalable Adaptive Wavelet HEVC (S3AWHVC) Intra Encoding, arranged in accordance with at least some implementations of the present disclosure. For example, FIG. 25A may provide a third embodiment of Scalable Adaptive Wavelet HEVC (S3AWHVC) Intra Encoding performed by the S3AWHVC encoding system of FIG. 24. As shown, an input frame (labeled "frame") may be scaled by a factor of (2r)/s in each dimension (at the operation labeled "Up Sample by (2r)/s in Each Dim."). On the scaled frame, wavelet analysis may be performed to decompose the scaled frame (at the operation labeled "Perform adaptive wavelet analysis to generate 4 subbands") into LL, HL, LH and HH subbands each 9 bit in depth assuming the input is 8 bit in depth. The decomposed subbands may be stored in corresponding subframe stores that can store $r^2/s^2$ size, 9 or 10 bit depth subbands (at the operations labeled "$r^2/s^2$ Size 9(10)b LL/HL/LH/HH subband in subframe store"). Each of the subbands may be encoded by respective HEVC Main 10 I/Intra encoders (at the operations labeled "HEVC Main 10 I/Main 4:2:2 10 Intra/Main 12 Intra Encode LL/HL/LH/HH CTUs/CUs") and the individual encoded bitstreams may be multiplexed along with headers including an indicator of the selected filter set (wfi) (at the operation labeled "Encode headers, entropy encode wavelet coefficients data, and multiplex to generate Intra scalable wavelet coded bitstream") into a single scalable S3AWHVC encoded bitstream (labeled "bitstream").

Figure 25B:
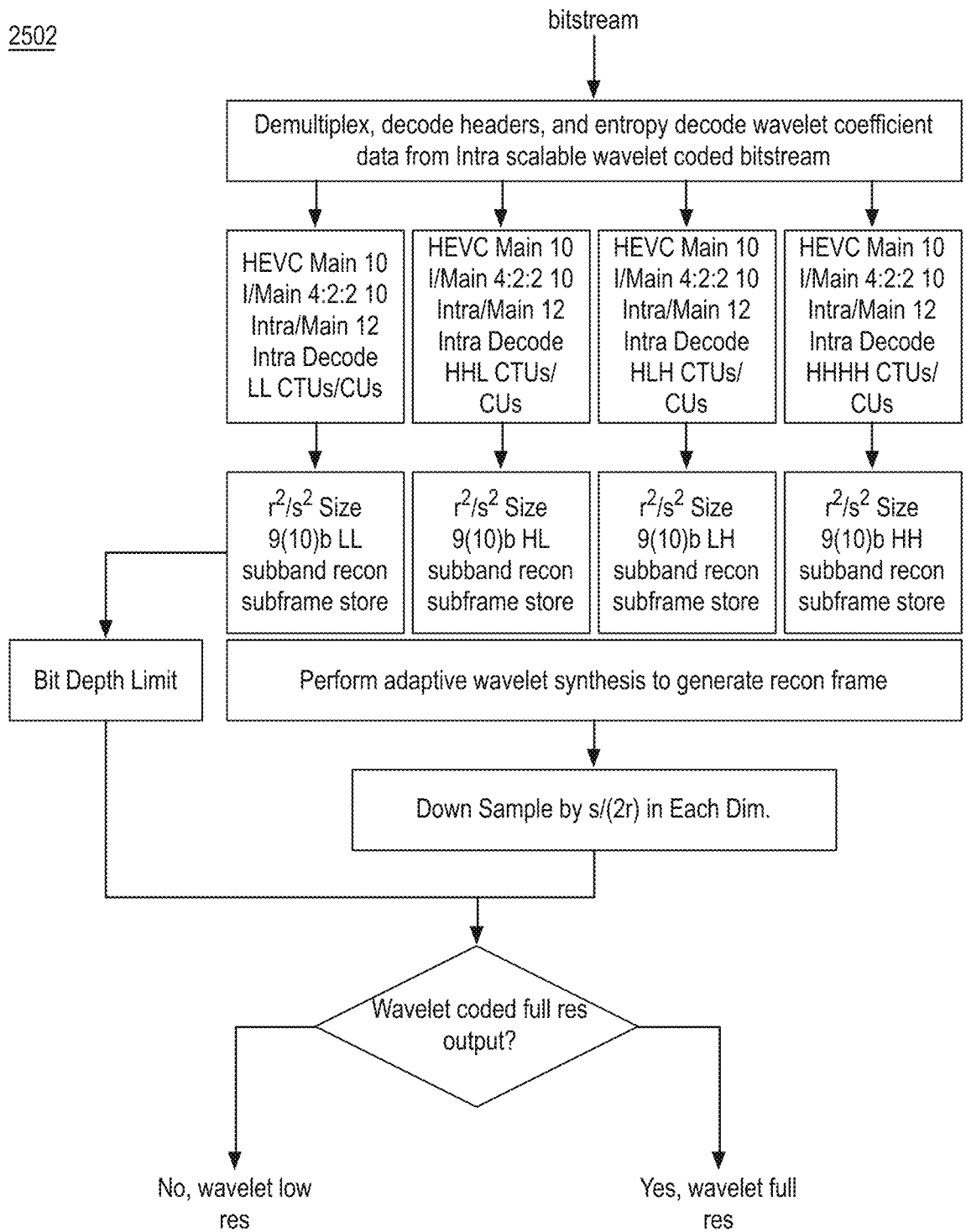
FIG. 25B illustrates an example process for Scalable Adaptive Wavelet HEVC (S3AWHVC) Intra decoding.

FIG. 25B illustrates an example process 2502 for Scalable Adaptive Wavelet HEVC (S3AWHVC) Intra decoding, arranged in accordance with at least some implementations of the present disclosure. For example, FIG. 25B may provide a third embodiment of Scalable Adaptive Wavelet HEVC (S3AWHVC) Intra decoding performed by the S3AWHVC decoding system of FIG. 20. As shown, an S3AWHVC encoded bitstream (labeled "bitstream") may be input to demultiplexer that may separates individual subband bitstreams for LL, HL, LH and HH bands and decode headers (at the operation labeled "Demultiplex, decode headers, and entropy decode wavelet coefficient data from Intra scalable wavelet coded bitstream"). Based on an output selection or the like that may reflect a user or system request (as implemented at the decision operation labeled "Wavelet coded full res output?"), a low resolution or full resolution selection may be provided. If a low resolution output selection is made (e.g., if a lower resolution decoded frame is sufficient), only the LL band bitstream is decoded by an HEVC Main 10 I/Intra decoder or the like (at the operation labeled "HEVC Main 10 I/Main 4:2:2 10 Intra/Main 12 Intra Decode LL CTUs/CUs") and the LL subband may be stored (at the operation labeled "$r^2/s^2$ Size 9(10)b LL subband recon subframe store"). The lower (e.g., r/s resolution) decoded frame may be bit depth limited (at the operation labeled "Bit Depth Limit") and output for display (labeled "No, wavelet low res"). If a full resolution output selection is made (e.g., a full resolution decoded frame is necessary), then all 4 subbands may be decoded by respective HEVC Main 10 I/Intra decoder(s) (at the operations labeled "HEVC Main 10 I/Main 4:2:2 10 Intra/Main 12 Intra Decode LL/HHL/HLH/HHHH CTUs/CUs") and the decoded subbands may be stored (at the operations labeled "$r^2/s^2$ Size 9(10)b LL/HHL/HLH/HHHH subband recon subframe store"). The four decoded subbands may be combined by synthesis filtering (at the operation labeled "Perform adaptive wavelet synthesis to generate recon frame") into a full resolution frame that may be downsampled by a factor of s/(2r) in each dimension (at the operation labeled "Down Sample by s/(2r) in Each Dim.") and output for display (labeled "Yes, wavelet full res").

For example, as discussed with respect to FIGS. 20A, 20B, 21A, 21B, 22A, 22B, 23A, 23B, 24A, 24B, 25A, and 25B elsewhere herein, coding an image or frame may include upsampling the original image or frame to generate an upsampled image or frame having a scalability factor between the original image and the upsampled image, performing wavelet decomposition on the upsampled image or frame to generate multiple subbands, encoding each of the multiple subbands with an High Efficiency Video Coding (HEVC) compliant encoder to generate multiple bitstreams each associated with a subband of the multiple subbands, and multiplexing the multiple subbands to generate a scalable bitstream. In an embodiment, the scalability factor is a non-integer value. In an embodiment, the scalability factor is 1.5. In other embodiments, the scalability factor is at least one of 5/4, 4/3, or 5/3. In an embodiment, the wavelet analysis filtering is single level wavelet analysis filtering and the multiple subbands are LL, HL, LH, and HH subbands. In another embodiment, the wavelet analysis filtering is two level wavelet analysis filtering. For example, the multiple subbands may be LL, HHL, HLH, and HHHH subbands.

Furthermore, as discussed with respect to FIGS. 20A, 20B, 21A, 21B, 22A, 22B, 23A, 23B, 24A, 24B, 25A, and 25B elsewhere herein, decoding may include demultiplexing a scalable bitstream such that at least portions of scalable bitstream are High Efficiency Video Coding (HEVC) compliant, to provide multiple bitstreams each associated with a subband of multiple wavelet subbands, decoding each of the multiple bitstreams with an HEVC compliant decoder to generate the multiple wavelet subbands, performing wavelet synthesis filtering on the multiple decoded wavelet subbands to generate a reconstructed image or frame, and downsampling the reconstructed image or frame by a downsampling ratio to generate an image or frame. In an embodiment, the downsampling ratio comprises a non-integer value. In an embodiment, the downsampling ratio is 3/4 to provide a 1.5 scalability factor between the image or frame and a low resolution image based on a first subband of the plurality of wavelet subbands. Furthermore, an output selection associated with the image or frame may be determined such that the output selection is low or full resolution. For example, if the output selection is low resolution, the display image is a first subband of the multiple wavelet subbands. If the scalability selection is full resolution, the display image is the image or frame. In an embodiment, the wavelet synthesis filtering is single level wavelet synthesis filtering and the multiple subbands are LL, HL, LH, and HH subbands. In another embodiment, the wavelet synthesis filtering is two level wavelet synthesis filtering. For example, the multiple subbands may be LL, HHL, HLH, and HHHH subbands.

As discussed, the techniques described herein may provide efficient wavelet based image/video-intra coding that is scalable and forward compatible with HEVC video Intra (or I) coding. When 1 level (fixed or adaptive) wavelet analysis filtering is performed resulting in 4 wavelet bands and HEVC Main 10 I or Main 10 4:2:2 Intra encoding is employed for coding each band, the techniques generates a single, efficient, scalable and compatible bitstream. At the decoder, from this single bitstream using HEVC Main 10 I or Main 10 4:2:2 Intra decoder either the LL band may be decoded resulting in a one-quarter resolution image/video frame that with or without upsampling to full size may be displayed and/or all 3 remaining bands (HL, LH, and HH) may be decoded also with HEVC Main 10 I or Main 10 4:2:2 Intra decoder and combined with LL band via (fixed or adaptive) synthesis filtering into a full resolution image/video frame that can then be displayed. Such techniques are discussed with respect to FIGS. 7, 8 and 9 and elsewhere herein.

Figure 10B:
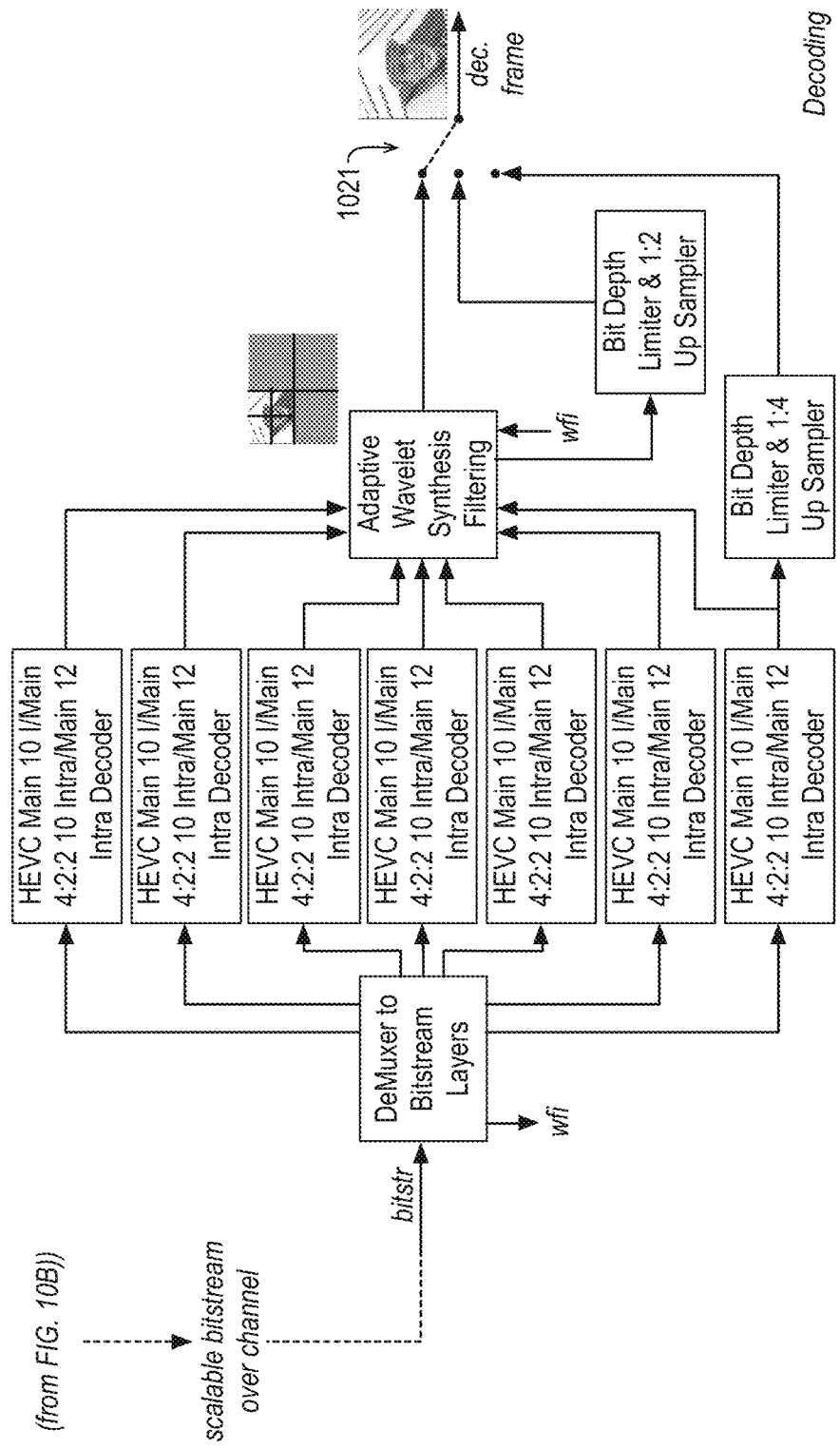

Furthermore, the techniques described herein may provide efficient wavelet based image/video-intra coding that is highly scalable and forward compatible with HEVC video Intra (or I) coding. When 2 level (fixed or adaptive) wavelet analysis filtering resulting in 7 wavelet bands and HEVC Main 10 I or Main 10 4:2:2 Intra encoding is employed for coding each band, the technique generates a single, efficient, highly scalable and compatible bitstream. At the decoder, from this single bitstream using HEVC Main 10 I or Main 10 4:2:2 Intra decoder either the $LL_2$ band may be decoded resulting in a one-sixteenth resolution image/video frame that with or without upsampling may be displayed and/or 3 additional bands ($HL_2$, $LH_2$, and $HH_2$) may be decoded by HEVC Main 10 I or Main 10 4:2:2 Intra decoder and combined with the decoded $LL_2$ band via (fixed or adaptive) synthesis filtering into a one-quarter resolution image/video frame that with or without upsampling to full size may be displayed and/or 3 additional bands ($HL_1$, $LH_1$, and $HH_1$) may be decoded also with HEVC Main 10 I or Main 10 4:2:2 Intra decoder and combined with decoded $LL_2$, $HL_2$, $LH_2$, and $HH_2$ bands via (fixed or adaptive) synthesis filtering into a full resolution image/video frame that can then be displayed. Such techniques are discussed with respect to FIGS. 10 and 11 and elsewhere herein.

Furthermore, the techniques described herein may provide efficient wavelet based image/video-intra coding that is scalable and forward compatible with HEVC video Intra (or I) coding as well as HEVC spatial scalability video Intra (or I) coding. An input image/video frame is first downsampled by 2 in each dimension and encoded with HEVC Main I or HEVC Main Still Picture or HEVC Main 10 I or HEVC Main 4:2:2 10 Intra or H.264 Baseline I or H.264 Main I or H.264 High I encoder and the locally decoded image/video frame is used as prediction in SNR scalable encoding (of the LL band obtained from 1 level fixed or adaptive wavelet analysis) performed by HEVC scalable Main I or HEVC Scalable Main 10 I encoder of the LL band obtained from 1 level (fixed or adaptive) wavelet analysis filtering of input. At the encoder, the remaining 3 bands (HL, LH, and HH) also obtained from the same 1 level analysis filtering are encoded with HEVC Main 10 I or Main 4:2:2 10 Intra Encoder. The resulting scalable, and compatible bitstream is correspondingly decoded at the decoder using HEVC Main I or HEVC Main Still Picture or HEVC Main 10 I or HEVC Main 4:2:2 10 Intra or H.264 Baseline I or H.264 Main I or H.264 High I decoder. At the output, one of the three or all of the three choices are available such as lower quality $\frac{1}{4}^{th}$ resolution image/video frame which may be used as is or upsampled for display, full quality $\frac{1}{4}^{th}$ resolution LL band version of image/video frame that can also be used as is or upsampled for display, and 3 remaining bands (HL, LH, and HH) that are decoded with HEVC Main 10 I or Main 4:2:2 10 Intra decoder and combined with full quality LL band via (fixed or adaptive) synthesis filtering resulting in a full resolution image/video frame that can then be displayed. Such techniques are discussed with respect to FIGS. 12 and 13 and elsewhere herein.

Furthermore, the techniques described herein may provide efficient wavelet based image/video-intra coding that is scalable but and forward compatible with HEVC video Intra (or I) coding as well as HEVC SNR scalability video Intra (or I) coding. An input image/video frame undergoes 1 level (fixed or adaptive) analysis filtering resulting in decomposition into $\frac{1}{4}^{th}$ resolution/size LL, HL, LH and HH bands. The LL band is first coded by bit depth limiting followed by encoding with HEVC Main I or HEVC Main Still Picture or HEVC Main 10 I or HEVC Main 4:2:2 10 Intra or H.264 Baseline I or H.264 Main I or H.264 High I encoder and locally decoded image/video frame is used as prediction in SNR scalable encoding performed by HEVC scalable Main I or HEVC Scalable Main 10 I encoder. At the encoder, the remaining 3 bands (HL, LH, and HH) also obtained from the same 1 level analysis filtering are encoded with HEVC Main 10 I or Main 4:2:2 10 Intra Encoder. The LL band of the scalable, and compatible bitstream generated at encoder is correspondingly decoded at the decoder using HEVC Main I or HEVC Main Still Picture or HEVC Main 10 I or HEVC Main 4:2:2 10 Intra or H.264 Baseline I or H.264 Main I or H.264 High I decoder. At the output, one of the three or all of the three choices are available such as lower quality $\frac{1}{4}^{th}$ resolution image/video frame which may be used as is or upsampled for display, full quality $\frac{1}{4}^{th}$ resolution image/video frame that can also be used as is or upsampled for display, and 3 remaining bands (HL, LH, and HH) that are decoded with HEVC Main 10 I or Main 4:2:2 10 Intra decoder and combined with full quality LL band via (fixed or adaptive) synthesis filtering resulting in a full resolution image/video frame that can then be displayed. Such techniques are discussed with respect to FIGS. 14 and 15 and elsewhere herein.

Furthermore, the techniques described herein may provide efficient wavelet based image/video-intra coding that scalable and forward compatible with HEVC video Intra (or I) coding as well as HEVC spatial scalability video Intra (or I) coding. Input image/video frame is first downsampled by 4 in each dimension and encoded with HEVC Main I or HEVC Main Still Picture or HEVC Main 10 I or HEVC Main 4:2:2 10 Intra or H.264 Baseline I or H.264 Main I or H.264 High I encoder and locally decoded image/video frame is upsampled by 2 in each dimension and used as prediction in spatially scalable encoding (of the LL band obtained from 1 level fixed or adaptive wavelet analysis) performed by HEVC scalable Main I or HEVC Scalable Main 10 I encoder of the LL band obtained from 1 level (fixed or adaptive) wavelet analysis filtering of input. At the encoder, the remaining 3 bands (HL, LH, and HH) also obtained from the same 1 level analysis filtering are encoded with HEVC Main 10 I or Main 4:2:2 10 Intra Encoder. The resulting scalable, and compatible bitstream is correspondingly decoded at the decoder using HEVC Main I or HEVC Main Still Picture or HEVC Main 10 I or HEVC Main 4:2:2 10 Intra or H.264 Baseline I or H.264 Main I or H.264 High I decoder. At the output, one of the three or all of the three choices are available such as lower quality $\frac{1}{16}^{th}$ resolution image/video frame which may be used as is or upsampled for display, full quality $\frac{1}{4}^{th}$ resolution LL band version of image/video frame that can also be used as is or upsampled for display, and 3 remaining bands (HL, LH, and HH) that are decoded with HEVC Main 10 I or Main 4:2:2 10 Intra decoder and combined with full quality LL band via (fixed or adaptive) synthesis filtering resulting in a full resolution image/video frame that can then be displayed. Such techniques are discussed with respect to FIGS. 16 and 17 and elsewhere herein.

Furthermore, the techniques described herein may provide efficient wavelet based image/video-intra coding that scalable and forward compatible with HEVC video based on an encoder/decoder system that is a combination of the encoder/decoder systems providing HEVC spatial and SNR scalability. Such techniques are discussed with respect to FIGS. 18 and 19 and elsewhere herein.

Furthermore, the techniques described herein may provide efficient wavelet based image/video-intra coding that may provide spatial scalability by a factor of 1.5 (by comparison other systems discussed were limited to integer power-of-2 factors such as 2 or 4) and is forward compatible with HEVC video Intra (or I) coding. A first embodiment of wavelet and HEVC based scalable coding system may include image/video-intra down sampling prior to encoding and up sampling after decoding, octave band fixed/adaptive analysis/synthesis filtering, and HEVC Main 10 I or Main 4:2:2 10 Intra Encoder/Decoder Such techniques are discussed with respect to FIGS. 20 and 21 and elsewhere herein. A second embodiment of wavelet and HEVC based scalable coding system may include image/video-intra down sampling prior to encoding and up sampling after decoding, non-octave band fixed/adaptive analysis/synthesis filtering, and HEVC Main 10 I or Main 4:2:2 10 Intra Encoder/Decoder. Such techniques are discussed with respect to FIGS. 22 and 23 and elsewhere herein. Furthermore, the techniques described herein may provide efficient wavelet based image/video-intra coding that may provide spatial scalability by a generalized factor that is an integer or a real number (e.g., 1.25, 1.33, 1.5, 1.66, etc.) and is forward compatible with HEVC video Intra (or I) coding. For example, an image/video-intra is down sampled prior to encoding and up sampling after decoding, octave band fixed/adaptive analysis/synthesis filtered, and encoded/decoded by an HEVC Main 10 I or Main 4:2:2 10 Intra Encoder/Decoder. Such techniques are discussed with respect to FIGS. 24 and 25 and elsewhere herein.

Figure 26:
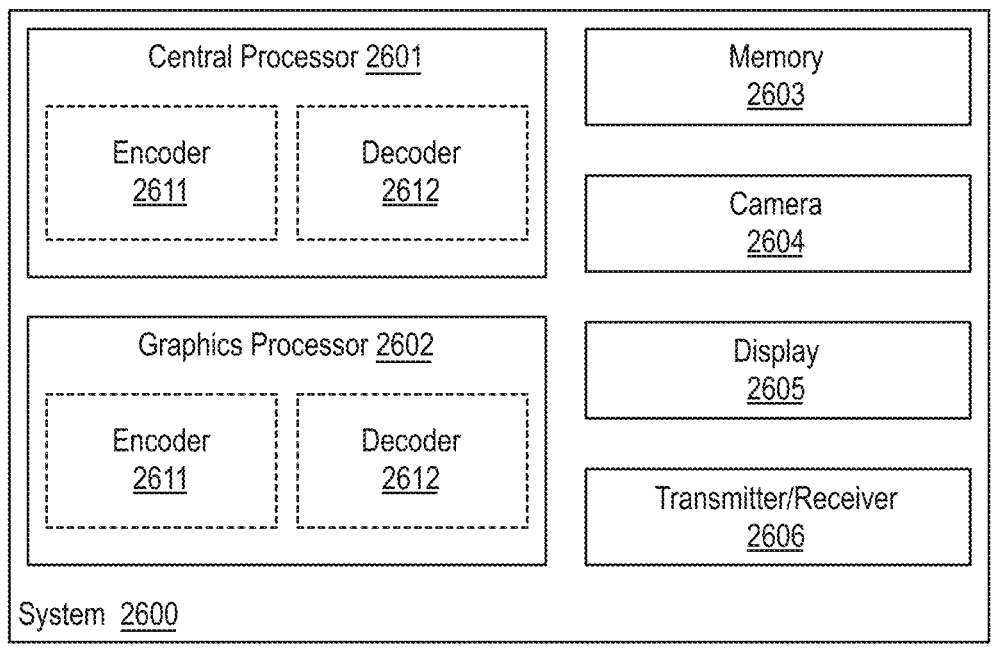
FIG. 26 is an illustrative diagram of an example system for encoding and/or decoding.

FIG. 26 is an illustrative diagram of an example system 2600 for encoding and/or decoding, arranged in accordance with at least some implementations of the present disclosure. As shown in FIG. 26, system 2600 may include a central processor 2601, a graphics processor 2602, a memory 2603, a camera 2604, a display 2605, and a transmitter/receiver 2606. In some embodiments system 2600 may not include camera 2604, display 2605, and/or transmitter/receiver 2606. As shown central processor 2601 and/or graphics processor 2602 may implement an encoder 2611 and/or decoder 2612. Encoder 2611 and decoder 2612 may include any encoder or decoder as discussed herein or combinations thereof. In some embodiments, system 2600 may not implement encoder 2611 or decoder 2602. In the example of system 2600, memory 2603 may store frame data, image data, or bitstream data or any related data such as any other data discussed herein.

As shown, in some embodiments, encoder and/or decoder 2612 may be implemented via central processor 2601. In other embodiments, one or more or portions of encoder and/or decoder 2612 may be implemented via graphics processor 2602. In yet other embodiments, encoder and/or decoder 2612 may be implemented by an image processing unit, an image processing pipeline, a video processing pipeline, or the like. In some embodiments, encoder and/or decoder 2612 may be implemented in hardware as a system-on-a-chip (SoC).

Graphics processor 2602 may include any number and type of graphics processing units that may provide the operations as discussed herein. Such operations may be implemented via software or hardware or a combination thereof. For example, graphics processor 2602 may include circuitry dedicated to manipulate and/or analyze images or frames obtained from memory 2603. Central processor 2601 may include any number and type of processing units or modules that may provide control and other high level functions for system 2600 and/or provide any operations as discussed herein. Memory 2603 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2603 may be implemented by cache memory. In an embodiment, one or more or portions of encoder and/or decoder 2612 may be implemented via an execution unit (EU) of graphics processor 2602 or another processor. The EU may include, for example, programmable logic or circuitry such as a logic core or cores that may provide a wide array of programmable logic functions. In an embodiment, one or more or portions of encoder and/or decoder 2612 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2604 may be any suitable camera or device that may obtain image or frame data for processing such as encode processing as discussed herein. Display 2605 may be any display or device that may present image or frame data such as decoded images or frames as discussed herein. Transmitter/receiver 2606 may include any suitable transmitter and/or receiver that may transmit or receive bitstream data as discussed herein.

System 2600 may implement any devices, systems, encoders, decoders, modules, units, or the like as discussed herein. Furthermore, system 2600 may implement any processes, operations, or the like as discussed herein.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding FIGS. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry conFIG.d to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 27:
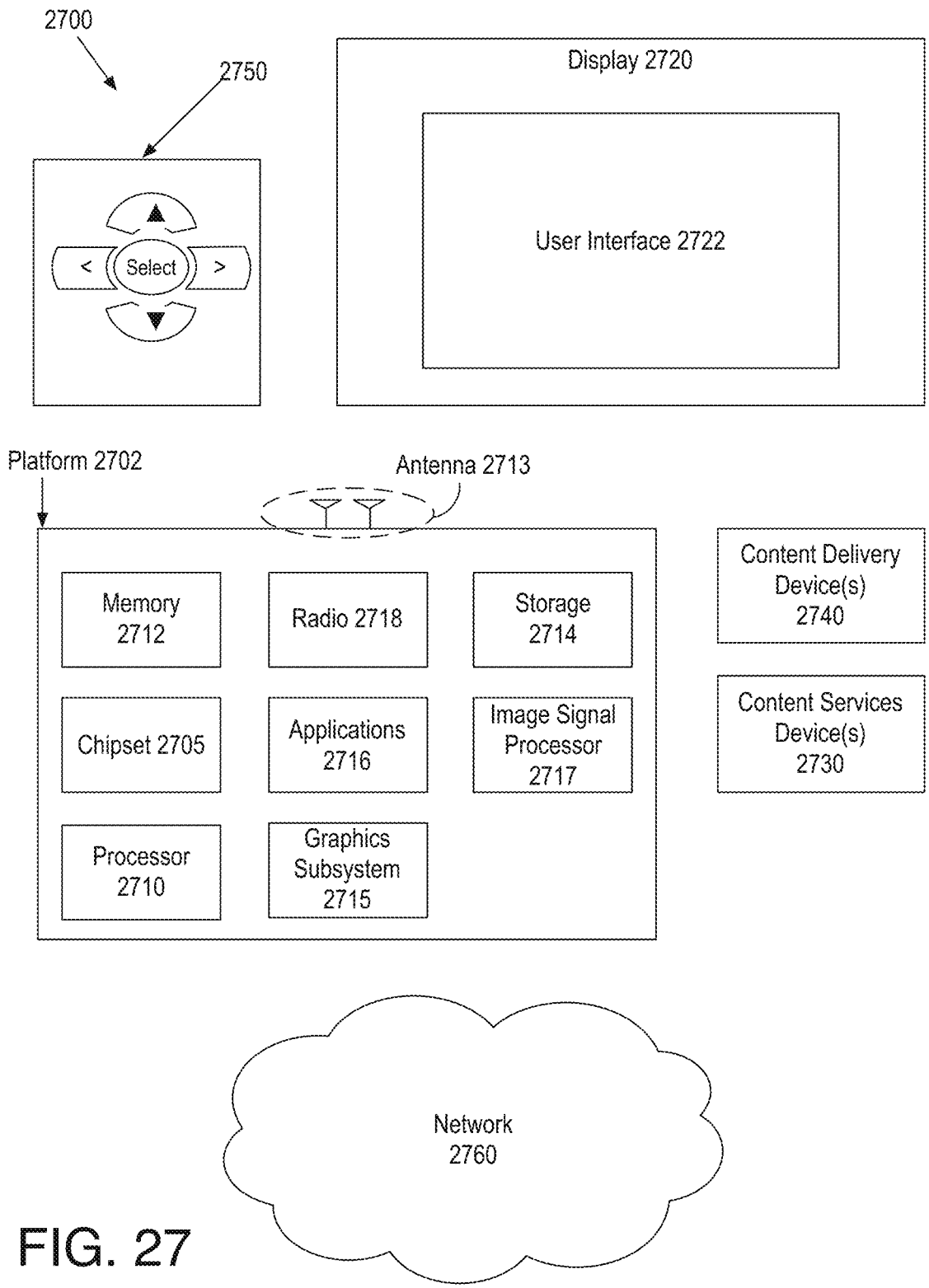
FIG. 27 is an illustrative diagram of an example system.

FIG. 27 is an illustrative diagram of an example system 2700, arranged in accordance with at least some implementations of the present disclosure. In various implementations, system 2700 may be a mobile device system although system 2700 is not limited to this context. For example, system 2700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2700 includes a platform 2702 coupled to a display 2720. Platform 2702 may receive content from a content device such as content services device(s) 2730 or content delivery device(s) 2740 or other content sources such as image sensors 2719. For example, platform 2702 may receive image data as discussed herein from image sensors 2719 or any other content source. A navigation controller 2750 including one or more navigation features may be used to interact with, for example, platform 2702 and/or display 2720. Each of these components is described in greater detail below.

In various implementations, platform 2702 may include any combination of a chipset 2705, processor 2710, memory 2711, antenna 2713, storage 2714, graphics subsystem 2715, applications 2716, image signal processor 2717 and/or radio 2718. Chipset 2705 may provide intercommunication among processor 2710, memory 2711, storage 2714, graphics subsystem 2715, applications 2716, image signal processor 2717 and/or radio 2718. For example, chipset 2705 may include a storage adapter (not depicted) capable of providing intercommunication with storage 2714.

Processor 2710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2710 may be dual-core processor(s), dual-core mobile processor(s), and so forth.

Memory 2711 may be implemented as a volatile memory device such as, but not limited to, a Random Access Memory (RAM), Dynamic Random Access Memory (DRAM), or Static RAM (SRAM).

Storage 2714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2714 may include technology to increase the storage performance enhanced protection for valuable digital media when multiple hard drives are included, for example.

Image signal processor 2717 may be implemented as a specialized digital signal processor or the like used for image processing. In some examples, image signal processor 2717 may be implemented based on a single instruction multiple data or multiple instruction multiple data architecture or the like. In some examples, image signal processor 2717 may be characterized as a media processor. As discussed herein, image signal processor 2717 may be implemented based on a system on a chip architecture and/or based on a multi-core architecture.

Graphics subsystem 2715 may perform processing of images such as still or video for display. Graphics subsystem 2715 may be a graphics processing unit (GPU) or a visual processing unit (VPU), for example. An analog or digital interface may be used to communicatively couple graphics subsystem 2715 and display 2720. For example, the interface may be any of a High-Definition Multimedia Interface, DisplayPort, wireless HDMI, and/or wireless HD compliant techniques. Graphics subsystem 2715 may be integrated into processor 2710 or chipset 2705. In some implementations, graphics subsystem 2715 may be a stand-alone device communicatively coupled to chipset 2705.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2718 may operate in accordance with one or more applicable standards in any version.

In various implementations, display 2720 may include any television type monitor or display. Display 2720 may include, for example, a computer display screen, touch screen display, video monitor, television-like device, and/or a television. Display 2720 may be digital and/or analog. In various implementations, display 2720 may be a holographic display. Also, display 2720 may be a transparent surface that may receive a visual projection. Such projections may convey various forms of information, images, and/or objects. For example, such projections may be a visual overlay for a mobile augmented reality (MAR) application. Under the control of one or more software applications 2716, platform 2702 may display user interface 2722 on display 2720.

In various implementations, content services device(s) 2730 may be hosted by any national, international and/or independent service and thus accessible to platform 2702 via the Internet, for example. Content services device(s) 2730 may be coupled to platform 2702 and/or to display 2720. Platform 2702 and/or content services device(s) 2730 may be coupled to a network 2760 to communicate (e.g., send and/or receive) media information to and from network 2760. Content delivery device(s) 2740 also may be coupled to platform 2702 and/or to display 2720.

Image sensors 2719 may include any suitable image sensors that may provide image data based on a scene. For example, image sensors 2719 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2719 may include any device that may detect information of a scene to generate image data.

In various implementations, content services device(s) 2730 may include a cable television box, personal computer, network, telephone, Internet enabled devices or appliance capable of delivering digital information and/or content, and any other similar device capable of uni-directionally or bi-directionally communicating content between content providers and platform 2702 and/display 2720, via network 2760 or directly. It will be appreciated that the content may be communicated uni-directionally and/or bi-directionally to and from any one of the components in system 2700 and a content provider via network 2760. Examples of content may include any media information including, for example, video, music, medical and gaming information, and so forth.

Content services device(s) 2730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2702 may receive control signals from navigation controller 2750 having one or more navigation features. The navigation features of navigation controller 2750 may be used to interact with user interface 2722, for example. In various embodiments, navigation controller 2750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2750 may be replicated on a display (e.g., display 2720) by movements of a pointer, cursor, focus ring, or other visual indicators displayed on the display. For example, under the control of software applications 2716, the navigation features located on navigation controller 2750 may be mapped to virtual navigation features displayed on user interface 2722, for example. In various embodiments, navigation controller 2750 may not be a separate component but may be integrated into platform 2702 and/or display 2720. The present disclosure, however, is not limited to the elements or in the context shown or described herein.

In various implementations, drivers (not shown) may include technology to enable users to instantly turn on and off platform 2702 like a television with the touch of a button after initial boot-up, when enabled, for example. Program logic may allow platform 2702 to stream content to media adaptors or other content services device(s) 2730 or content delivery device(s) 2740 even when the platform is turned "off." In addition, chipset 2705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2700 may be integrated. For example, platform 2702 and content services device(s) 2730 may be integrated, or platform 2702 and content delivery device(s) 2740 may be integrated, or platform 2702, content services device(s) 2730, and content delivery device(s) 2740 may be integrated, for example. In various embodiments, platform 2702 and display 2720 may be an integrated unit. Display 2720 and content service device(s) 2730 may be integrated, or display 2720 and content delivery device(s) 2740 may be integrated, for example. These examples are not meant to limit the present disclosure.

In various embodiments, system 2700 may be implemented as a wireless system, a wired system, or a combination of both. When implemented as a wireless system, system 2700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 27.

Figure 28:
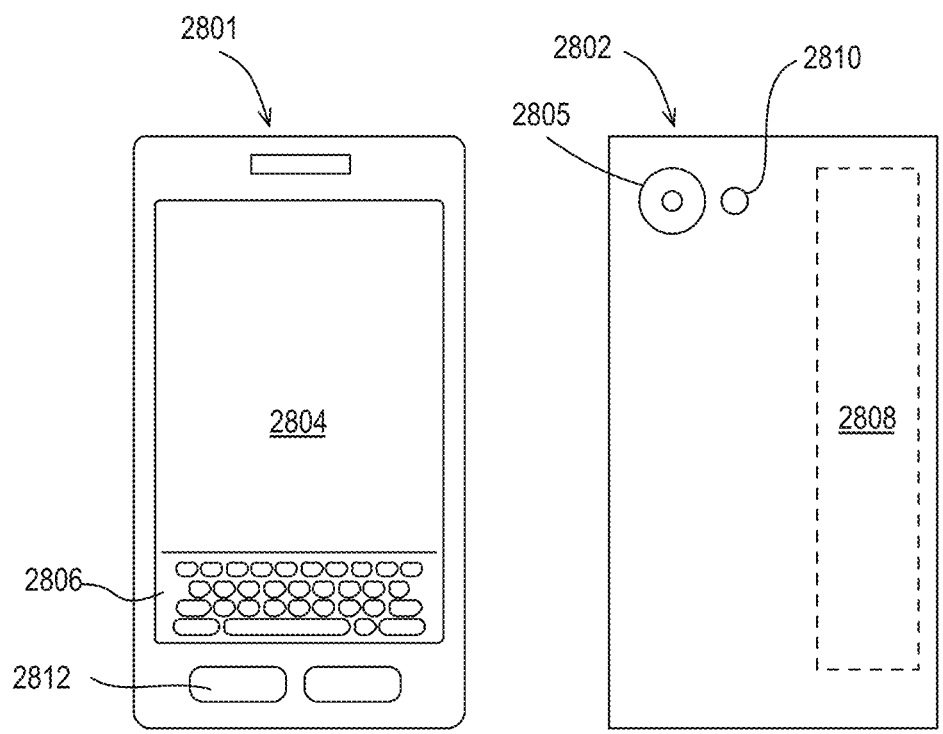
FIG. 28 illustrates an example small form factor device, all arranged in accordance with at least some implementations of the present disclosure.

As described above, system 2700 may be embodied in varying physical styles or form factors. FIG. 28 illustrates an example small form factor device 2800, arranged in accordance with at least some implementations of the present disclosure. In some examples, system 2700 may be implemented via device 2800. In various embodiments, for example, device 2800 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 28, device 2800 may include a housing with a front 2801 and a back 2802. Device 2800 includes a display 2804, an input/output (I/O) device 2806, and an integrated antenna 2808. Device 2800 also may include navigation features 2811. I/O device 2806 may include any suitable I/O device for entering information into a mobile computing device. Examples for I/O device 2806 may include an alphanumeric keyboard, a numeric keypad, a touch pad, input keys, buttons, switches, microphones, speakers, voice recognition device and software, and so forth. Information also may be entered into device 2800 by way of microphone (not shown), or may be digitized by a voice recognition device. As shown, device 2800 may include a camera 2805 (e.g., including a lens, an aperture, and an imaging sensor) and a flash 2810 integrated into back 2802 (or elsewhere) of device 2800. In other examples, camera 2805 and/or flash 2810 may be integrated into front 2801 of device 2800 and/or additional cameras (e.g., such that device 2800 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for image or video coding comprises performing wavelet decomposition on an original image or frame to generate a plurality of subbands, encoding each of the plurality of subbands with an High Efficiency Video Coding (HEVC) compliant encoder to generate a plurality of HEVC compliant bitstreams that are forward compatible with HEVC coding, each associated with a subband of the plurality of subbands, and multiplexing the plurality of subbands to generate a single scalable bitstream, wherein at least portions of the single scalable bitstream are HEVC compliant.

Further to the first embodiments, the method further comprises selecting a wavelet analysis filter set for performing the wavelet decomposition.

Further to the first embodiments, the original image or frame has a bit depth of 8 bits and each of the subbands has a bit depth of 9 bits or wherein the original image or frame has a bit depth of 9 bits and each of the subbands has a bit depth of 10 bits.

Further to the first embodiments, when the subbands have a bit depth of 9 bits, the HEVC compliant encoder comprises at least one of a 10 bit intra encoder profile or a 12 bit intra encoder profile and, when the subbands have a bit depth of 11 bits, the HEVC compliant encoder comprises a 12 bit intra encoder profile.

Further to the first embodiments, performing the wavelet decomposition comprises single level wavelet analysis filtering and the plurality of subbands comprise four subbands.

Further to the first embodiments, performing the wavelet decomposition comprises single level wavelet analysis filtering and the plurality of subbands comprise four subband and the plurality of subbands comprise an LL subband, an LH subband, an HL subband, and an HH subband.

Further to the first embodiments, performing the wavelet decomposition comprises multiple level wavelet analysis filtering.

Further to the first embodiments, performing the wavelet decomposition comprises multiple level wavelet analysis filtering and the plurality of subbands comprise seven subbands.

In one or more second embodiments, a system for image or video coding comprises a memory to store an original image or frame and a processor coupled to the memory, the processor to perform wavelet decomposition on the original image or frame to generate a plurality of subbands, encode each of the plurality of subbands with an High Efficiency Video Coding (HEVC) compliant encoder to generate a plurality of HEVC compliant bitstreams that are forward compatible with HEVC coding, each associated with a subband of the plurality of subbands, and multiplex the plurality of subbands to generate a single scalable bitstream, wherein at least portions of the single scalable bitstream are HEVC compliant.

Further to the second embodiments, the processor is further to select a wavelet analysis filter set for performing the wavelet decomposition.

Further to the second embodiments, when the subbands have a bit depth of 9 bits, the HEVC compliant encoder comprises at least one of a 10 bit intra encoder profile or a 12 bit intra encoder profile and, when the subbands have a bit depth of 11 bits, the HEVC compliant encoder comprises a 12 bit intra encoder profile.

Further to the second embodiments, the processor to perform the wavelet decomposition comprises the processor to perform single level wavelet analysis filtering and the plurality of subbands comprise four subbands.

Further to the second embodiments, the processor to perform the wavelet decomposition comprises the processor to perform single level wavelet analysis filtering and the plurality of subbands comprise four subbands and the plurality of subbands comprise an LL subband, an LH subband, an HL subband, and an HH subband.

Further to the second embodiments, the processor to perform the wavelet decomposition comprises the processor to perform multiple level wavelet analysis filtering.

In one or more third embodiments, a computer-implemented method for image or video decoding comprises demultiplexing a scalable bitstream, wherein at least portions of the scalable bitstream are High Efficiency Video Coding (HEVC) compliant, to generate a plurality of bitstreams each associated with a subband of a plurality of wavelet subbands, decoding at least one of the plurality of bitstreams with an HEVC compliant decoder, and reconstructing an image or frame based on the decoding.

Further to the third embodiments, the method further comprises determining an output selection associated with the image or frame, wherein the output selection comprises at least one of low resolution or full resolution, and wherein reconstructing the image or frame is responsive to the output selection.

Further to the third embodiments, determining an output selection associated with the image or frame, wherein the output selection comprises at least one of low resolution or full resolution, and wherein reconstructing the image or frame is responsive to the output selection and the output selection is low resolution and reconstructing the image or frame consists of decoding an LL subband with the high efficiency video coding compliant decoder.

Further to the third embodiments, determining an output selection associated with the image or frame, wherein the output selection comprises at least one of low resolution or full resolution, and wherein reconstructing the image or frame is responsive to the output selection and the output selection is low resolution and reconstructing the image or frame consists of decoding an LL subband with the high efficiency video coding compliant decoder and reconstructing the image or frame further comprises at least one of applying a bit depth limiter or performing upsampling.

Further to the third embodiments, the method further comprises determining an output selection associated with the image or frame, wherein the output selection comprises at least one of low resolution or full resolution, and wherein reconstructing the image or frame is responsive to the output selection and the output selection comprises full resolution and reconstructing the image or frame comprises decoding multiple bitstreams each associated with a subband of the plurality of wavelet subbands with at least the HEVC compliant decoder to generate a plurality of decoded subbands and performing wavelet synthesis filtering on the plurality of decoded subbands to generate the original image or frame at full resolution.

Further to the third embodiments, the method further comprises determining an output selection associated with the image or frame, wherein the output selection comprises at least one of low resolution, medium resolution, or full resolution, and wherein reconstructing the image or frame is responsive to the output selection.

Further to the third embodiments, determining an output selection associated with the image or frame, wherein the output selection comprises at least one of low resolution, medium resolution, or full resolution, and wherein reconstructing the image or frame is responsive to the output selection and the output selection comprises low resolution and reconstructing the image or frame consists of decoding an $LL_2$ subband with the high efficiency video coding compliant decoder.

Further to the third embodiments, determining an output selection associated with the image or frame, wherein the output selection comprises at least one of low resolution, medium resolution, or full resolution, and wherein reconstructing the image or frame is responsive to the output selection and the output selection comprises low resolution and reconstructing the image or frame consists of decoding an $LL_2$ subband with the high efficiency video coding compliant decoder and reconstructing the image or frame further comprises applying a bit depth limiter and performing 1:4 upsampling.

Further to the third embodiments, the method further comprises determining an output selection associated with the image or frame, wherein the output selection comprises at least one of low resolution, medium resolution, or full resolution, and wherein reconstructing the image or frame is responsive to the output selection and the output selection comprises medium resolution and reconstructing the image or frame comprises decoding multiple bitstreams each associated with a subband of the plurality of wavelet subbands with at least the high efficiency video coding compliant decoder to generate a plurality of decoded subbands, wherein the multiple bitstreams comprise a subset of the plurality of bitstreams and performing single level wavelet synthesis filtering on the plurality of decoded subbands to generate the image or frame.

Further to the third embodiments, the method further comprises determining an output selection associated with the image or frame, wherein the output selection comprises at least one of low resolution, medium resolution, or full resolution, and wherein reconstructing the image or frame is responsive to the output selection and the output selection comprises medium resolution and reconstructing the image or frame comprises decoding multiple bitstreams each associated with a subband of the plurality of wavelet subbands with at least the high efficiency video coding compliant decoder to generate a plurality of decoded subbands, wherein the multiple bitstreams comprise a subset of the plurality of bitstreams and performing single level wavelet synthesis filtering on the plurality of decoded subbands to generate the image or frame and reconstructing the image or frame further comprises applying a bit depth limiter and performing 1:2 upsampling.

Further to the third embodiments, the method further comprises determining an output selection associated with the image or frame, wherein the output selection comprises at least one of low resolution, medium resolution, or full resolution, and wherein reconstructing the image or frame is responsive to the output selection and the output selection comprises full resolution and reconstructing the image or frame comprises decoding multiple bitstreams each associated with a subband of the plurality of wavelet subbands with at least the high efficiency video coding compliant decoder to generate a plurality of decoded subbands, wherein the multiple bitstreams comprise all of the plurality of bitstreams and performing multiple level wavelet analysis filtering on the plurality of decoded subbands to generate the image or frame at full resolution.

In one or more fourth embodiments, a system for image or video decoding comprises a memory to store a scalable bitstream and a processor coupled to the memory, the processor to demultiplex the scalable bitstream, wherein at least portions of the scalable bitstream are High Efficiency Video Coding (HEVC) compliant, to generate a plurality of bitstreams each associated with a subband of a plurality of wavelet subbands, decode at least one of the plurality of bitstreams with an HEVC compliant decoder, and reconstruct an image or frame based on the decoding.

Further to the fourth embodiments, the processor is further to determine an output selection associated with the image or frame, wherein the output selection comprises at least one of low resolution or full resolution, and wherein reconstructing the image or frame is responsive to the output selection.

Further to the fourth embodiments, the processor is further to determine an output selection associated with the image or frame, wherein the output selection comprises at least one of low resolution or full resolution, and wherein reconstructing the image or frame is responsive to the output selection and the output selection is low resolution and the processor to reconstruct the image or frame consists of the processor to decode an LL subband with the high efficiency video coding compliant decoder.

Further to the fourth embodiments, the processor is further to determine an output selection associated with the image or frame, wherein the output selection comprises at least one of low resolution or full resolution, and wherein reconstructing the image or frame is responsive to the output selection and the output selection comprises full resolution and the processor to reconstruct the image or frame comprises the processor to decode multiple bitstreams each associated with a subband of the plurality of wavelet subbands with at least the HEVC compliant decoder to generate a plurality of decoded subbands and perform wavelet synthesis filtering on the plurality of decoded subbands to generate the original image or frame at full resolution.

Further to the fourth embodiments, the processor is further to determine an output selection associated with the image or frame, wherein the output selection comprises at least one of low resolution, medium resolution, or full resolution, and wherein reconstructing the image or frame is responsive to the output selection.

Further to the fourth embodiments, the processor is further to determine an output selection associated with the image or frame, wherein the output selection comprises at least one of low resolution, medium resolution, or full resolution, and wherein reconstructing the image or frame is responsive to the output selection and the output selection comprises low resolution and the processor to reconstruct the image or frame consists of the processor to decode an $LL_2$ subband with the high efficiency video coding compliant decoder.

Further to the fourth embodiments, the processor is further to determine an output selection associated with the image or frame, wherein the output selection comprises at least one of low resolution, medium resolution, or full resolution, and wherein reconstructing the image or frame is responsive to the output selection and the output selection comprises medium resolution and the processor to reconstruct the image or frame comprises the processor to decode multiple bitstreams each associated with a subband of the plurality of wavelet subbands with at least the high efficiency video coding compliant decoder to generate a plurality of decoded subbands, wherein the multiple bitstreams comprise a subset of the plurality of bitstreams, and perform single level wavelet synthesis filtering on the plurality of decoded subbands to generate the image or frame.

Further to the fourth embodiments, the processor is further to determine an output selection associated with the image or frame, wherein the output selection comprises at least one of low resolution, medium resolution, or full resolution, and wherein reconstructing the image or frame is responsive to the output selection and the output selection comprises full resolution and the processor to reconstruct the image or frame comprises the processor to decode multiple bitstreams each associated with a subband of the plurality of wavelet subbands with at least the high efficiency video coding compliant decoder to generate a plurality of decoded subbands, wherein the multiple bitstreams comprise all of the plurality of bitstreams, and perform multiple level wavelet analysis filtering on the plurality of decoded subbands to generate the image or frame at full resolution.

In one or more fifth embodiments, a computer-implemented method for image or video coding comprises performing wavelet decomposition on an image or frame to generate a plurality of subbands, generating, based on the image or frame, a reference image for inter layer prediction of a first subband of the plurality of subbands, encoding the first subband based on the inter layer prediction using a Scalable High Efficiency Video Coding (SHVC) compliant encoder to generate a bitstream associated with the first subband, encoding remaining subbands of the plurality of subbands to generate one or more second High Efficiency Video Coding (HEVC) compliant bitstreams, and multiplexing the bitstream associated with the first subband and the second bitstreams to generate a scalable bitstream.

Further to the fifth embodiments, generating the reference image comprises coding the reference image based on at least one of an HEVC compliant coder or an advanced video coding (AVC) compliant coder.

Further to the fifth embodiments, generating the reference image comprises downsampling the original image or frame to generate a downsampled image and coding the downsampled image to generate the reference image.

Further to the fifth embodiments, generating the reference image comprises downsampling the original image or frame to generate a downsampled image and coding the downsampled image to generate the reference image and the downsampling comprises a downsampling by two in the horizontal and vertical dimensions.

Further to the fifth embodiments, generating the reference image comprises bit depth limiting the first subband to generate a downsampled image and coding the downsampled image to generate the reference image.

Further to the fifth embodiments, generating the reference image comprises bit depth limiting the first subband to generate a downsampled image and coding the downsampled image to generate the reference image and a bit depth of the first subband is 9 bits and a bit depth of the downsampled image is 8 bits or a bit depth of the first subband is 10 bits and a bit depth of the downsampled image is 9 bits.

Further to the fifth embodiments, generating the reference image comprises downsampling the original image or frame to generate a downsampled image, coding the downsampled image to generate the coded image, and upsampling the coded image to generate the reference image.

Further to the fifth embodiments, generating the reference image comprises downsampling the original image or frame to generate a downsampled image, coding the downsampled image to generate the coded image, and upsampling the coded image to generate the reference image and the downsampling comprises a downsampling by four in the horizontal and vertical dimensions and the upsampling comprises an upsampling by two in the horizontal and vertical dimensions.

Further to the fifth embodiments, the method further comprises determining an inter layer prediction mode associated with the image or frame and generating the reference image responsive to the inter layer prediction mode.

Further to the fifth embodiments, the wavelet decomposition comprises at least one of fixed or adaptive wavelet analysis filtering.

In one or more sixth embodiments, a system for image or video coding comprises a memory to store an image or frame and a processor coupled to the memory, the processor to perform wavelet decomposition on the image or frame to generate a plurality of subbands, generate, based on the image or frame, a reference image for inter layer prediction of a first subband of the plurality of subbands, encode the first subband based on the inter layer prediction using a Scalable High Efficiency Video Coding (SHVC) compliant encoder to generate a bitstream associated with the first subband, encode remaining subbands of the plurality of subbands to generate one or more second High Efficiency Video Coding (HEVC) compliant bitstreams, and multiplex the bitstream associated with the first subband and the second bitstreams to generate a scalable bitstream.

Further to the sixth embodiments, the processor to generate the reference image comprises the processor to downsample the original image or frame to generate a downsampled image and code the downsampled image to generate the reference image.

Further to the sixth embodiments, the processor to generate the reference image comprises the processor to bit depth limit the first subband to generate a downsampled image and cod the downsampled image to generate the reference image.

Further to the sixth embodiments, the processor to generate the reference image comprises the processor to downsample the original image or frame to generate a downsampled image, code the downsampled image to generate the coded image, and upsample the coded image to generate the reference image.

Further to the sixth embodiments, the processor is further to determine an inter layer prediction mode associated with the image or frame and generate the reference image responsive to the inter layer prediction mode.

In one or more seventh embodiments, a computer-implemented method for image or video decoding comprises demultiplexing a scalable bitstream to provide a plurality of bitstreams each associated with a subband of a plurality of wavelet subbands and a second bitstream associated with a reference image for inter layer prediction, decoding the second bitstream to generate the reference image, decoding a first bitstream of the plurality of bitstreams using a Scalable High Efficiency Video Coding (SHVC) decoder to generate a first subband, decoding remaining bitstreams of the plurality of bitstreams to generate remaining subbands of the plurality of the wavelet subbands, and reconstructing an image or frame based on the decoding.

Further to the seventh embodiments, the method further comprises determining an output selection associated with the image or frame, wherein the output selection comprises at least one of low resolution, medium resolution, or full resolution, and wherein reconstructing the image or frame is responsive to the output selection.

Further to the seventh embodiments, determining an output selection associated with the image or frame, wherein the output selection comprises at least one of low resolution, medium resolution, or full resolution, and wherein reconstructing the image or frame is responsive to the output selection and the output selection comprises low resolution and the reconstructed the image or frame comprises the reference image.

Further to the seventh embodiments, determining an output selection associated with the image or frame, wherein the output selection comprises at least one of low resolution, medium resolution, or full resolution, and wherein reconstructing the image or frame is responsive to the output selection and the output selection comprises low resolution and the reconstructed the image or frame comprises the reference image and reconstructing the image or frame comprises at least one of bit depth limiting or upsampling the first subband.

Further to the seventh embodiments, determining an output selection associated with the image or frame, wherein the output selection comprises at least one of low resolution, medium resolution, or full resolution, and wherein reconstructing the image or frame is responsive to the output selection and the output selection comprises low resolution and the reconstructed the image or frame comprises the reference image and reconstructing the image or frame comprises at least one of bit depth limiting or upsampling the first subband and reconstructing the image or frame comprises at least one of bit depth limiting or upsampling the first subband.

Further to the seventh embodiments, determining an output selection associated with the image or frame, wherein the output selection comprises at least one of low resolution, medium resolution, or full resolution, and wherein reconstructing the image or frame is responsive to the output selection and the output selection comprises full resolution and reconstructing the image or frame comprises performing wavelet synthesis filtering on the first subband and the remaining subbands to generate the reconstructed image or frame at full resolution.

In one or more eighth embodiments, a system for image or video decoding comprises a memory to store a scalable bitstream and a processor coupled to the memory, the processor to demultiplex the scalable bitstream to provide a plurality of bitstreams each associated with a subband of a plurality of wavelet subbands and a second bitstream associated with a reference image for inter layer prediction, decode the second bitstream to generate the reference image, decode a first bitstream of the plurality of bitstreams using a Scalable High Efficiency Video Coding (SHVC) decoder to generate a first subband, decode remaining bitstreams of the plurality of bitstreams to generate remaining subbands of the plurality of the wavelet subbands, and reconstruct an image or frame based on the decoding.

Further to the eighth embodiments, the processor is further to determine an output selection associated with the image or frame, wherein the output selection comprises at least one of low resolution, medium resolution, or full resolution, and wherein the processor to reconstruct the image or frame is responsive to the output selection.

Further to the eighth embodiments, the processor is further to determine an output selection associated with the image or frame, wherein the output selection comprises at least one of low resolution, medium resolution, or full resolution, and wherein the processor to reconstruct the image or frame is responsive to the output selection and the output selection comprises low resolution and the reconstructed the image or frame comprises the reference image.

Further to the eighth embodiments, the processor is further to determine an output selection associated with the image or frame, wherein the output selection comprises at least one of low resolution, medium resolution, or full resolution, and wherein the processor to reconstruct the image or frame is responsive to the output selection and the output selection comprises medium resolution and the reconstructed image or frame comprises the first subband.

Further to the eighth embodiments, the processor is further to determine an output selection associated with the image or frame, wherein the output selection comprises at least one of low resolution, medium resolution, or full resolution, and wherein the processor to reconstruct the image or frame is responsive to the output selection and the output selection comprises full resolution and the processor to reconstruct the image or frame comprises the processor to perform wavelet synthesis filtering on the first subband and the remaining subbands to generate the reconstructed image or frame at full resolution.

In one or more ninth embodiments, a computer-implemented method for image or video coding comprises upsampling an original image or frame to generate an upsampled image or frame having a scalability factor between the original image and the upsampled image, performing wavelet decomposition on the upsampled image or frame to generate a plurality of subbands, encoding each of the plurality of subbands with an High Efficiency Video Coding (HEVC) compliant encoder to generate a plurality of bitstreams each associated with a subband of the plurality of subbands, and multiplexing the plurality of subbands to generate a scalable bitstream.

Further to the ninth embodiments, the scalability factor comprises a non-integer value.

Further to the ninth embodiments, the scalability factor comprises 1.5.

Further to the ninth embodiments, the scalability factor comprises at least one of ⅝, ⅘, or ⅗.

Further to the ninth embodiments, the wavelet decomposition comprises single level wavelet analysis filtering.

Further to the ninth embodiments, the wavelet decomposition comprises single level wavelet analysis filtering and the plurality of subbands comprises LL, HL, LH, and HH subbands.

Further to the ninth embodiments, the wavelet decomposition comprises two level wavelet analysis filtering.

Further to the ninth embodiments, the wavelet decomposition comprises two level wavelet analysis filtering and the plurality of subbands comprises LL, HHL, HLH, and HHHH subbands.

In one or more tenth embodiments, a system for image or video coding comprises a memory to store an original image or frame and a processor coupled to the memory, the processor to upsample the original image or frame to generate an upsampled image or frame having a scalability factor between the original image and the upsampled image, perform wavelet decomposition on the upsampled image or frame to generate a plurality of subbands, encode each of the plurality of subbands with an High Efficiency Video Coding (HEVC) compliant encoder to generate a plurality of bitstreams each associated with a subband of the plurality of subbands, and multiplex the plurality of subbands to generate a scalable bitstream.

Further to the tenth embodiments, the scalability factor comprises 1.5.

Further to the tenth embodiments, the scalability factor comprises at least one of ⅝, ⅘, or ⅗.

Further to the tenth embodiments, the wavelet decomposition comprises single level wavelet analysis filtering.

Further to the tenth embodiments, the wavelet decomposition comprises two level wavelet analysis filtering.

In one or more eleventh embodiments, a computer-implemented method for image or video decoding comprises demultiplexing a scalable bitstream, wherein at least portions of scalable bitstream are High Efficiency Video Coding (HEVC) compliant, to provide a plurality of bitstreams each associated with a subband of a plurality of wavelet subbands, decoding each of the plurality of bitstreams with an HEVC compliant decoder to generate the plurality of wavelet subbands, performing wavelet synthesis filtering on the plurality of decoded wavelet subbands to generate a reconstructed image or frame, and downsampling the reconstructed image or frame by a downsampling ratio to generate an image or frame.

Further to the eleventh embodiments, the downsampling ratio comprises a non-integer value.

Further to the eleventh embodiments, the downsampling ratio comprises ¾ providing a 1.5 scalability factor between the image or frame and a low resolution image based on a first subband of the plurality of wavelet subbands.

Further to the eleventh embodiments, the method further comprises determining an output selection associated with the image or frame, wherein the output selection comprises at least one of low resolution or full resolution and displaying a display image responsive to the output selection.

Further to the eleventh embodiments, the method further comprises determining an output selection associated with the image or frame, wherein the output selection comprises at least one of low resolution or full resolution and displaying a display image responsive to the output selection and the output selection comprises low resolution and the display image comprises a first subband of the plurality of wavelet subbands.

Further to the eleventh embodiments, the method further comprises determining an output selection associated with the image or frame, wherein the output selection comprises at least one of low resolution or full resolution and displaying a display image responsive to the output selection and the scalability selection comprises full resolution and the display image comprises the image or frame.

Further to the eleventh embodiments, the wavelet synthesis filtering comprises single level wavelet synthesis filtering.

Further to the eleventh embodiments, the wavelet synthesis filtering comprises single level wavelet synthesis filtering and the plurality of subbands comprises LL, HL, LH, and HH subbands.

Further to the eleventh embodiments, the wavelet synthesis filtering comprises two level wavelet synthesis filtering.

Further to the eleventh embodiments, the wavelet synthesis filtering comprises two level wavelet synthesis filtering and the plurality of subbands comprises LL, HHL, HLH, and HHHH subbands.

In one or more twelfth embodiments, a system for image or video decoding comprises a memory to store a scalable bitstream and a processor coupled to the memory, the processor to demultiplex the scalable bitstream, wherein at least portions of scalable bitstream are High Efficiency Video Coding (HEVC) compliant, to provide a plurality of bitstreams each associated with a subband of a plurality of wavelet subbands, decode each of the plurality of bitstreams with an HEVC compliant decoder to generate the plurality of wavelet subbands, perform wavelet synthesis filtering on the plurality of decoded wavelet subbands to generate a reconstructed image or frame, and downsample the reconstructed image or frame by a downsampling ratio to generate an image or frame.

Further to the twelfth embodiments, the downsampling ratio comprises ¾ providing a 1.5 scalability factor between the image or frame and a low resolution image based on a first subband of the plurality of wavelet subbands.

Further to the twelfth embodiments, the processor is further to determine an output selection associated with the image or frame, wherein the output selection comprises at least one of low resolution or full resolution, and provide a display image responsive to the output selection.

Further to the twelfth embodiments, the processor is further to determine an output selection associated with the image or frame, wherein the output selection comprises at least one of low resolution or full resolution, and provide a display image responsive to the output selection and the output selection comprises low resolution and the display image comprises a first subband of the plurality of wavelet subbands.

Further to the twelfth embodiments, the processor is further to determine an output selection associated with the image or frame, wherein the output selection comprises at least one of low resolution or full resolution, and provide a display image responsive to the output selection and the scalability selection comprises full resolution and the display image comprises the image or frame.

Further to the twelfth embodiments, the wavelet synthesis filtering comprises single level wavelet synthesis filtering.

Further to the twelfth embodiments, the wavelet synthesis filtering comprises two level wavelet synthesis filtering.

Further to the twelfth embodiments, the wavelet synthesis filtering comprises two level wavelet synthesis filtering and the plurality of subbands comprises LL, HHL, HLH, and HHHH subbands.

In one or more thirteenth embodiments, at least one machine readable medium may include a plurality of instructions that, in response to being executed on a computing device, cause the computing device to perform a method according to any one of the above embodiments.

In one or more fourteenth embodiments, an apparatus or a system may include means for performing a method or any functions according to any one of the above embodiments.

It will be recognized that the embodiments are not limited to the embodiments so described, but may be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for image or video coding comprising:
   upsampling an original image having a bit depth of 8 bits by a factor of 4/3 in each dimension to generate an upsampled original image;
   performing wavelet decomposition on the upsampled original image to generate a plurality of subbands each having a bit depth of 9 or 10 bits;
   encoding each of the plurality of subbands with a High Efficiency Video Coding (HEVC) compliant encoder using a 10 bit intra encoder profile to generate a plurality of HEVC compliant bitstreams that are forward compatible with HEVC coding, each associated with a subband of the plurality of subbands; and
   multiplexing the plurality of HEVC compliant bitstreams to generate a single scalable bitstream, wherein at least portions of the single scalable bitstream are HEVC compliant.

2. The method of claim 1 further comprising:
   selecting a wavelet analysis filter set for performing the wavelet decomposition.

3. The method of claim 1, wherein performing the wavelet decomposition comprises single level wavelet analysis filtering, the plurality of subbands comprise four subbands, and each of the plurality of subbands has a bit depth of 9 bits.

4. The method of claim 3, wherein the plurality of subbands comprise an LL subband, an LH subband, an HL subband, and an HH subband.

5. The method of claim 1, wherein performing the wavelet decomposition comprises multiple level wavelet analysis filtering to generate nine subbands and selecting four subbands to generate the plurality of subbands.

6. The method of claim 5, wherein the nine subbands comprise an LL subband, an LHL subband, an HHL subband, an LLH subband, an HLH subband, a LLHH subband, a HLHH subband, a LHHH subband, and a HHHH subband and the plurality of subbands comprise the LL subband, the HHL subband, the HLH subband, and the HHHH subband.

7. At least one non-transitory machine readable medium comprising a plurality of instructions that, in response to being executed on a device, cause the device to perform image or video coding by:
   upsampling an original image having a bit depth of 8 bits by a factor of 4/3 in each dimension to generate an upsampled original image;
   performing wavelet decomposition on the upsampled original image to generate a plurality of subbands each having a bit depth of 9 or 10 bits;
   encoding each of the plurality of subbands with a High Efficiency Video Coding (HEVC) compliant encoder using a 10 bit intra encoder profile to generate a plurality of HEVC compliant bitstreams that are forward compatible with HEVC coding, each associated with a subband of the plurality of subbands; and
   multiplexing the plurality of HEVC compliant bitstreams to generate a single scalable bitstream, wherein at least portions of the single scalable bitstream are HEVC compliant.

8. The non-transitory machine readable medium of claim 7 further comprising a plurality of instructions that, in response to being executed on the device, cause the device to perform image or video coding by:
   selecting a wavelet analysis filter set for performing the wavelet decomposition.

9. The non-transitory machine readable medium of claim 7, wherein performing the wavelet decomposition comprises single level wavelet analysis filtering, the plurality of subbands comprise four subbands, and each of the plurality of subbands has a bit depth of 9 bits.

10. The non-transitory machine readable medium of claim 7, wherein the plurality of subbands comprise an LL subband, an LH subband, an HL subband, and an HH subband.

11. The non-transitory machine readable medium of claim 10, wherein performing the wavelet decomposition comprises multiple level wavelet analysis filtering to generate nine subbands and selecting four subbands to generate the plurality of subbands.

12. The non-transitory machine readable medium of claim 7, wherein the nine subbands comprise an LL subband, an LHL subband, an HHL subband, an LLH subband, an HLH subband, a LLHH subband, a HLHH subband, a LHHH subband, and a HHHH subband and the plurality of subbands comprise the LL subband, the HHL subband, the HLH subband, and the HHHH subband.

13. A computer-implemented method for image or video decoding comprising:
   demultiplexing a scalable bitstream, wherein at least portions of the scalable bitstream are High Efficiency Video Coding (HEVC) compliant, to generate a plurality of bitstreams each associated with a subband of a plurality of wavelet subbands;
   decoding at least a first of the plurality of bitstreams with an HEVC compliant decoder using a 10 bit intra decoder profile to generate at least a first subband of the plurality of wavelet subbands, the first subband having a bit depth of 9 bits;
decoding remaining ones of the plurality of bitstreams with HEVC compliant decoders using 10 bit intra decoder profiles to generate second subbands of the plurality of wavelet subbands each having a bit depth of 9 or 10 bits;
performing wavelet synthesis filtering on the first subband and the second subbands to generate an image having a bit depth of 8 bits;
downsampling the image by a factor of ¾ in each dimension to provide a final image; and
presenting the final image.

14. The method of claim 13, further comprising:
determining an output selection, wherein the output selection comprises at least one of low resolution or full resolution; and
performing said decoding remaining ones of the plurality of bitstreams, performing wavelet synthesis filtering, and downsampling the image responsive to the output selection comprising full resolution.

15. The method of claim 14, wherein the first band comprises an LL subband and the second subbands comprise three subbands.

16. The method of claim 13, wherein the second subbands comprise an LH subband, an HL subband, and an HH subband.

17. The method of claim 13, wherein the second subbands comprise an HHL subband, an HLH subband, and an HHHH subband.

18. The method of claim 17, further comprising:
selecting a wavelet synthesis filter set for performing wavelet synthesis filtering.

19. A system for image or video decoding comprising:
a memory to store a scalable bitstream; and
a processor coupled to the memory, the processor to:
demultiplex the scalable bitstream, wherein at least portions of the scalable bitstream are High Efficiency Video Coding (HEVC) compliant, to generate a plurality of bitstreams each associated with a subband of a plurality of wavelet subbands,
decode at least a first of the plurality of bitstreams with an HEVC compliant decoder using a 10 bit intra decoder profile to generate at least a first subband of the plurality of wavelet subbands, the first subband having a bit depth of 9 bits;
decode remaining ones of the plurality of bitstreams with HEVC compliant decoders using 10 bit intra decoder profiles to generate second subbands of the plurality of wavelet subbands each having a bit depth of 9 or 10 bits;
perform wavelet synthesis filtering on the first subband and the second subbands to generate an image having a bit depth of 8 bits;
downsample the image by a factor of ¾ in each dimension to provide a final image; and
present the final image.

20. The system of claim 19 the processor further to:
determine an output selection, wherein the output selection comprises at least one of low resolution or full resolution; and
perform said decode of remaining ones of the plurality of bitstreams, perform wavelet synthesis filtering, and downsample the image responsive to the output selection comprising full resolution.

21. The system of claim 20, wherein the first band comprises an LL subband and the second subbands comprise three subbands.

22. The system of claim 19 wherein the second subbands comprise an LH subband, an HL subband, and an HH subband.

23. The system of claim 19, wherein the second subbands comprise an HHL subband, an HLH subband, and an HHHH subband.

24. The system of claim 22, the processor further to:
select a wavelet synthesis filter set for performing wavelet synthesis filtering.

* * * * *